US011216765B2

(12) United States Patent
Gottemukkala et al.

(10) Patent No.: US 11,216,765 B2
(45) Date of Patent: Jan. 4, 2022

(54) PLAN MODELING VISUALIZATION

(71) Applicant: o9 Solutions, Inc., Dallas, TX (US)

(72) Inventors: Chakradhar Gottemukkala, Austin, TX (US); Umesh Arasu, Coppell, TX (US); Koustuv Chatterjee, Gilbert, AZ (US); Raghav Ranganathan, New York, NY (US); Baskaran Manohar, Dallas, TX (US)

(73) Assignee: o9 Solutions, Inc., Dallas, TX (US)

( * ) Notice: Subject to any disclaimer, the term of this patent is extended or adjusted under 35 U.S.C. 154(b) by 217 days.

(21) Appl. No.: 14/752,810

(22) Filed: Jun. 26, 2015

(65) Prior Publication Data

US 2017/0140319 A1 May 18, 2017

Related U.S. Application Data

(60) Provisional application No. 62/018,454, filed on Jun. 27, 2014.

(51) Int. Cl.
*G06Q 10/06* (2012.01)
*G06F 3/0484* (2013.01)
*G06F 3/0482* (2013.01)

(52) U.S. Cl.
CPC ..... *G06Q 10/06375* (2013.01); *G06F 3/0482* (2013.01); *G06F 3/04847* (2013.01); *G06Q 10/067* (2013.01)

(58) Field of Classification Search
None
See application file for complete search history.

(56) References Cited

U.S. PATENT DOCUMENTS

| | | | |
|---|---|---|---|
| 5,918,232 | A | 6/1999 | Pouschine et al. |
| 6,983,237 | B2 | 1/2006 | Paterson et al. |
| 7,165,037 | B2 | 1/2007 | Lazarus et al. |
| 7,222,302 | B2 | 5/2007 | Hauser et al. |
| 7,437,277 | B2 | 10/2008 | Benayon et al. |
| 7,571,082 | B2 | 8/2009 | Gilipin et al. |
| 7,711,588 | B2 | 5/2010 | Ouimet |
| 7,756,901 | B2 | 7/2010 | Their |
| 7,835,893 | B2 | 11/2010 | Cullick et al. |
| 7,861,215 | B2 | 12/2010 | Tong et al. |

(Continued)

FOREIGN PATENT DOCUMENTS

WO WO 2014/032037 2/2014

OTHER PUBLICATIONS

PCT International Search Report and Written Opinion in PCT Application Serial No. PCT/US2013/056540 dated Dec. 17, 2013.

(Continued)

*Primary Examiner* — Susanna M. Diaz
(74) *Attorney, Agent, or Firm* — Schwegman Lundberg & Woessner, P.A

(57) ABSTRACT

A plan model system provides interactive graphical user interfaces allowing users to view and navigate to multiple alternative views of measures modeled in one or more planning models. A modeled event is provided by a user relating to a measure of a particular plan model modeling outcomes of a particular business domain of a business organization. An effect of the event on values of one or more measures of the plan model is determined. A graphical representation is presented in the graphical user interface illustrating the effect.

15 Claims, 66 Drawing Sheets

(56) References Cited

U.S. PATENT DOCUMENTS 7,904,327 B2 3/2011 Phelan et al.
7,908,159 B1 3/2011 Ordonez et al.
7,917,344 B2 3/2011 Butine
7,971,180 B2 6/2011 Kreamer et al.
7,979,248 B2 7/2011 Benayon et al.
8,145,518 B2 3/2012 Cao et al.
8,175,911 B2 5/2012 Cao et al.
8,180,623 B2 5/2012 Lendermann et al.
8,195,709 B2 6/2012 Pulfer
8,209,216 B2 6/2012 Whipkey et al.
8,214,238 B1 7/2012 Fairfield et al.
8,214,246 B2 7/2012 Springfield et al.
8,260,587 B2 9/2012 Sanchez et al.
8,306,845 B2 11/2012 D'Imporzano et al.
8,311,863 B1 11/2012 Kemp
8,352,397 B2 1/2013 Rubin et al.
8,359,216 B2 1/2013 Cao et al.
8,386,300 B2 2/2013 April et al.
8,412,548 B2 4/2013 Benayon et al.
8,612,262 B1 12/2013 Condon et al.
8,712,812 B2 4/2014 Snow et al.
2001/0004520 A1 6/2001 Nomoto et al.
2001/0027455 A1 10/2001 Abulleil et al.
2001/0049595 A1 12/2001 Plumer et al.
2001/0053991 A1 12/2001 Bonabeau
2002/0065888 A1 5/2002 Wall et al.
2002/0169658 A1 11/2002 Adler
2003/0187717 A1 10/2003 Crites et al.
2004/0138934 A1 7/2004 Johnson et al.
2004/0162743 A1 8/2004 Thier
2004/0181378 A1 9/2004 Gilmore
2004/0210509 A1 10/2004 Eder
2005/0096950 A1 5/2005 Caplan et al.
2005/0246215 A1 11/2005 Rackham
2005/0261787 A1 11/2005 Plante et al.
2006/0031048 A1 2/2006 Gilpin et al.
2006/0069585 A1 3/2006 Springfield et al.
2006/0116922 A1 6/2006 Homann et al.
2006/0129518 A1 6/2006 Andreev et al.
2007/0038465 A1 2/2007 Jang et al.
2007/0038501 A1 2/2007 Lee et al.
2007/0078869 A1 4/2007 Carr et al.
2007/0118419 A1 5/2007 Maga et al.
2007/0156677 A1 7/2007 Szabo
2007/0299743 A1 12/2007 Staib et al.
2008/0004922 A1 1/2008 Eder
2008/0004924 A1 1/2008 Cao et al.
2008/0066067 A1 3/2008 Stimpson et al.
2008/0126394 A1 5/2008 Jain et al.
2008/0133299 A1 6/2008 Sitarski
2008/0140688 A1 6/2008 Clayton et al.
2008/0162480 A1 7/2008 Clayton et al.
2008/0172273 A1 7/2008 Rackham
2008/0221940 A1 9/2008 Cohn et al.
2008/0235179 A1 9/2008 Kurien et al.
2008/0243912 A1 10/2008 Azvine et al.
2008/0312980 A1 12/2008 Boulineau et al.
2008/0313110 A1 12/2008 Kreamer et al.
2009/0018879 A1 1/2009 Flazer et al.
2009/0070158 A1* 3/2009 Virine .................... G06Q 10/10 705/7.28
2009/0192867 A1 7/2009 Farooq et al.
2009/0319246 A1 12/2009 Takayama
2010/0070251 A1 3/2010 Sanchez et al.
2010/0082381 A1 4/2010 Merrifield et al.
2010/0082386 A1 4/2010 Cao et al.
2010/0082387 A1 4/2010 Cao et al.
2010/0082696 A1 4/2010 Cao et al.
2010/0106561 A1 4/2010 Peredriy et al.
2010/0161360 A1 6/2010 Clement et al.
2010/0179794 A1 7/2010 Shah et al.
2010/0281241 A1 11/2010 El-Nakhily et al.
2011/0015958 A1 1/2011 April et al.
2011/0022374 A1 1/2011 Benayon et al.
2011/0060704 A1 3/2011 Rubin et al.
2011/0071811 A1 3/2011 Kuehr-McLaren et al.
2011/0153685 A1 6/2011 Butine
2011/0307290 A1 12/2011 Rolia et al.
2012/0116850 A1 5/2012 Abe et al.
2012/0254710 A1* 10/2012 Flanagan ........... G06Q 10/0631 715/202
2013/0035985 A1 2/2013 Gilbert
2013/0151305 A1 6/2013 Akinola et al.
2013/0151315 A1 6/2013 Akinola et al.
2014/0058712 A1 2/2014 Gottemukkala et al.
2014/0058798 A1 2/2014 Gottemukkala
2014/0200953 A1* 7/2014 Mun ...................... G06Q 10/04 705/7.28
2014/0279753 A1* 9/2014 Dalessandro ............ G06N 5/02 706/12

OTHER PUBLICATIONS

PCT International Preliminary Report on Patentability in PCT International Application Serial No. PCT/US2013/056540 dated Feb. 24, 2015 (14 Pages).

* cited by examiner

Include Members where "Member Type" = "TV" and "Technology" = "PLASMA" or "LED" and "Screen Size" <> "36""

| PRODUCT ID | Member Type | Technology | Screen Size | Refresh Rate |
|---|---|---|---|---|
| M1 | TV | PLASMA | 46" | 120HZ |
| M2 | TV | PLASMA | 46" | 240HZ |
| M3 | TV | PLASMA | 42" | 120HZ |
| M4 | TV | PLASMA | 42" | 240HZ |
| M9 | TV | PLASMA | 36" | 120HZ |
| M10 | TV | PLASMA | 36" | 240HZ |
| M5 | TV | LED | 46" | 120HZ |
| M6 | TV | LED | 46" | 240HZ |
| M7 | TV | LED | 42" | 120HZ |
| M8 | TV | LED | 42" | 240HZ |
| M11 | TV | LED | 36" | 120HZ |
| M12 | TV | LED | 36" | 240HZ |
| M13 | TV | CRT | 46" | 120HZ |
| M14 | TV | CRT | 46" | 240HZ |
| M15 | TV | CRT | 42" | 120HZ |
| M16 | TV | CRT | 42" | 240HZ |
| M17 | TV | CRT | 36" | 120HZ |
| M18 | TV | CRT | 36" | 240HZ |
| ... | ... | ... | ... | ... |

FIG. 14M
Channel Plan
Account
Brand
CWV Revenue
Gap
Last Cycle Revenue
Forecast Accuracy
Walmart
Target
Kroger
Cosmo Cola
Cosmo Cola
Cosmo Cola
CWV Revenue
262,259,051.49
$262.3m
($76.2m)
$338.4m
20.29%
$106.7m
($31.7m)
$138.4m
18.68%
23.41%
Bias
Bias
Bias
$631m
Commercial Plan Creation
Integrated Activity Plan
Volume Forecasting
Operational Drivers
Programs
R&D
Market Intelligence

PLAN MODELING VISUALIZATION

CROSS-REFERENCE TO RELATED APPLICATIONS

This application claims benefit to U.S. Provisional Patent Application Ser. No. 62/018,454, filed Jun. 27, 2014, which is incorporated by reference herein in its entirety.

TECHNICAL FIELD

This disclosure relates in general to the field of computer software modeling and, more particularly, to business outcome modeling.

BACKGROUND

Modern enterprises are competing in global markets that are increasingly complex and dynamic. A single enterprise may have a multitude of different departments, managers, and assignments, each having their own respective objectives, plans, and goals commensurate with their respective roles within the enterprise. Additionally, a single enterprise may have one or more enterprise-wide goals that involve the collaboration and involvement of its different departments, managers, and business units. For each goal, an enterprise may develop a plan for realizing the goal. A variety of different paths may exist for reaching the goal and a plan can establish which of these paths will be followed, such as defined by the particular activities, inputs, and steps the enterprise will adopt in pursuing its goal. Because a variety of potential paths may be adopted by an enterprise to reach its goal, planning can involve determining which of the path(s) are most desirable or optimal for the particular enterprise. Additionally, planning can involve the modification or replacement of previously-adopted plans based on changed conditions within the enterprise, the market place, or geopolitical landscape in which the enterprise exists.

BRIEF DESCRIPTION OF DRAWINGS

FIGS. 5A-5I are simplified block diagrams illustrating example features and models of an example scope model of an example plan model;

Like reference numbers and designations in the various drawings indicate like elements.

DETAILED DESCRIPTION

Figure 1:
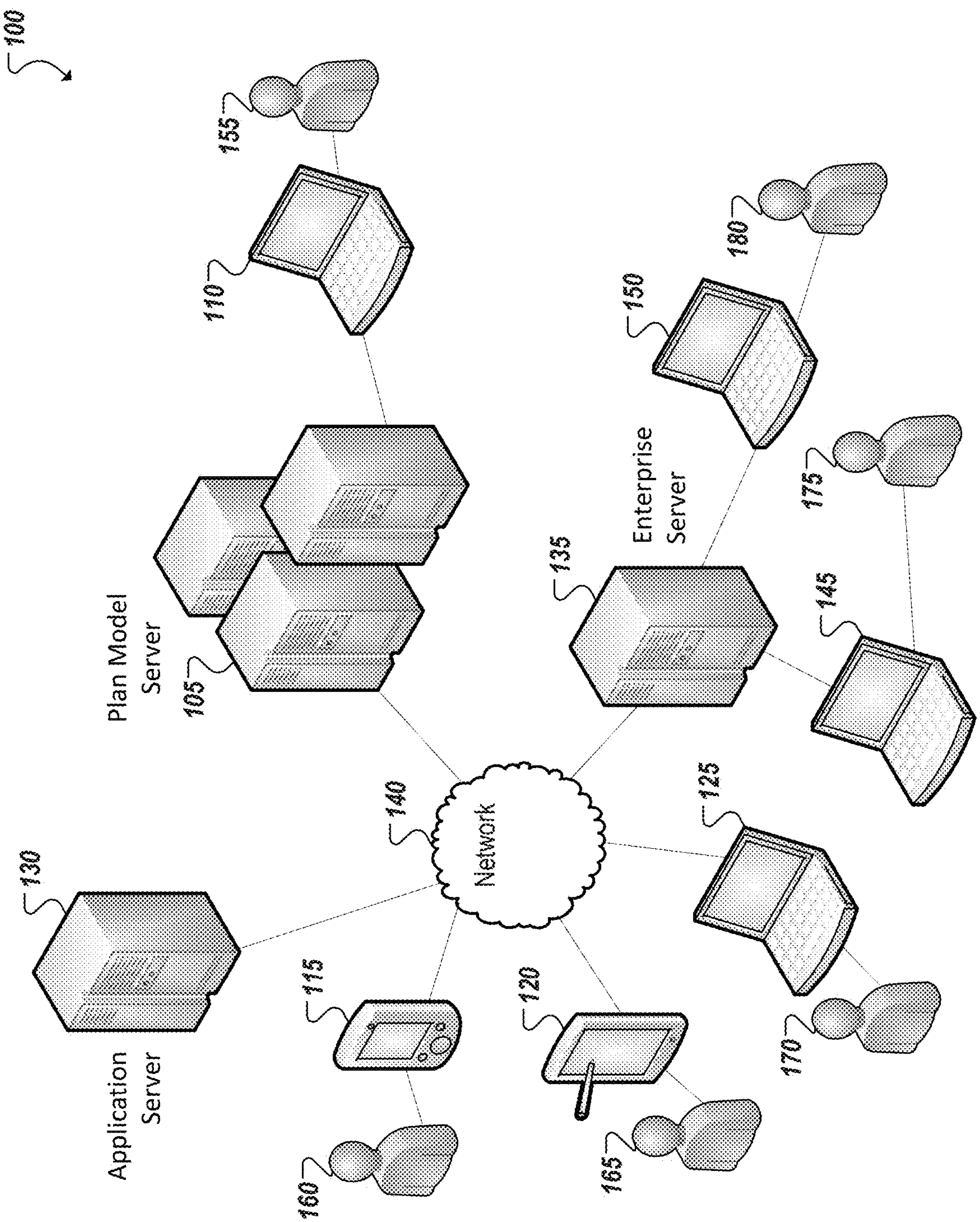
FIG. 1 is a simplified schematic diagram of an example computing system adapted to provide one or more example plan modes.

Modern enterprises can often include complex organizations, such as large multinational corporations with multiple business units and departments operating in multiple different countries, as well as organizations competing in multiple different marketplaces, including multiple product markets and geographical markets, among other examples. Organization can also include stock and commodity markets and exchanges, non-profit organizations, charities, religious organization, educational institutions, joint-ventures, market segments, trade associations, and so on. Such organizations can adopt a variety of goals and plans in connection with their respective operation, including for-profit and not-for-profit goals. Planning and decision-making activities in connection with these goals has become increasingly complex. For instance, such goals can be set at various levels within the organization, including at the organization level (i.e., goals that apply to the entire organization) as well as at various sub-levels, such as the business unit sub-level, the department sub-level, the region sub-level, the office sub-level, etc. Sub-level goals may be limited in their scope to their respective sub-part of the organization and may only concern a subset of people within the organization. Further, some goals may be limited temporally, such as goals that apply to a certain period (such as a financial year or quarter). Regardless of the level or type of goal, plans can be adopted by the organization or portion of the organization for accomplishing these goals. In some instances, plans and goals of different sub-parts of an organization can conflict and the amount of time needed to communicate and synchronize plans and goals can prevent adequate collaboration and coordination within the organization. Further, a plan may involve setting targets for a variety of inputs relating to a variety of different business entities. The inputs may include values quantifying or defining attributes of the respective business entities relevant to the goal and plan. Such business entities can include such entities as product categories, distribution channels, supply channels, customers, products, fiscal calendar terms, geographic regions and sub-regions, etc.

Software-based models and systems can be developed that model plans, goals, and outcomes within an organization. Such "plan models" can be accessed and used by systems and users to assist in improving an organization's (or group of organizations') planning activities, as well as the realization of the goals associated with its planning activities. A set of plan models can be provided, each plan model corresponding to a defined domain relevant to an organization and modeling aspects of that domain as well as the inputs and outcomes relevant to achieving or analyzing goals of the specified domain. Plan models can be used to enable interactive, quick, collaborative decision-making within an organization, including along particular user or department roles and functions. Plan models can be used, for example, to assess, generate, and modify plans and goals within the organization to increase the overall success of the organization. For instance, plan models can be interlinked to model the interconnectedness of some plans and goals of an organization. Plan models can be used to coordinate the efforts of various portions of an organization directed to different goals to optimize the activities of an organization. Additionally, scenario planning can be carried out using such plan models, with business scenarios of the organization being modeled and compared based on the plan models. Additionally, plan models and business scenarios based on plan models can provide decision-makers of an organization with views into the business entities and attributes relevant to the organization's goals, including views at various levels of abstraction and detail. In general, such plan model and business scenarios can be used to guide the direction of real-world departments and business of an organization, whether for-profit or not-for-profit, to assist in the achieving of the organization's (or multiple organizations') varied goals.

FIG. 1 is a simplified block diagram illustrating an example implementation of a computing system 100 including a plan model system 105 capable of generating, maintaining, and serving a plurality of plan models to potentially several different clients. Additionally, a plan model system 105 can further include programs, tools, and functionality allowing clients to access and interact with plan models, including the editing of plan models, building of plan models, linking of plan models, scenario building using plan models, among other functionality and tools, including those discussed explicitly or implicitly herein. Client computing devices can include endpoint user devices (e.g., 110, 115, 120, 125, 145, 150) that can include display devices and user interfaces allowing users (e.g., 155, 160, 165, 170, 175, 180) to interact with plan model system 105, plan models hosted or provided by the plan model system 105, and applications, programs, and services hosted or provided by the plan model system that allow users to interact with, edit, build, generate and compare scenarios from the plan models, as well as analyze, and generate working business plans for the organization from the plan models. In some instances, client computing devices can include endpoint devices (e.g., 110) local to the plan model system 105 allowing administrators, model developers, and other users (e.g., 155) to develop and maintain plan models and plan model tools hosted or provided by the plan model system 105. Endpoint devices can also include computing devices remote from at least a portion of the plan model system 105 and accessing plan model system resources, such as plan model interaction tools and plan models, from the plan model system 105 over one or more networks (e.g., 140). In some implementations all or a portion of the plan model system 105 can be distributed to or implemented on clients (e.g., 110, 115, 120, 125, 145, 150), such as client-specific plan models, software tools for use by clients in interacting with and using plan models, etc.

In addition to endpoint devices, other systems can also act as clients of plan model system 105. For instance, application servers (e.g., 130) hosting one or more applications, services, and other software-based resources can access and use plan models and functionality of plan model system 105 in connection with the applications and services hosted by the application server (e.g., 130). Enterprise computing systems (e.g., 135) can also interface with and use plan models and services of an example plan model system 105. For instance, enterprise-specific plan models can be developed and used by endpoint devices (e.g., 145, 150) within the enterprise. In some instances, other enterprise tools and software can be provided through enterprise computing system 135 and consume data provided through plan models and plan-model-related services of the plan model system 105, among other examples.

In general, "servers," "clients," and "computing devices," including computing devices in example system 100 (e.g., 105, 110, 115, 120, 125, 130, 135, 145, 150, etc.), can include electronic computing devices operable to receive, transmit, process, store, or manage data and information associated with computing system 100. As used in this document, the term "computer," "computing device," "processor," or "processing device" is intended to encompass any suitable processing device. For example, the system 100 may be implemented using computers other than servers, including server pools. Further, any, all, or some of the computing devices may be adapted to execute any operating system, including Linux, UNIX, Microsoft Windows, Apple OS, Apple iOS, Google Android, Windows Server, etc., as well as virtual machines adapted to virtualize execution of a particular operating system, including customized and proprietary operating systems.

Further, servers, clients, and computing devices (e.g., 105, 110, 115, 120, 125, 130, 135, 145, 150, etc.) can each include one or more processors, computer-readable memory, and one or more interfaces, among other features and hardware. Servers can include any suitable software component or module, or computing device(s) capable of hosting and/or serving software applications and services (e.g., plan models and plan model applications and services of the plan model system 105, applications and services of application server 130, applications and services of enterprise system 135, etc.), including distributed, enterprise, or cloud-based software applications, data, and services. For instance, servers can be configured to host, serve, or otherwise manage models and data structures, data sets, software service and applications interfacing, coordinating with, or dependent on or used by other services and devices. In some instances, a server, system, subsystem, or computing device can be implemented as some combination of devices that can be hosted on a common computing system, server, server pool, or cloud computing environment and share computing resources, including shared memory, processors, and interfaces.

User or endpoint computing devices (e.g., 105, 110, 115, 120, 125, 145, 150, etc.) can include traditional and mobile computing devices, including personal computers, laptop computers, tablet computers, smartphones, personal digital assistants, feature phones, handheld video game consoles, desktop computers, internet-enabled televisions, and other devices designed to interface with human users and capable of communicating with other devices over one or more networks (e.g., 140). Attributes of user computing devices, and computing device generally, can vary widely from device to device, including the respective operating systems and collections of software programs loaded, installed, executed, operated, or otherwise accessible to each device. For instance, computing devices can run, execute, have installed, or otherwise include various sets of programs, including various combinations of operating systems, applications, plug-ins, applets, virtual machines, machine images, drivers, executable files, and other software-based programs capable of being run, executed, or otherwise used by the respective devices.

Some computing devices (e.g., 105, 110, 115, 120, 125, 145, 150, etc.) can further include at least one graphical display device and user interfaces allowing a user to view and interact with graphical user interfaces of applications and other programs provided in system 100, including user interfaces and graphical representations of programs interacting with plan models and plan-model-related tools and service provided, for example, by a plan model system 105. Moreover, while user computing devices may be described in terms of being used by one user, this disclosure contemplates that many users may use one computer or that one user may use multiple computers.

While FIG. 1 is described as containing or being associated with a plurality of elements, not all elements illustrated within system 100 of FIG. 1 may be utilized in each alternative implementation of the present disclosure. Additionally, one or more of the elements described in connection with the examples of FIG. 1 may be located external to system 100, while in other instances, certain elements may be included within or as a portion of one or more of the other described elements, as well as other elements not described in the illustrated implementation. Further, certain elements illustrated in FIG. 1 may be combined with other components, as well as used for alternative or additional purposes in addition to those purposes described herein.

Figure 2:
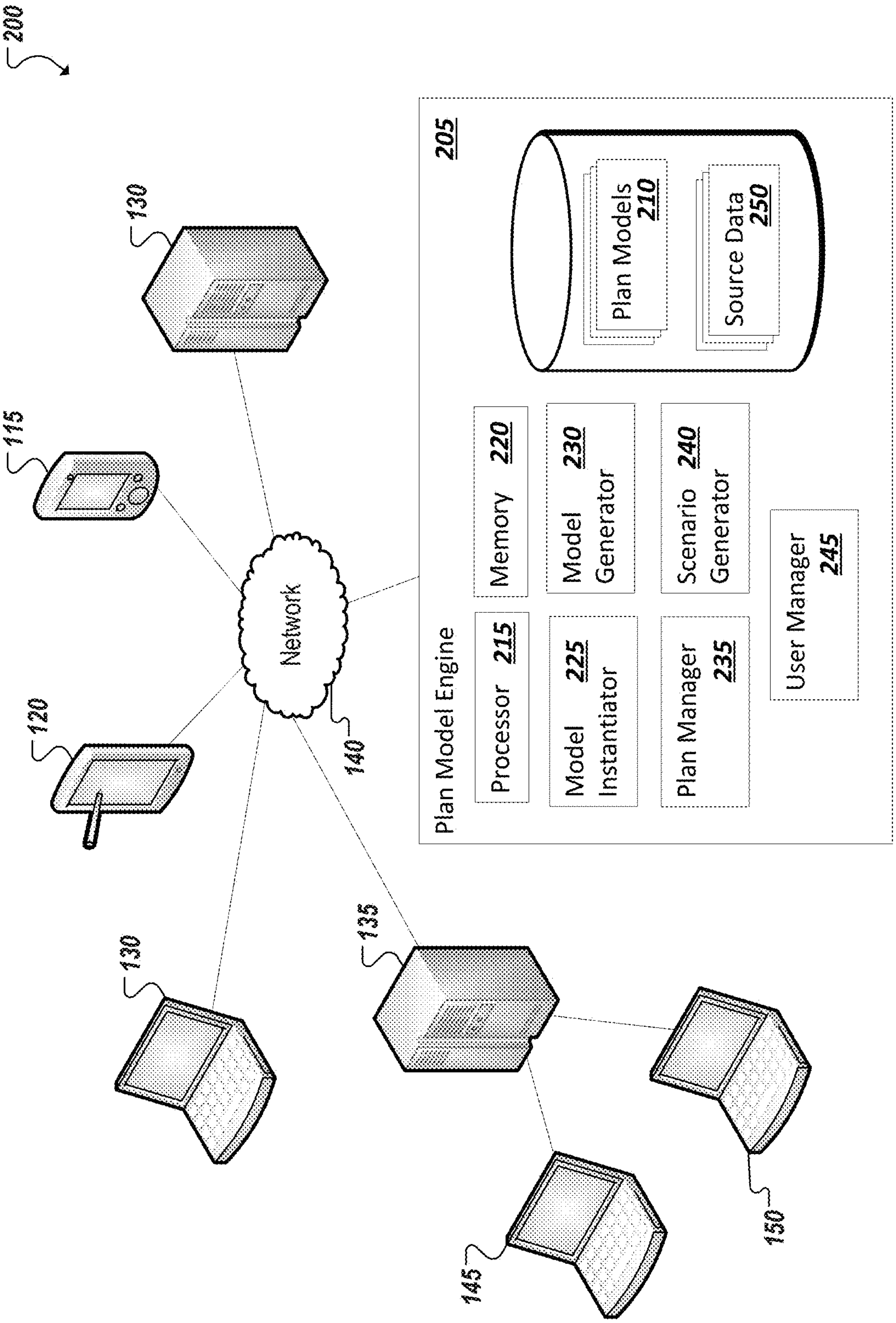
FIG. 2 is a simplified block diagram of an example system including an example plan model engine.

Turning to FIG. 2, a simplified block diagram is shown of an example system 200 including an example plan model engine 205. In some instances, plan model engine 205 can be hosted by a plan model system, such as the plan model system 105 described in the example of FIG. 1. In other examples, instances of a plan model engine 205 (including multiple distinct instances) can be hosted on enterprise computing platforms and other computing environments accessing and otherwise making use of plan models (e.g., 210). A plan model engine 205 can host, serve, maintain, access, or otherwise provide a set of plan models 210 used to model potential business outcomes of a particular organization or plurality of organizations. A plan model engine 205 can additionally include functionality for using, building, and editing plan models 210. Moreover, the example system 200 of FIG. 2 can further include one or more additional computing devices, systems, and software-based tools (e.g., 115, 120, 125, 130, 135, 145, 150) communicating with plan model engine 205, for instance, over one or more networks (e.g., 140).

In one example implementation, a plan model engine 205 can include one or more processors (e.g., 215) and memory elements (e.g., 220), as well as one or more software- and/or hardware-implemented components and tools embodying functionality of the plan model engine 205. In some examples, a plan model engine 205 can include, for instance, such components and functionality as a model instantiator 225, model generator 230, plan manger 235, scenario generator 240, and user manager 245, among potentially other components, modules, and functionality, including combinations of functionality and tools described herein. In addition, in some implementations, a plan model engine can include plan models 210 either hosted local to the plan model engine 205 or accessed from remote plan model servers or other data stores. Functionality of plan model engine 205 can access, utilize, and consume plan models of the plan model engine 205 as well as potentially plan models of other plan model systems or plan model engines (e.g., an instance of a plan model system belonging to another enterprise distinct from the enterprise or host of plan model engine 205), among other examples.

In some implementations, an example model instantiator 225 can include functionality for identifying and accessing plan models 210. For instance, a model instantiator 225 can be used, for instance, in connection with use of a particular plan-model-related application, one or more plan models relevant to one or more tasks performed using the application, etc. In some implementations, a model instantiator can also identify instances where a plan model is to be generated, edited, or otherwise modified. An example model generator 230 can be included possessing functionality for creating or editing plan models. In some instances, a plan model can be generated by instantiating an instance of a preexisting plan model, plan model template (or class), among other examples. Further, in some implementations, user interfaces and controls can be provided in connection with an example model generator 230 allowing human or automated users to input data to populate and be used in an instantiation of a plan model. In some instances, source data (e.g., 250) can also be collected, requested, retrieved, or otherwise accessed to populate attribute fields, build logic of the plan model, and be otherwise used (e.g., by model generator 230) to generate an instantiation of a particular plan model for addition to the set of plan models 210.

Particular instances of a plan model or a particular set of attribute values of a particular plan model can be adopted by an organization as a model of a current working plan, goal, assumption, or approach to be considered by the organization both in its analysis of other business scenarios (e.g., as modeled using plan models 205) as well as drive the real world behavior and decision-making of the organization. Various versions of one or more of the plan models 210 as well as the set of plan models themselves 210 can be tracked and managed using an example plan manager 235. For instance, a plan manager 235 can manage status of plan models 210, including modeled scenarios generated based on plan models. For example, a particular modeled scenario can be designated as a current working model, adopted business plan, etc. of an organization, and serve as a guide to the organization's decision makers and employees. Accordingly, the plan manager 235 can operate, in some instances, in connection with an example scenario generator 240 for use in connection with plan models 210. A scenario generator 240 can include functionality for generating hypothetical business scenarios based on one or more plan models. Such scenarios can include modeled scenarios based on particular or varying input drivers (e.g., modeling real world business-related inputs affecting a particular business goal or outcome), as well as based on particular goals (e.g., modeling hypothetical conditions that could result in a particular outcome). Additionally, some implementations of scenario generator 240 can further include functionality adapted to provide guidance to users in connection with the generation or modification of a particular scenario or comparisons of generated scenarios. Further, implementations of a scenario generator 240 can additionally include functionality for comparing generated scenarios, for instance, to determine whether a particular scenario is superior to another. In instances where a user determines that a particular modeled scenario is superior to other scenarios, including scenarios previously designated as current or adopted working models, the particular scenario can be flagged, saved, promoted, or otherwise specially designated, for instance, as a working or adopted scenario of the organization relating to particular goals of the organization, among other examples.

As noted above, in some instances, a particular plan model in a set of plan models 210 can model business outcomes relating to a particular business unit, department, domain, or sub-organization of an organization. Accordingly, some plan models may better relate to or be understandable to particular subsets of users and decision-makers within an organization. Indeed, one or more networks of plan models in plan models 210 can be provided, with each department, business unit, etc. of an organization having associated plan models in the network relevant to the particular entities, outcomes, work, and goals of that sub-organization. With each sub-organization utilizing, controlling, and accessing its own related plan models, collaborative decision-making and scenario-planning can be accomplished across an organization as the network of plan models models interplay and interconnectedness of various goals and outcomes of the various sub-organizations. Indeed, in some implementations, interactions with particular plan models 210 can be at least partially restricted, limited, or otherwise organized so that users utilizing and controlling modeling using particular plan models are associated with or expert in those sub-organization to which the particular plan models are related. In such implementations, an example plan model engine 205 can further include such modules as a user manager 245 that can manage users' roles, identities, and attributes as well as the users' respective permissions, access, and associations to one or more respective plan models, among other examples.

Figure 3:
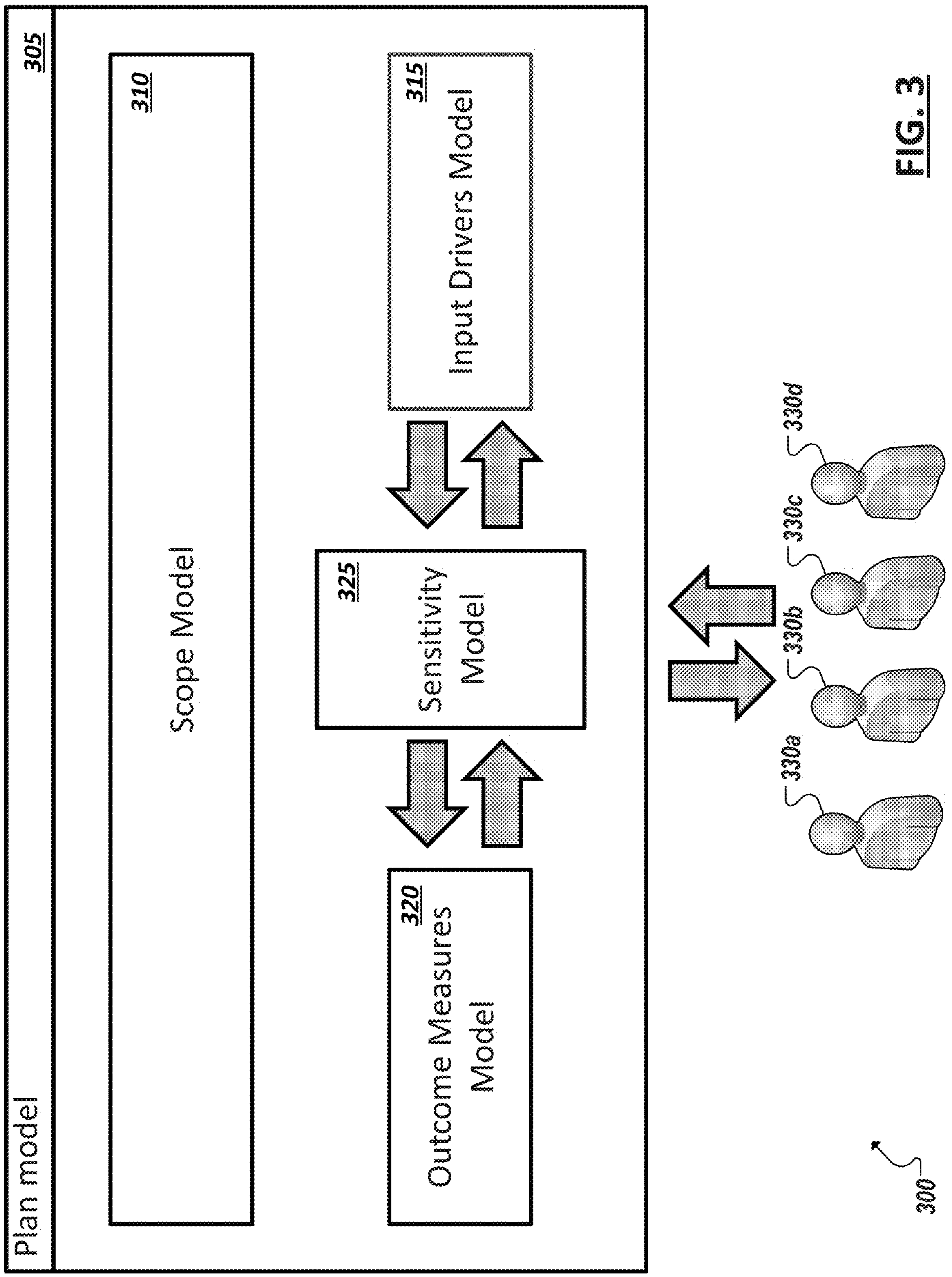
FIG. 3 is a simplified block diagram representing principles of an example plan model.

Turning to the example of FIG. 3, a simplified representation 300*a* is shown representing principles of an example, software-implemented plan model 305. A plurality of instances of plan model 305 can be developed, each instance of plan model 305 modeling a respective business outcome of an organization (or group of organizations), including business outcomes relating to administrative, educational, charity, commercial, industrial, logistic, and other for profit and not-for-profit activities of the organization. In one example implementation, a plan model can include a scope model 310, an input drivers model 315, a sensitivity model 320, and outcome measures model 320. Additional models can be included in or linked to by a respective plan model, such as entity models, member models, and hierarchy models. Additionally, in some implementations, plan models can each include a process model for use in managing planning activities involving the plan model as well as coordinating planning activities between multiple plan models. Further, one or more designated users, user roles, or users within particular sub-organization (collectively users 330*a-d*) can interact with and use the plan model, for instance, in connection with planning activities within one or more organizations.

Generally, a scope model 310 can identify and model the specific domain within an organization on which the particular instance of the plan model 305 operates and is associated with. Domains can be relatively broad or narrow and capture certain segments of a particular organization. The scope model 310 can further enable certain domain-specific planning processes and logic relevant to the corresponding domain within the organization. Input drivers model 315 can represent one or more input drivers specifying key variables influencing outcome measures modeled by the particular domain-specific instance of the plan model 305. Accordingly, outcome measures model 320 can model and represent the outcome measures that the particular instance of the plan model will state, predict or attempt to achieve in its modeling of a particular business outcome(s) which can also be expressed as one or more of the outcome measures modeled in outcome measures model 320. A sensitivity model 315 can define the dependencies, relationships, processes, formulas, and other logic used to derive values of various outcome measures from values of input drivers of the plan model 305. Such dependencies, relationships, processes, formulas, and other logic (collectively dependencies) can be domain-specific as well as define how values of intermediate outcome measures or input drivers can be derived from other input drivers or outcome measure values, among other examples.

Figure 4:
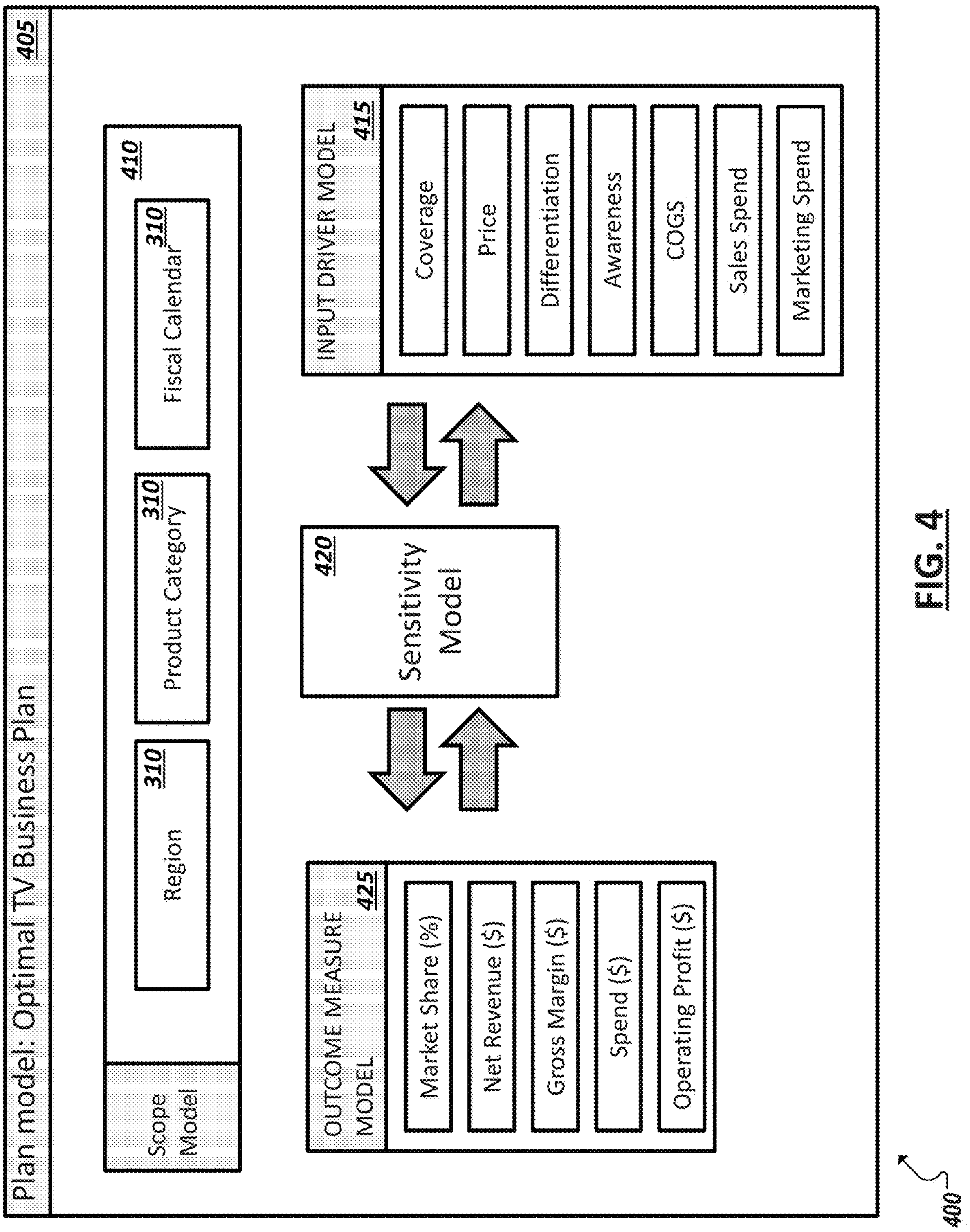
FIG. 4 is a simplified block diagram representing an example instance of a plan model.

Turning to the example of FIG. 4, a simplified schematic block diagram 400 is shown of a particular example instance of a plan model 405. In this example, the plan model 405 is an optimal television business plan model modeling outcomes for a particular product category of a business (e.g., a business selling televisions). As in the example of FIG. 3, example plan model instance 405 can include a scope model 410, input drivers model 415, sensitivity model 420, and outcome measures model 425. Scope model 410 defines a domain to which the modeled outcomes of plan model 405 apply. For instance, scope model 410 can model a domain encompassing a particular product category (i.e., TVs), within one or more geographic regions (or market regions), and within a particular period of time (e.g., a fiscal quarter, year, five year span, etc.). Accordingly, scope model 410 can define the domain according to one or more business entities, such as in this example, regions, product categories, and fiscal calendar. Moreover, in this implementation, scope model 410 can include entity models 430, 435, 440 corresponding to the relevant business entities used to define the domain in the scope model 410.

A plan model's domain, as defined in its scope model (e.g., 410) can drive other models (e.g., 415, 420, 425) of the plan model as the inputs, outcomes, and relationships between outcomes and inputs (e.g., as defined in sensitivity model 420) can be highly domain-specific and tied back to the particular business entities used to define the modeled domain. For instance, in the example input drivers model 415 can include such input drivers, or variables, pertaining to a television product category and product market region for televisions, including input drivers such as channel coverage, price, product differentiation, consumer awareness, cost of goods sold (COGS) or inventory cost, sales spend, marketing spend, etc. Similarly, outcome measures relevant to the outcome, or goal, modeled for the defined domain can be defined in outcome measures model 425, such as market share percentage, net revenue, gross margin, total spend, operating profit, etc.

Some plan models will model outcomes of domains that result in sets of input drivers and outcome measures quite different from the input drivers and outcome measures of the particular example of FIG. 4. However, other plan models can also be developed for different domains (e.g., a different market region, different product, products of a different organization, etc.) that include input drivers and outcome measures similar to those of the optimal television business plan model 405. The dependencies of the respective outcome measures on the respective input measures of a particular domain, however, can fluctuate considerably between domains. For instance, sensitivity of a market share outcome measure to particular input drivers such as price or product differentiation can be quite different in two different markets, including different product markets and market regions. Accordingly, sensitivity model 420 can define domain-specific dependencies between input drivers and outcome measures for a plan model of a particular domain, representing the sensitivities of the outcome measures to the respective input drivers upon which the value of the outcome measure is dependent.

Figure 5A:
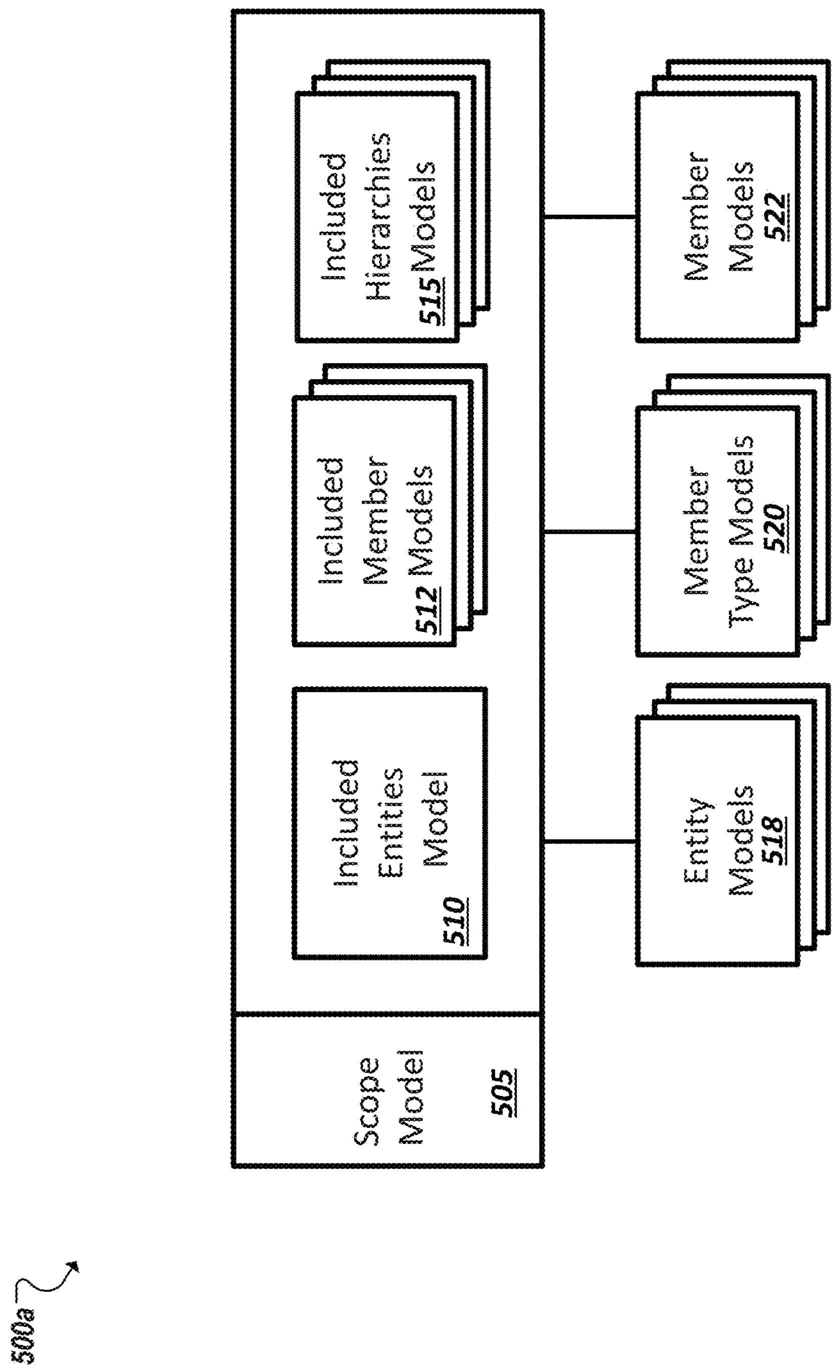

Turning to FIG. 5A, a simplified block diagram 500*a* is shown illustrating an example scope model structure. For instance, instances of a scope model 505 included in plan models can include an included entities model 510, one or more included members models 512, and one or more included hierarchies models 515 corresponding to those business entities designated as defining the particular domain of the scope model instance 505. The included entities model 510 and included member models 512 can reference or link to one or more entity models 518, member type models 520, and member models 522 maintained in connection with a plan model system. As noted above and in other example discussed herein, business entities can include such entities as regions, organizations, persons, products, product categories, market regions, market segments, channels, calendar periods, time, locations, customers, suppliers, factories, and so on. The entities included in the domain can be defined in included entities model 510. A particular business entity can have constituent subcategories of business entities, or member types, and particular members of these entity member types can be included in the particular domain to which a plan model applies. Accordingly, in some examples, each entity designated in included entities model can have a corresponding set of designated members of the respective entity designated in a respective included member model 512. Additionally, for each designated entity, a set of included hierarchies (or included different possible hierarchical representations of the included members of an entity) can be designated in included hierarchies models 515, each entity having its own included hierarchy model 515. In other implementations, the sets of included members and/or included hierarchies can be defined in a single included member model for the scope model 505 or a single included hierarchies model for the scope model 505 (i.e., rather than distinct included member models 512 and included hierarchies models 515 for each individual entity designated in an included entities model 510), among other examples.

Further, a scope model 505 can reference (e.g., through included entities model 510) corresponding entity models 518 of the designated included entities of the domain modeled by the scope model. Entity models 518 can model a particular entity as well as the member types of the entity, hierarchies of the entity, and other attributes and information pertaining to the individual entity. Member type models 520 can also be referenced through the scope model, each member type model 520 modeling a particular type of the business entity as well as defining relevant attributes of that member type (or member type attributes). Further, member models 522 can be referenced, corresponding to the included member models 512, each member model 522 defining the individual members within a particular modeled domain. Each member can be of a particular one of the member type models 520. In some implementations, included member models 512 can be defined for each entity of the domain and included as sub-models of the entity models 518. Relationships between entities, member types, members (or groups (or "sets") of members), and particular member type attributes can be hierarchical and, in some instances, be organized in multi-dimensional hierarchies that allow members, member groups, and member type attributes to organized in multiple different alternate hierarchies. Such hierarchical organizations can be defined, in some instances, through included hierarchies models 515.

Figure 5B:
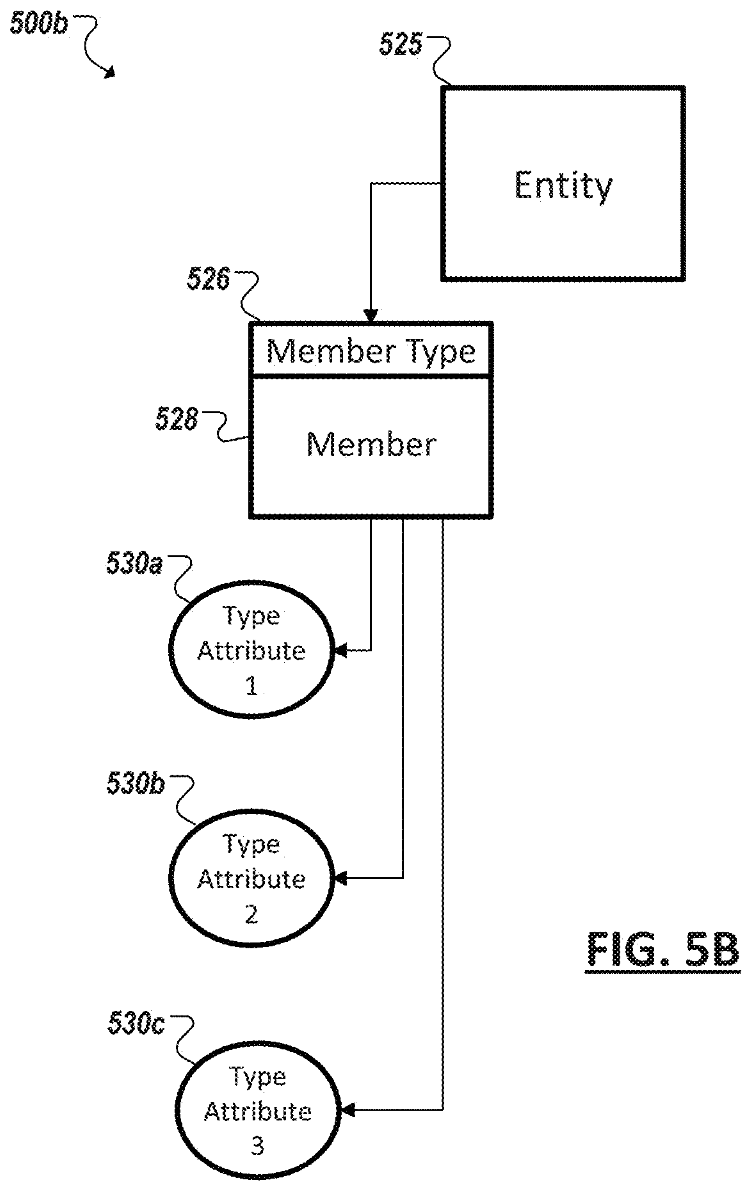

Turning to FIG. 5B, an example block diagram 500*b* is shown of a simplified hierarchy of a business entity as can be captured through one or more models of the corresponding scope model and/or entity model of a corresponding included business entity including corresponding member type models, member models, included hierarchies models, etc. For instance, in the particular example of FIG. 5B, a member type can be one of a plurality of member types of an entity and each member type (e.g., 526) can include one or more instances, or members (e.g., 528), of that particular member type (e.g., 526). The member type (e.g., 526) can define a set of member type attributes (e.g., 530*a-c*) relevant to members of that type and that can define members of that type. Indeed, each member (and member model) of a particular member type can inherit the member type attributes of the corresponding member type. To illustrate, turning to FIG. 5C, an example entity 525*a* is illustrated corresponding to a product business entity. Within the global marketplace a wide variety of different products may exist from smartphones, printers, and digital video recorders to cardboard packaging, breakfast cereal, and tissue papers, among scores of other examples. Further, in the example of product business entities, various products may have relevance to different organizations and different goals within the same organization. Accordingly, plan models can include product business entities within their domains for different reasons in modeling particular outcomes, including domains corresponding to particular products of a particular business unit of an organization, corresponding to competitor products, corresponding to marketing budgets, inventory, etc.

Figure 5C:
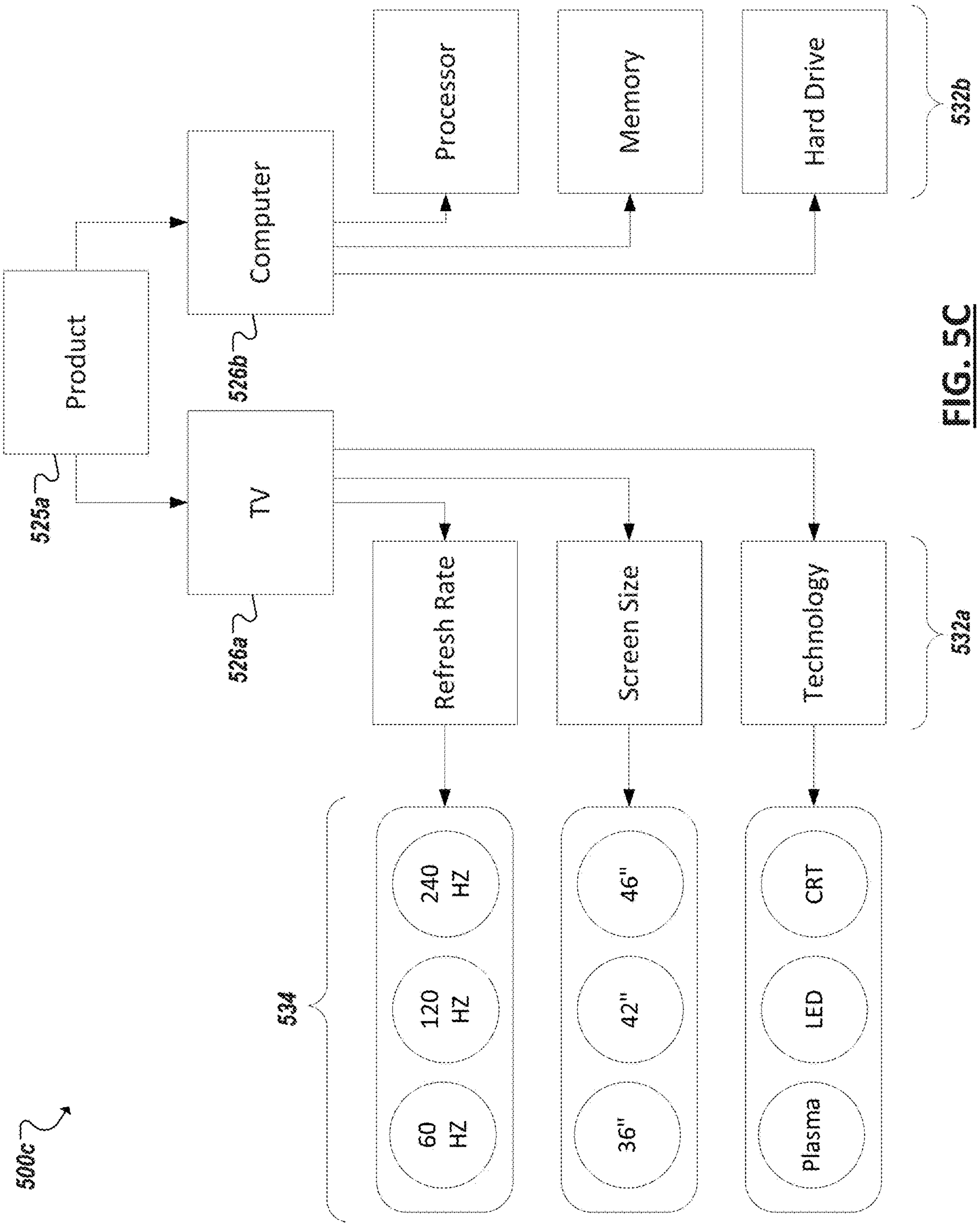

In the particular example 500*c* of FIG. 5C, a scope model can define a particular domain to which a particular plan model applies by defining two particular member types within the product business entity 525*a*, in this example, a televisions member type (526*a*) and computer member type (526*b*). Each of the member types 526*a*, 526*b* can respectively define a set of member-type attributes (e.g., 532*a*, 532*b*) describing features and details generally relevant to members of that type. For example, a television member type 526*a* can include member type attributes such as the refresh rate, screen size, and technology (e.g., LED, LCD, plasma, etc.) of a particular television (i.e., member of the television member type), including other potential television-related attributes. Similarly, a computer member type, while a member type of the same business entity (e.g., Product), can have a different set of attributes corresponding to features and specifications of computers, such as processor type, processor speed, memory, hard drive, etc.

Each member of a member type can be defined, at least in part, according to attribute values defined for the member. For instance, a variety of different attribute values (e.g., 534) may exist among a set of members. For example, a first television member considered in the domain may be a 120 Hz 42" LCD television, while a second television member in the domain is a 240 Hz 46" plasma model. In some instances, multiple members in a member type can share one or more attribute values. Shared member type attributes can serve as the basis for member groups. For instance, a group of members of the example television member type of FIG. 5C can be defined based on screen size, with a group of televisions being defined for 36" televisions, 42" televisions, 46" televisions, and so on.

Turning to the example chart 500*d* of FIG. 5D, a simplified set of members of a particular member type (e.g., televisions) is represented. In addition to defining a domain according to the business entities and member types to which a particular plan model applies, a scope model (e.g., through an included members model) can further define the domain by the individual members included in the domain. For instance, a set of member television models is listed in chart 500*d*. A particular domain, however, may only be interested in a particular subset of the set of members available. For instance, a set of included members 535 can be defined that pertains to a set of televisions of interest within the domain, such as televisions made in a certain year, televisions manufactured by a particular plant or vendor of an organization, televisions sold in a particular store or region of an organization, etc.

Further, as can be seen in the example of FIG. 5D, members of an entity (or member type) can share some common attributes and attribute values. On the basis of shared attribute values, members can be grouped or sorted based on the shared attribute value. For instance, included member televisions "M5"-"M8" can be included in an LED TV member group while member televisions "M1-M4" are included in a plasma TV member group. Individual members can belong to multiple member groups. For instance, in the example of FIG. 5D, a member "M1" can belong both to the plasma TV member group, as well as a 46" screen size member group (along with members "M2", "M5", and "M6"), 120 Hz refresh rate member group (along with members "M3", "M5", and "M7"), as well as other member groups. Indeed, in some implementations, member groups of an entity can span multiple member types. For instance, in one example, member types "TV" and "Computer" can share an attribute "price" and members from both member type groups can populate member groups organized according to particular defined price ranges, among other examples involving other business entities, member types, and member attributes.

As noted above, entities and their respective members can be used to define the domain of a plan model. In some instances, a scope model can include an included entities model specifying the set of entities on which the plan model operates. Further, business entities can be hierarchical in nature. Further, multiple alternate hierarchies can exist for a business entity and serve to represent members of the entity at varying levels of aggregation. In some implementations, these levels of aggregation can also be based on or formed from the varying combinations of member groups that can be defined within a business entity. Turning to the example of FIG. 5E, a set 500*e* of three block diagrams are shown representing example available hierarchies 540*a-c* of a particular business entity. More specifically, in the particular example of FIG. 5E, three available hierarchies 540*a-c* are shown of a product business entity included in a domain also specified by members of member type "television," similar to the example television member type in the illustrative examples of FIGS. 5C and 5D. In a first (540*a*) of the available hierarchies 540*a-c*, television technology type is designated as the first level of aggregation within the hierarchy 540*a*. Further, in the example hierarchy 540*a* screen size is designated as a child to technology type and refresh rate as a child of screen size. Based on this designated hierarchy 540*a* various groupings of members can be identified and aggregated at the levels of aggregation 545*a-e* defined by the hierarchy 540*a*. For instance, a highest level of aggregation 545*a* in hierarchy 540*a* can include all members of member type television. At a second highest level of aggregation 545*b* in hierarchy 540*a*, two distinct member groups can be identified for two member groups defined by their respective shared technology types (e.g., a LED member group and plasma member group). Further at the next level of aggregation 545*c*, respective sub-member groups of the LED and plasma member groups can be defined according to the screen sizes of constituent members included in each of the LED and plasma member groups. For instance, 42" LED television member group can be included or defined at level of aggregation 545. Further, still lower levels of aggregations (e.g., 545*d*, 545*e*) can be provided based on the defined hierarchy 540*a*. Indeed, a lowest level of aggregation 545*e* can be provided representing the individual (i.e., ungrouped) members themselves (e.g., as identified by a member ID attribute of the member type, such as "Product ID").

In addition to hierarchy 540*a* of a product business entity of an example plan model, further hierarchies 540*b* and 540*c* can be provided organizing the product business entity according to other member attributes and defining further potential member groups and levels of aggregation. For instance, a second hierarchy 540*b* can provide for a screen size attribute of a television member type as the parent to a television technology type which can, in turn, serve as the parent to a product ID attribute, thereby defining four levels of aggregation 545*a, f-h*. In the example of hierarchy 540*c*, member type is a parent of the television technology attribute which is a parent of the product ID attribute, thereby defining a hierarchy providing levels of aggregation 545*a, b, e*.

Figure 5E:
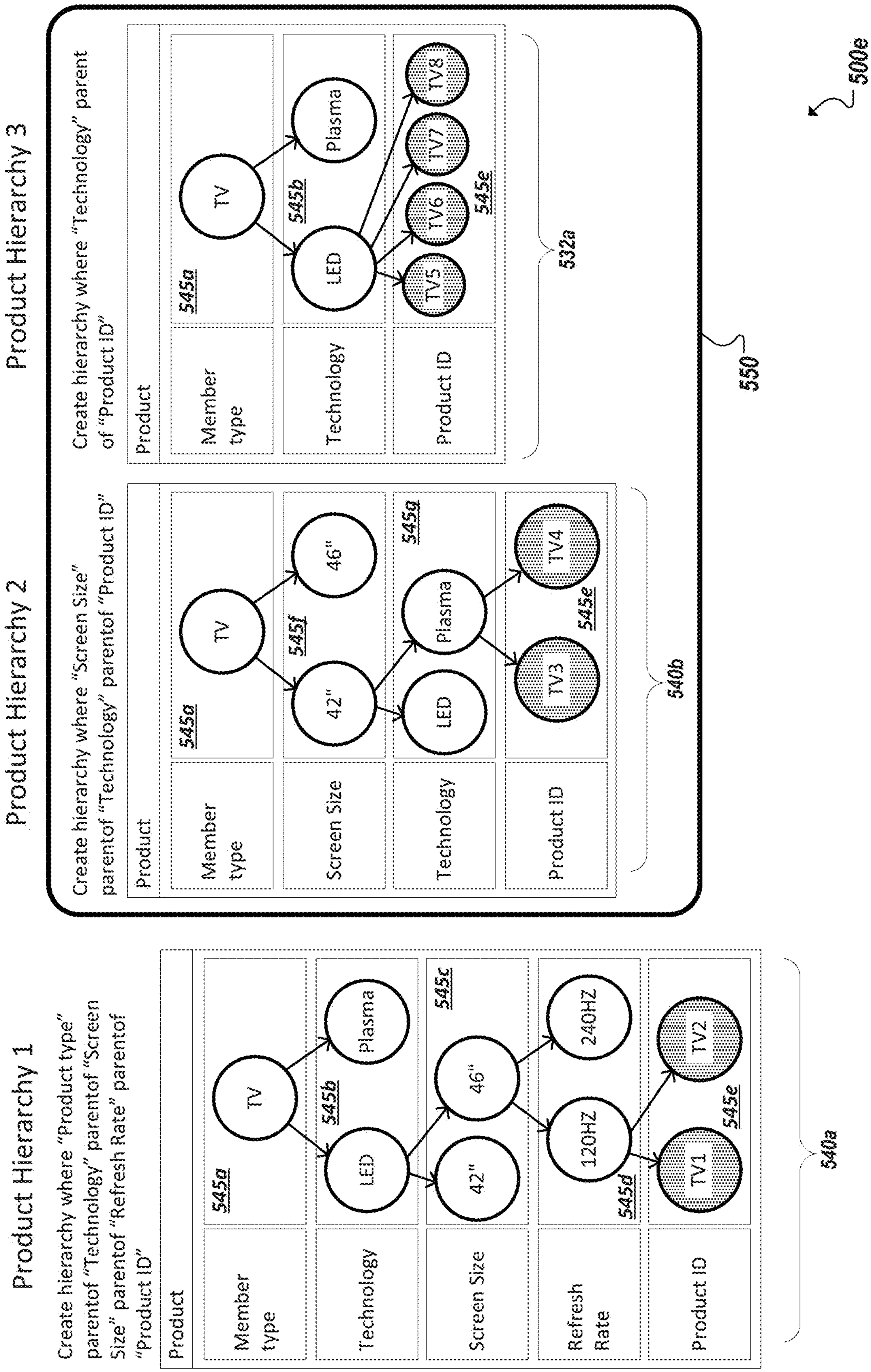

As shown in the example of FIG. 5E, included members and member groups of a particular business entity can be organized or arranged into a plurality of different hierarchies allowing the members to modeled or analyzed at a variety of levels of aggregation. In some implementations, the domain defined by the scope model can specify (e.g., through an included hierarchies model) a particular subset of the available hierarchies that are relevant to the modeling of goals or outcomes of the domain. For instance, a hierarchies model (e.g., 520*a-c*) can specify only those particular hierarchies in which included members and member groups can be arranged into or that have otherwise been designated (directly or indirectly) for inclusion in the domain. Indeed, in some instances, through designation of a set of included entities, a set of included entity members, and a set of included hierarchies a plan model domain can be specified and distinct domain-specific planning can be enabled through the corresponding plan model. Specification of included entities, members, and hierarchies can be completed manually (e.g., via human user input and user-defined rules and settings), as well as via computer-controlled inputs, logic, and systems. Further, a domain can be defined and modified according to the specification of particular entities, members, and hierarchies as well as through additions, substitutions, deletions, and other changes to the respective sets of included entities, members, and hierarchies.

In addition to enabling domain-specific planning, a plan model can further allow management and planning at varying levels of aggregation within a domain-specific context.

Figure 5F:
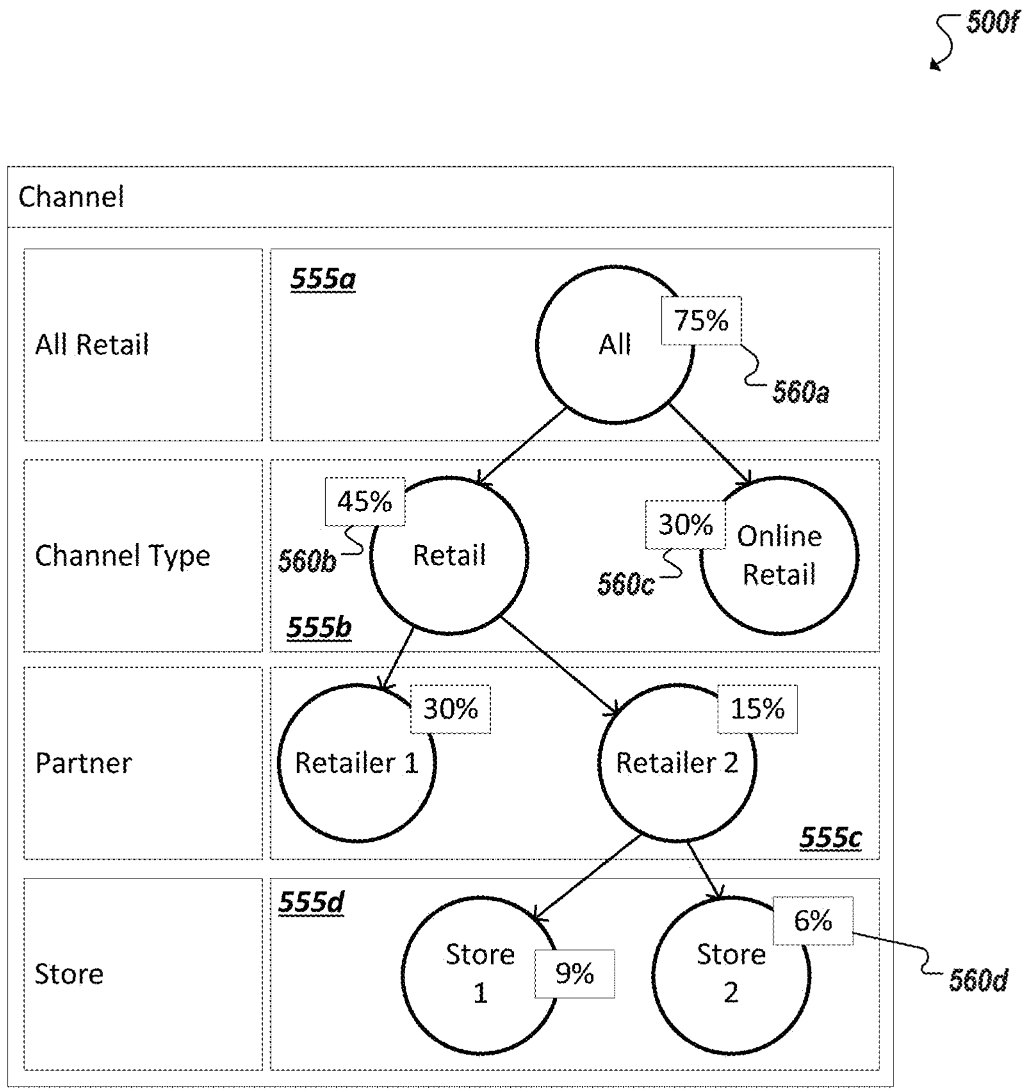

For instance, turning to the example of FIG. 5F, a simplified block diagram 500*f* is shown representing how input drivers and outcome measures of a plan model can be viewed, analyzed, and manipulated at any level of aggregation provided through the included hierarchies of the plan model's domain. For simplicity, the example of FIG. 5F illustrates how a single value can be viewed and/or manipulated across different levels of aggregation (e.g., 555*a-d*). In this particular example, the value pertains to channel coverage for one or more products and can in some instances be an input driver or in other cases an outcome measure (or even both an outcome measure for a first plan model and input driver for a second plan model linked to the first plan model through the use of one or more outcomes of the first plan model for some of its inputs, among other examples).

In the example of an input driver for a particular domain, a single input driver value for aggregate channel coverage of the products included in this particular domain can be 75%. This 75% value (at 560*a*) can be broken down, or disaggregated, either automatically via logic or rules defined in the plan model (e.g., in a sensitivity model of the plan model instance) or manually through user- or system-provided values and/or rules to show what portion of this 75% channel coverage value is attributable to either one of the two member groups, "Retail" and "Online Retail," at the second level of aggregation 555*b*. In this example, of the 75% channel coverage, 45% of the channel coverage (at 560*b*) can be modeled as from Retail channel types and the remaining 30% (at 560*c*) from Online Retail channel types. The 75% value (at 560*a*) can be further analyzed at other levels of aggregation, included lower levels of aggregation, such as at a level of aggregation grouped by channel type, channel partner, and store identifier, as at example level of aggregation 555*d*. For instance, of the 75% channel coverage modeled, 6% (at 560*d*) can be attributable to a first particular store of a particular channel partner Retailer B of a Retail channel type. Further, at each level of aggregation, values for the input driver can viewed and manipulated. For instance, a user can manipulate the value 560*c* upward or downward, thereby also potentially affecting values across the hierarchy, such as values 560*b*, 560*d*, etc.

Figure 5G:
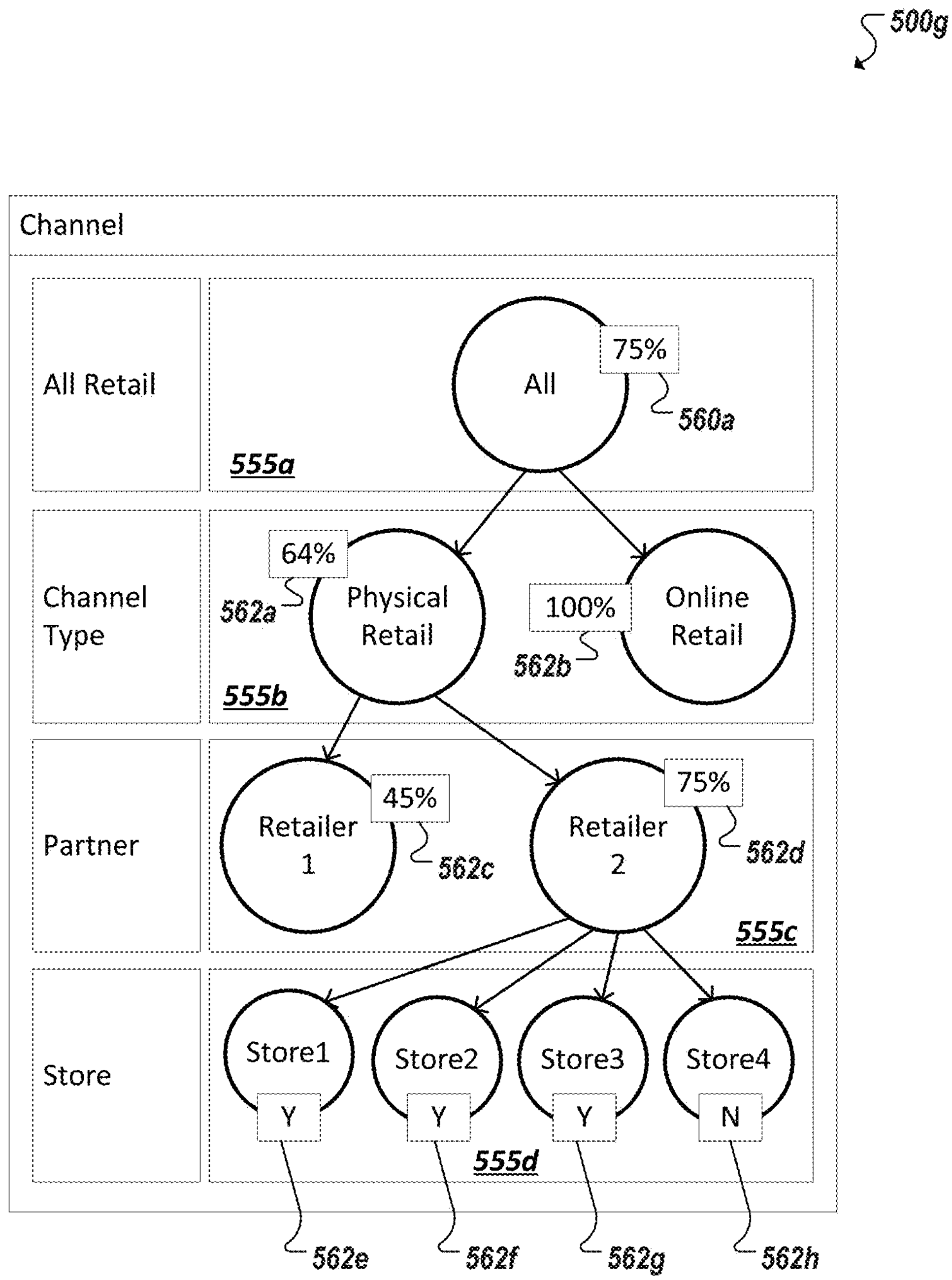

In addition to allowing different views of input driver (or outcome measure) values at varying levels of aggregation, values can be disaggregated in different ways within the same plan model. For instance, in the example of FIG. 5G, rather than disaggregating the value 560*a* into the portions of the 75% attributable to each of the other, lower-level member groupings (e.g., physical retain vs. online retail; Retailer 1 vs. Retailer 2, etc.), the respective channel coverage of each member group at each level of aggregation can also (or instead) be enabled and represented using the included hierarchies of the scope model. For instance, an organization may have 100% coverage (e.g., at 562*b*) in the available online retail channels (e.g., as defined in an included members model of the retail channel entity), but only 64% (e.g., at 562*a*) of the available physical retail channels covered. Similarly, the organization may have 45% (at 562*c*) of the stores of Retailer 1 covered and 75% (at 562*d*) of Retailer 2's stores covered. For instance, Retailer 2 may have four available stores, with values 562*e-h* indicating whether each member store is covered or not, thereby representing the values at the lowest, most detailed level of aggregation, among many other examples. Further, while viewing and manipulating input drivers across multiple levels of aggregation provided through a plan model has been discussed in connection with some of the examples above, similar concepts apply to the outcome measures, with a single outcome measure value capable of being disaggregated, viewed, and manipulated at multiple levels of aggregation, as provided by hierarchies of the respective plan model.

Figure 5H:
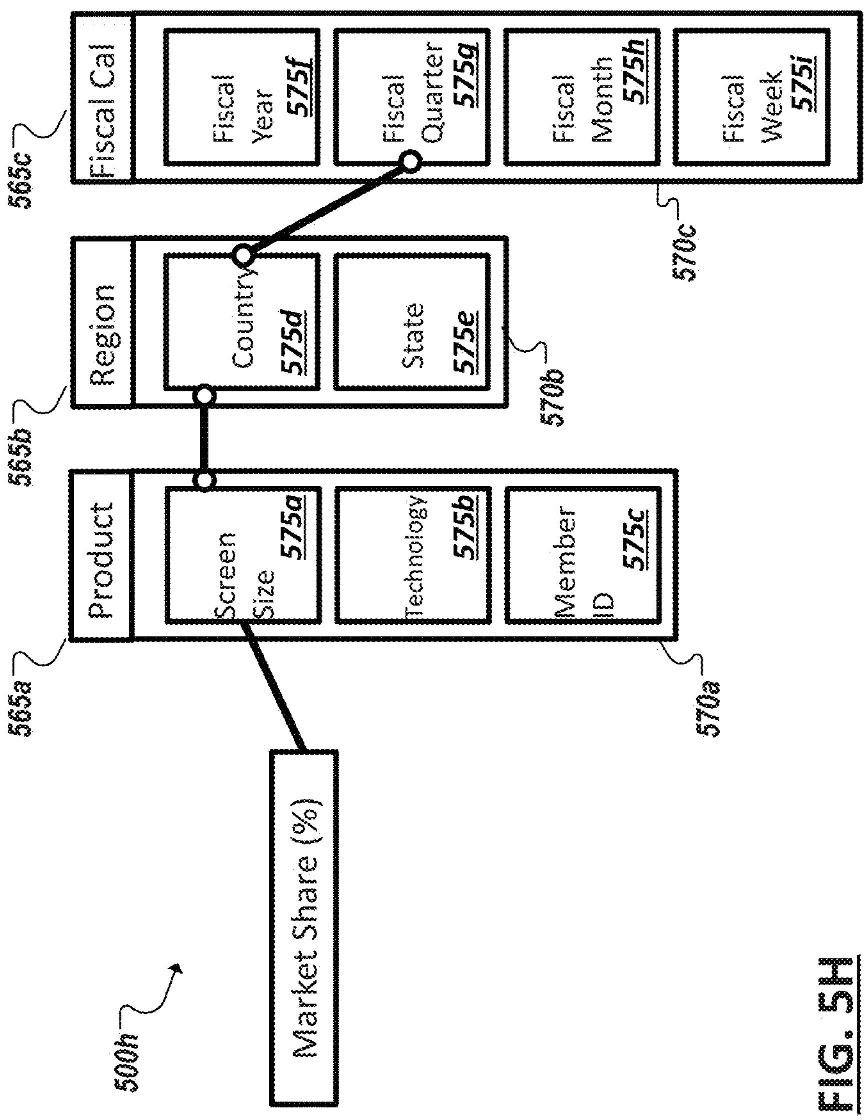

In addition, to allowing analysis and management of input driver and/or outcome measure values at multiple levels of aggregation within a single hierarchy of a single business entity, plan models with multiple business entities (e.g., 565*a-c*) in its domain can in some cases provide for management and manipulation of input drivers and outcome measures at multiple different levels of aggregation across the multiple different business entities and hierarchies defining the domain. For instance, turning to the examples of FIGS. 5H-5G, simplified block diagrams 500*h-i* illustrate how a single input driver or outcome measure can apply to and intersect multiple business entities, members, and member attributes. Accordingly, input driver and/or outcome measure values can be managed at various available levels of aggregation defined by the respective hierarchies of the business entities. To illustrate, an example market share percentage outcome measure can be expressed in terms of multiple business entities, in this example, a Product business entity 565*a*, Region business entity 565*b*, and a Fiscal Calendar business entity 565*c*. Further, within each business entity potential multiple different hierarchies can be provided to arrange members and member groups of the business entity as well as manage values of the outcome measures (and input drivers). For instance, a first hierarchy 570*a* of the Product business entity 565*a* can be organized with a descending hierarchy of member attributes Screen Size→Technology→Member ID defining levels of aggregation 575*a*, 575*b*, 575*c*. Similarly, a particular one (e.g., 570*b*) of the available hierarchies of the Region business entity 565*b* can be utilized with a hierarchy Country→State and levels of aggregation 575*d*, 575*e*, as well with a hierarchy 570*c* of the Fiscal Calendar business entity providing levels of aggregation 575*f*-575*i*.

Figure 5I:
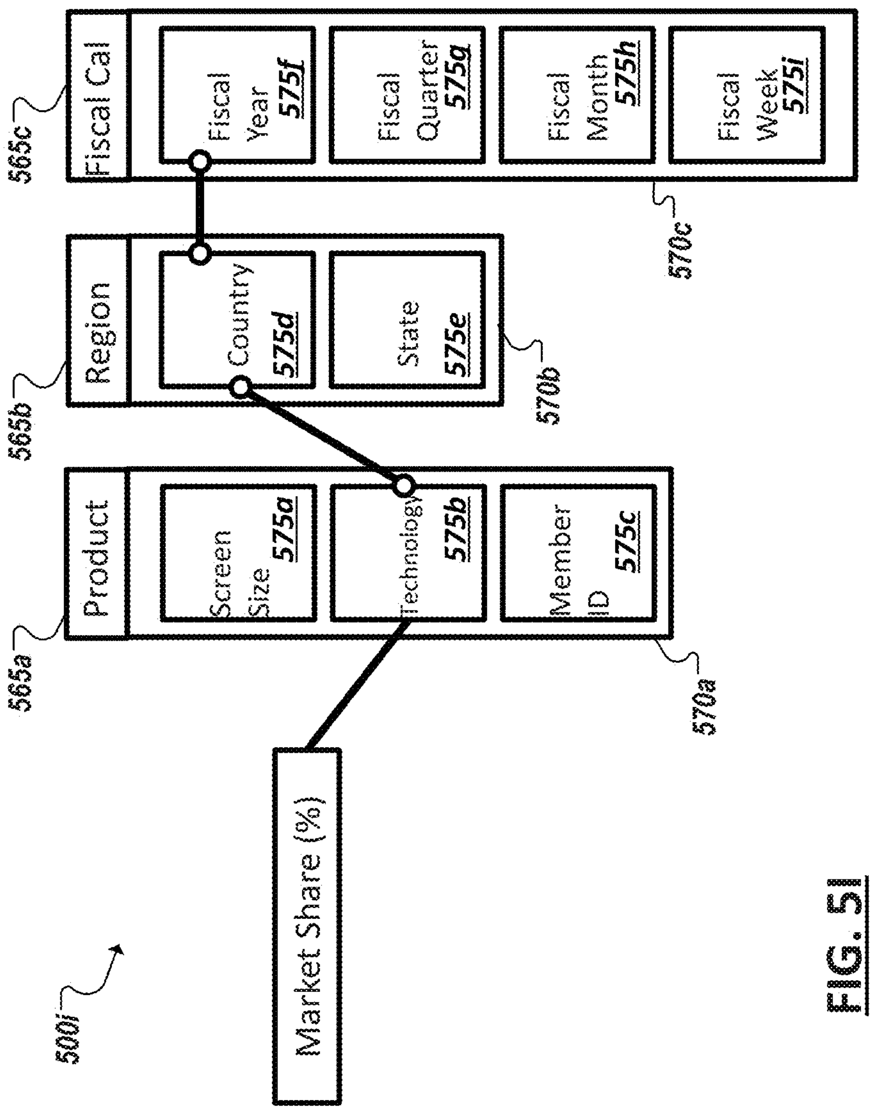

Against the backdrop of this particular example, input drivers and outcome measures can be manipulated and managed at multiple combinations of different levels of aggregation across the three hierarchies 570*a-c* of the three business entities 565*a-c* of the present example. For instance, in the example of FIG. 5H, a market share outcome measure can be viewed and managed at a level of aggregation 575*a* for the Product business entity 565*a*, at a level of aggregation 575*d* for the Region business entity 565*b*, and at a level of aggregation 575*g* for the Fiscal Calendar business entity 565*c*. In the other example of FIG. 5I, outcome measures can be instead managed at different levels of aggregation. For instance, market share values could be analyzed and controlled at a lower level of aggregation 575*b* for the Product business entity 565*a*, at the same level of aggregation 575*d* for the Region business entity 565*b*, and a higher level of aggregation 575*f* for the Fiscal Calendar business entity 565*c*. As should be appreciated, a wide variety of different, alternative combinations of levels of aggregations can be employed in the management of the market share outcome measure (among other input drivers and outcome measures), including other levels of aggregation defined and provided through other alternative hierarchies available through the business entities 5605*a-c* of the example domain of FIGS. 5H-I, as well as any other domain modeled by other plan models developed using these principles. In this way, users of the plan model can have flexible and varied control of information and analytics pertaining to goals and outcomes within a particular domain as well as across multiple different domains.

Figure 6A:
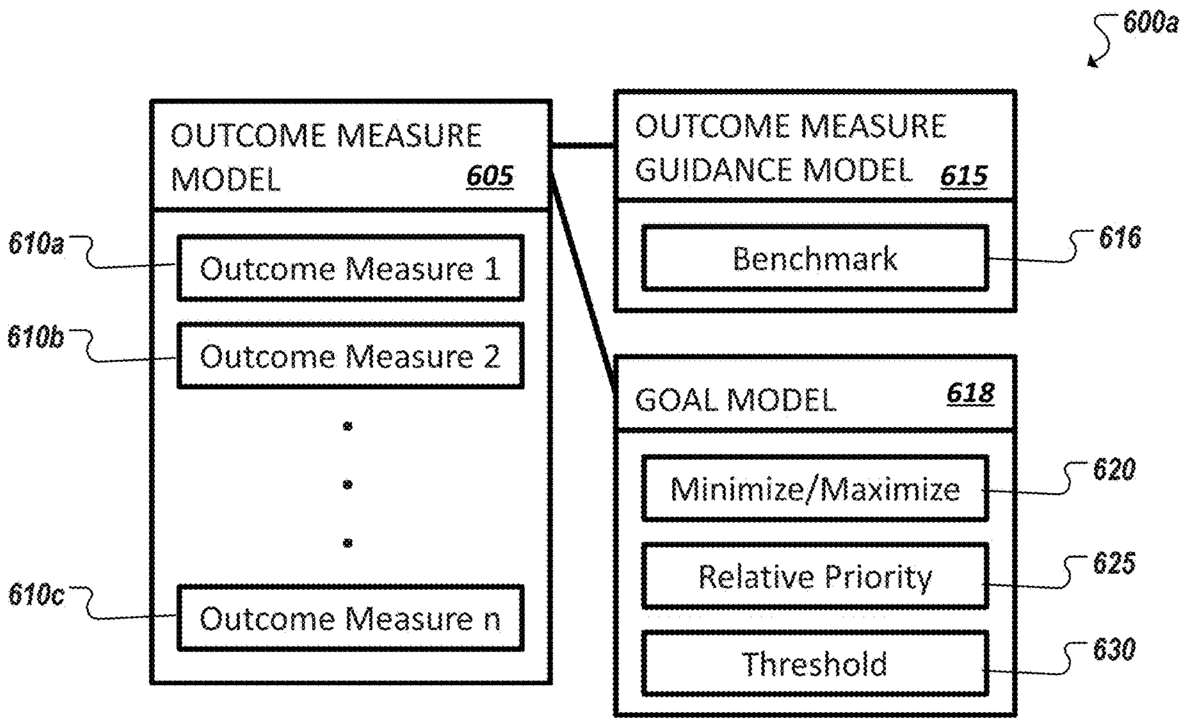
FIG. 6A is a simplified block diagram illustrating an example outcome measures model of an example plan model.
Figure 6B:
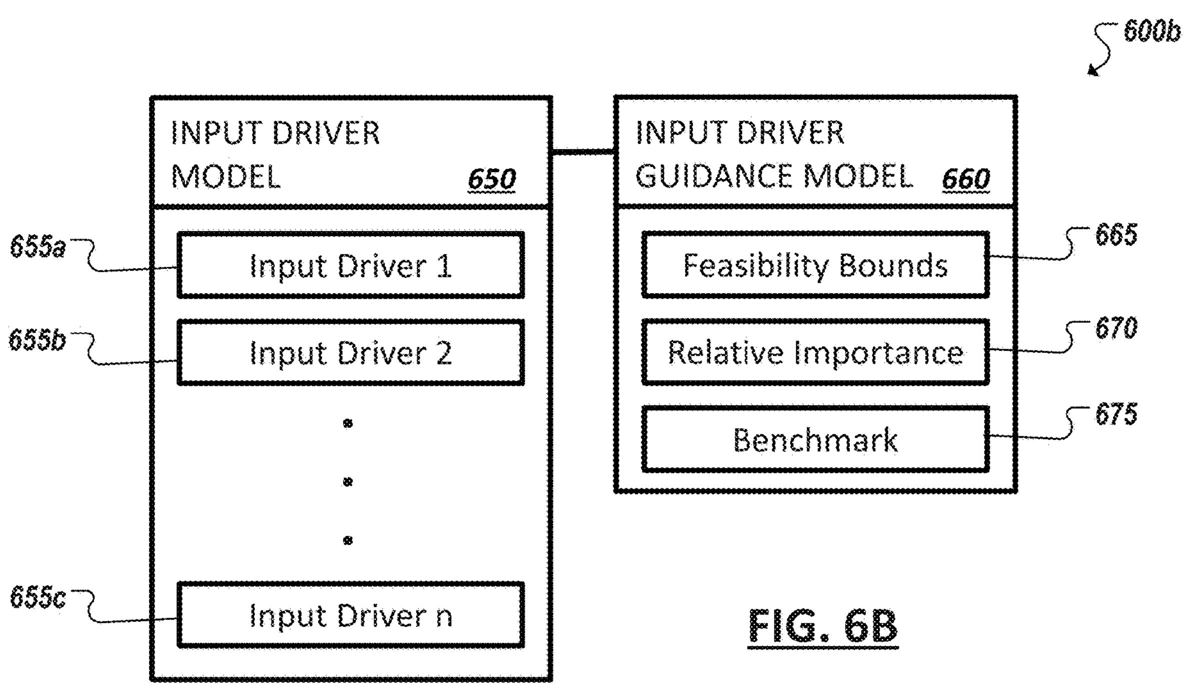
FIG. 6B is a simplified block diagram illustrating an example input drivers model of an example plan model.
Figure 7A:
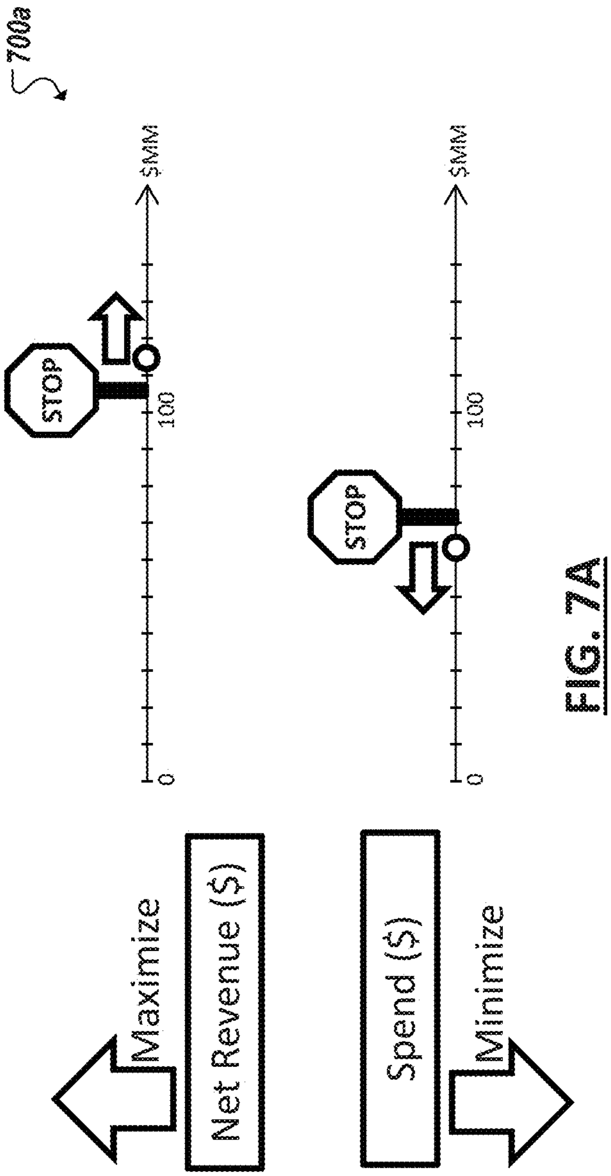
FIGS. 7A-7B are simplified representations of outcome measure guidance in connection with an example plan model.

Turning to FIGS. 6A and 6B, in addition to defining the domain of a particular plan model enabling distinct domain-specific modeling and input and outcome management, a plan model can additionally define the input drivers and outcome measures pertinent to the domain together with parameters and guides for the input driver and outcome measure values. Such parameters and guides can also be used to provide domain-specific guidance to users in their management, manipulation, analysis, and use of domain planning processes, goals, and outcomes modeled through plan model instances.

Turning to the simplified block diagram 600*a* of FIG. 6A, outcome measures of a particular plan model can themselves be modeled in instances of an outcome measures model 605. An outcome measures model 605 can define the outcome measures (e.g., 610*a-c*) pertinent to the domain-specific outcomes and goals modeled by the plan model. Each defined outcome measure can represents an outcome that the plan model will state, predict or attempt to achieve. Further, the outcome measure model 605 can define, for each outcome measure, such attributes as the name, type, unit of measure, etc. of the respective outcome measure. Additionally, a goal model 618 can be defined for the provided in the plan model to define one or more goals of the plan model based on the outcomes modeled by the outcome measure model 605. Further, in connection with the defined outcome measures 610*a-c*, an instance of an outcome measure guidance model 615 can further be provided in connection with the plan model.

The guidance model 615 can be used to model limits or targets of values of the respective outcome measures 610*a-c*. For instance, a guidance model can provide direction or limitations on values of outcome measures, according to one or more guidance rules defined in the outcome measure guidance model 615. For instance, a benchmark model 616 can be included in outcome measure guidance model 615 defining guidance rules such as indicators or limits corresponding to a defined best-in-class, worst-in-class, median, market rank value, etc. Other guidance rules can be defined using other models included in outcome measure guidance model 615.

A goal model 618 can be included in some implementations of plan models and can be used to reference and guide outcome measure values of the plan model. For instance, a goal model 618 can define the goals set for a particular domain modeled by the plan model and can be used as a reference point for scenarios generated using the plan model. In one example implementation, a goal model 615 can define, when applicable, minimize/maximize guidance 620 for each outcome measure 610*a-c*, relative priority guidance 625 for the outcome measures 610*a-c*, and threshold guidance 630 for each outcome measure 610*a-c*, as well as target values for one or more outcome measures 610*a-c* of the plan model. Generally, minimum/maximum guidance 620 can specify, for each outcome measure 610*a-c*, if the objective of the outcome measure should be maximized or minimized in connection with the domain's goal. Relative priority guidance 625 can generally specify the priority between the outcome measures 610*a-c* in the event of conflicts between the outcome measures' other guidance values. Additionally, threshold guidance 630 can generally specify the bounds for each outcome measure's values, such as rules specifying that the value of a corresponding outcome measure not go below a value for a maximization objective (i.e., defined in minimum/maximum guidance 620), or not to go above a value for minimization objective (i.e., defined in minimum/maximum guidance 620), and so on.

Turning to FIG. 6B, input drivers of plan models can also be modeled, for instance, through instances of an input drivers model 650 included within a respective plan model. An input drivers model 650 can define the respective input drivers (e.g., 655*a-c*) pertinent to the plan model's domain and specifying the key variables that influence the outcome measures and domain-specific considerations to be managed by users of the plan model. Further, an input drivers model 650 can also define, for each input driver, such attributes as the name, type, unit of measure, etc. of the respective input driver. Generally, each input driver of a plan model, represent or model particular factors that can exist or decisions that can be made that involve the modeled domain. For instance, input drivers can model decisions that can be under the control of the domain or organization, decisions outside the control of the domain or related organization(s), factors beyond the control of entities internal or external to the domain (e.g., drivers based on environment or market factors), or any combination thereof.

As with outcome measures, input driver guidance models 660 can also be provided to model limits or targets of values of the respective input drivers 655*a-c* and serve to guide users in their management of input driver values and planning using the corresponding plan model. In some implementations, an input driver guidance model 660 can include feasibility bounds guidance 665 for each of the input drivers 655*a-c*, relative importance guidance 670 among the input drivers 655*a-c*, and benchmarking guidance 675 for each of the input drivers 655*a-c*. Generally speaking, feasibility bounds guidance 665 can model assumptions and constraints for values of a given input driver and provide warnings or enforce limits when input driver values are provided in violation of set feasibility bounds, for example. Relative importance guidance 670 can specify the relative impact of an input driver relative to the set of input drivers 655*a-c*, on one or more outcome measures of the plan model. Further, benchmarking guidance 675 can generally specify benchmarking details for provided or set values of each of the input drivers 655*a-c*, among other potential examples.

Continuing with the discussion of outcome measures, input drivers, and corresponding guidance models that can be applied to improve, guide, and constrain construction and selection of planning and goal scenarios, analyses, and other uses of a plan model, FIGS. 7A, 7B, 8A, and 8B are provided illustrating simplified block diagrams 700*a-b*, 800*a-b* representing examples presented to illustrate particular features of example guidance rules that can be defined in guidance models (e.g., 615, 660) or goal models (e.g., 618) employed in example plan models. For instance, turning to the example of FIG. 7A, minimize/maximize guidance is represented for two example outcome measures, Net Revenue and Spend, within a particular plan model. Within a particular domain, it can be a goal to maximize net revenue generated in the domain while minimizing total costs of the domain (e.g., to maximize profit). Accordingly, for this particular plan model, minimize/maximize guidance can be defined within a goal model of the particular plan model setting rules or guidelines for at least the Net Revenue and Spend outcome measures of the plan model that their values be respectively maximized or minimized when possible. Further, minimize/maximize guidance can further define threshold values for respective outcome measures, either ceilings or floors for the respective values of the corresponding outcome measures. For instance, in the example of FIG. 7A, minimize/maximize guidance for the Net Revenue outcome measure can be set guidance or rules to promote maximization of the Net Revenue outcome measure values and not allowing the value of Net Revenue to fall beneath a value of $105 MM, as an example.

Figure 7B:
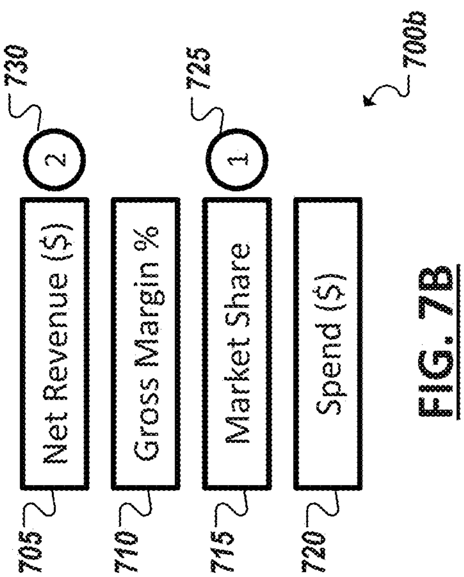

In the simplified block diagram 700*b* of FIG. 7B, relative priority guidance for outcome measures of a plan model is represented. In some instances, set goals, rules, or guidance for different outcome measures in a plan model can conflict. For instance, as in the example of FIG. 7A, in some cases the minimization of costs can be in direct conflict with the maximization of net revenue. Relative priority guidance can provide rules for resolving conflicts between outcome measures and the respective guidance rules applied to them to define a hierarchy of tradeoffs that can be exercised in the establishing or calculating of outcome measures during the use of the plan model. For instance, in the example of FIG. 7B, relative priority guidance can be set (e.g., by a user or developer of the corresponding plan model) for one or more of the outcome measures 705, 710, 715, 720. For instance, a Market Share outcome measure 715 can be assigned priority position "1" (725) giving the values and goals of the Market Share outcome measure 715 priority over all the remaining outcome measures (e.g., 705, 710, 720) in the corresponding plan model. Further, the next highest priority (730) can be assigned for Net Revenue outcome measure 705, giving it priority over all other outcome measures (e.g., 710, 720) with lesser priorities defined in priority guidance. Further, some outcome measures (e.g., 710, 720) can be assigned no priority meaning that the system is free to resolve conflicts between unprioritized outcome measures (e.g., 710, 720) any way it deems fit. However, when conflicts arise between an outcome measure and another outcome measure of higher priority, the outcome measure with higher priority takes precedence. For example, minimize/maximize guidance for outcome measures Net Revenue 705 and Market Share 715 may dictate that values of the outcome measure 705, 715 be maximized. However, if maximization of the Net Revenue 705 value conflicts with realizing a potentially higher, or maximum value for Market Share 715, priority guidance can indicate or even resolve the conflict by treating maximization of Market Share 715 as a priority over maximizing Net Revenue, among other potential examples. Similar principles can be applied to relative importance rules (e.g., at 670) for input drivers.

Figure 8A:
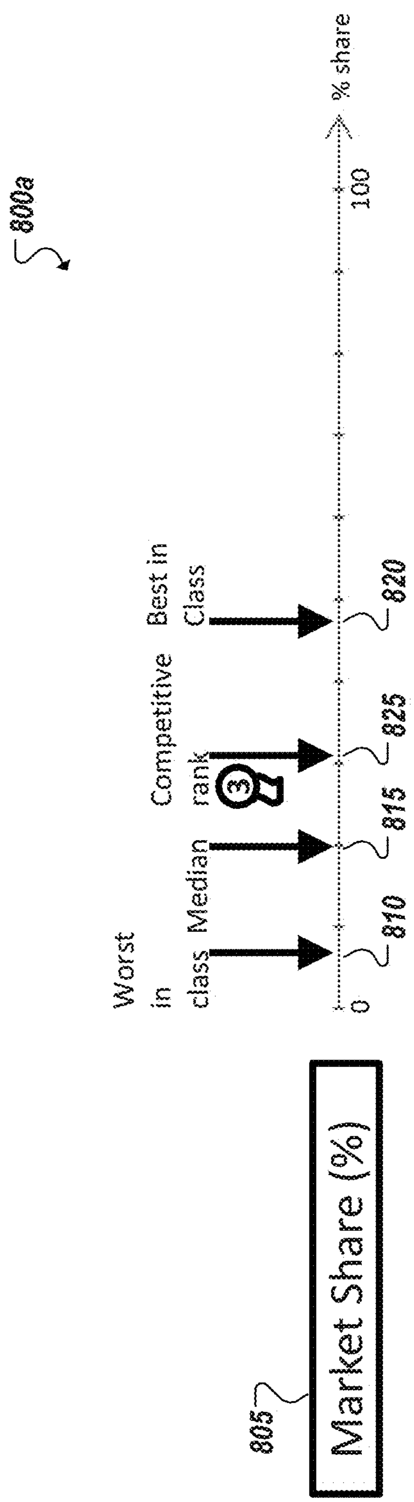
FIGS. 8A-8B are simplified representations of input driver guidance in connection with an example plan model.

Turning to the example of FIG. 8A, a simplified block diagram 800*a* is shown representing an example benchmarking guidance for a Market Share input driver of an example plan model. Similar principles can be applied in benchmarking guidance defined and applied for outcome measures (e.g., through benchmark model 616). Benchmarking guidance can designate various benchmark values for a corresponding input driver or outcome driver such as values that would make the value the best in class within a market, worst in class within the market, a certain rank relative other values in the market, a mean value within the market, etc. Such benchmarks can be established from historical and competitive data collected relating to the plan market's domain. Statistical methods and other techniques can also be applied to determine benchmarks for a particular input driver or outcome measure. Further, input driver (or outcome measure) values can be designated as being fixed at certain benchmark thresholds, for instance, through a rule or guide that a particular input driver's value not fall below a top 3 rank among competitors, not fall below a median or mean value, or fall to a worst in class designation, among other examples. In the particular example of FIG. 8A, benchmarking guidance for values of an example Market Share input driver 805 can define a number of benchmarks including a worst in class value 810, median value 815, and best in class value 820. Further, ranking benchmarks can be defined, for instance, input driver 805 values of 31% market share can be defined as claiming a third place competitive rank 825 among other competing organizations, departments within the same organization, or other competing entities.

Figure 8B:
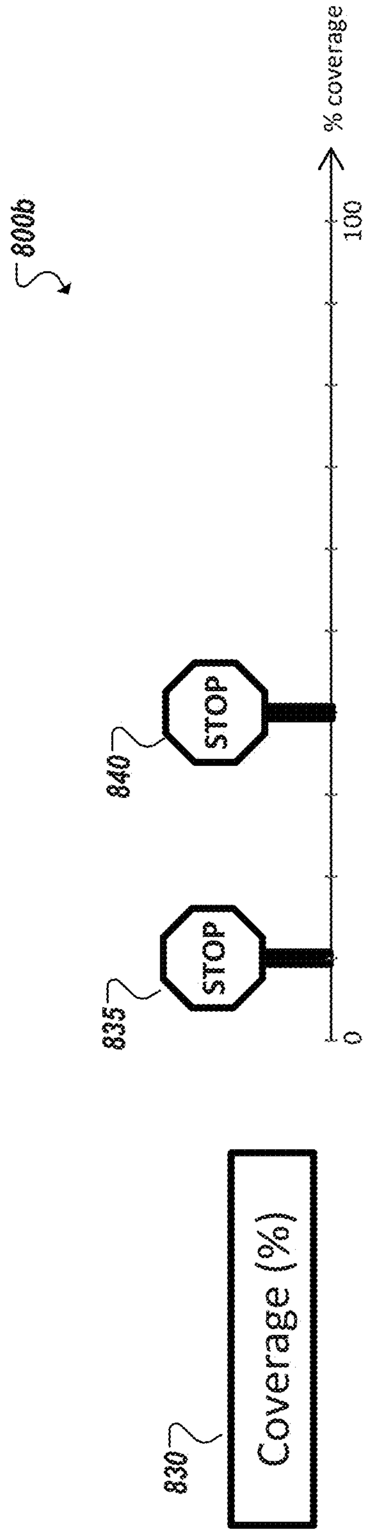

Turning to the example of FIG. 8B, a simplified block diagram 800*b* is shown representing example feasibility bounds guidance for a channel coverage input driver 830 of an example plan model. Feasibility bounds guidance can model or define assumptions and constraints that should be enforced or otherwise guide values of the corresponding input driver. For instance, feasibility bounds guidance can model upper bounds or lower bounds of a particular input driver value. In the example of FIG. 8B, a lower bound 835 of 10% coverage is set for values of the example channel coverage input driver 830 and a value of 40% is set for the upper bound 840. Feasibility bounds can correspond to limits, either actual, desired, or predicted, on the acceptable or feasible values of an input driver within the context of a particular domain. Other feasibility bounds can also be defined, for instance, with some bounds representing a conservative feasibility estimate and a second set of bound representing a more generous or optimistic feasibility estimate. Further feasibility bounds can be combined, in some implementations, with benchmarking guidance to set bounds that correspond with a particular benchmark, such as a worst in class rating, best in class rating, particular competitive rank, etc.

Input driver and outcome measure guidance can be used to alert or deny a user attempting to change or modify corresponding values in the use of a plan model. Additionally, input driver and outcome measure guidance can be used to define default or starting values for instances of a particular plan model. Guidance rules can be enforced to constrain or limit the ability of particular values to be entered for corresponding input drivers and outcome measures, or alternatively, can provide guidance (e.g., through GUI presentations) indicating whether proposed values (or which values) comply or do not comply with a guidance rule for the input driver or outcome measure (e.g., but not limiting the ability of the value to be applied to the plan model, in some instances). In general, input driver and outcome measure guidance provide metrics and constraints corresponding to real world decisions, factors, and inputs involved in a domain as well as the goals of the domain modeled through a respective plan model. Further, as with the values of input drivers and outcome measures, and attributes of the plan model (e.g., scope model definitions, member models, etc.), users can also have control over the defined limits, rules, and guides within input driver and outcome measure guidance of a plan model, allowing users to adjust the plan model to change assumptions as well as allowing users to perform hypothetical modeling using different guidance rules, and so on.

Figure 9A:
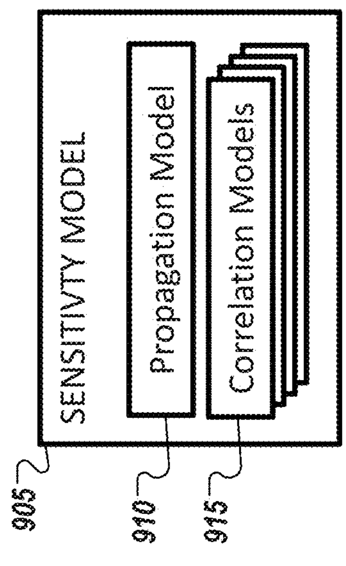
FIGS. 9A-9D are simplified block diagrams illustrating example features of an example sensitivity model of an example plan model.

Planning and outcomes within a domain can be further modeled based on the domain-specific relationships between input drivers and outcome measures defined for the domain in a plan model. Turning to the example of FIG. 9A, a simplified block diagram 900*a* is presented representing an example implementation of a sensitivity model 905 included in a plan model. Sensitivity models 905 can model the sensitivity of various outcome measure values on changes to the values of one or more input drivers specific to the corresponding domain of the respective plan model. Further, sensitivity models 905, in some implementations, can additionally model aggregation relationships, including logic and formulas for calculating how an input driver value or outcome measure value can be disaggregated or split among member groups at varying levels of aggregations. Still further, in some instances, some input driver values can be at least partially dependent on other input driver values and, similarly, outcome measure values can be at least partially dependent on other outcome measure values. Accordingly, sensitivity models can further model these dependencies and sensitivities between values of input drivers on other input drivers and outcome measures on other outcome measures.

In one illustrative example, plan model sensitivity models 905 can include a propagation model 910 and one or more correlation models 915. A propagation model 915 can define a propagation sequence for how changes to defined input driver values (or outcome measure values) affect other input drivers' and outcome measures' values. The propagation sequence can define an order or path for how value changes cascade through other related input drivers and outcome measures. Correlation models 915 can be specified for each input driver and/or outcome measure and specify the function(s) and/or algorithm(s) used to compute how values of an outcome measure relate to, depend on, and are sensitive to values of the outcome measures and/or input drivers that influence its value. Respective correlation models 915 can model particular sensitivities and dependencies of all input drivers and/or outcome measures in a plan model. Further, all or a portion of a correlation model can be generated through automated techniques, including the use of data mining (to discover trends and relationships between market entities), regression analysis, design of experiments, and other analysis methods, among other example techniques.

Figure 9B:
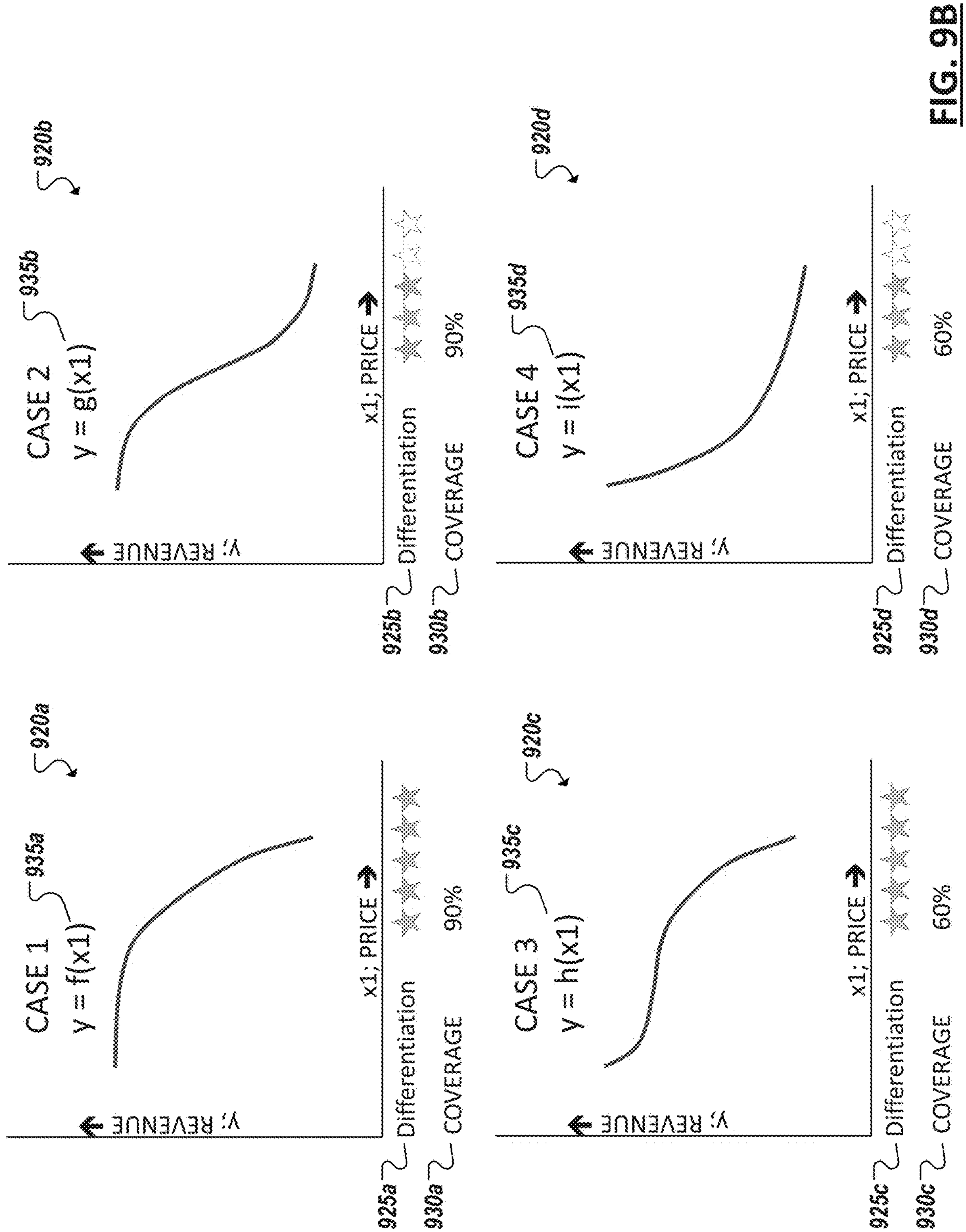

Turning to the example of FIG. 9B, a set of graphs 920*a-d* representing an example portion of a correlation model modeling the multi-dimensional dependence of a single outcome measure on multiple input drivers. The correlation model can additionally model the dependence of input drivers on outcome measures (and other input drivers). Indeed, a correlation model can treat both input drivers and outcome measures as arguments of a function that represents a relationship between any one input driver or outcome measure. For instance, in the present example of FIG. 9B, a portion of a correlation model is represented of a relationship, or dependency, of values of an outcome measure Revenue (represented along the y axes of graphs 920*a-d*) on values of an input driver Price (represented along the x axes of graphs 920*a-d*). The example Revenue outcome measure can be further based on values of other input drivers including a Product Differentiation input driver (e.g., 925*a-d*) and Channel Coverage input driver (e.g., 930*a-d*). For instance, as shown in the example of FIG. 9B, the relationship between Revenue and Price can be based on a first formula 935*a* when the value of Product Differentiation 925*a* indicates a high level of product differentiation and the value of Channel Coverage is 90%, the formula 935*a* indicating that revenue decreases slowly as price increases (e.g., suggesting that demand is less sensitive to price increases when high product differentiation and channel coverage exist). Further, when product differentiation 925*b* is average but channel coverage is high, the relationship between Revenue and Price can be defined by a different formula 935*b*, as shown in the graph 935*b*, illustrating how values of other input drivers (e.g., 925*a-d* and 930*a-d*) can affect the relationship and sensitivity (i.e., dependence) of one particular outcome measure on one particular input measure, as further shown in the graphs 935*c-d* of formulas 935*c-d.*

The formulas and algorithms embodied and defined in sensitivity models can capture complex dependencies between outcome measures and input drivers, including multi-dimensional dependencies such as in the example of FIG. 9B. For instances, in some examples, a dependency can involve a lead time between a change in an input driver value and changes to values of input drivers and/or output measures dependent on the input driver. Accordingly, in some examples, correlation models can include a lead time function or component as a part of the correlation model, a lead time function defining an amount of time for the impact of a change in an input driver to be observed in other input drivers or outcome measures, among other time-based dependencies on the input driver. As an example, an increase in Marketing Spend to run an ad campaign to increase product awareness can be modeled as creating a two-week delay before correlative changes are observed at an Awareness outcome measure representing the product awareness outcome. In short, correlation models can define algorithms and formulas at varying degrees of complexity to model the domain-specific dependencies between input drivers and outcome measures, as well as between input drivers and other input drivers and between outcome measures and other outcome measures.

In some implementations, a sensitivity model can additionally allow for some input drivers and/or outcome measures that do not have a corresponding correlation function. In such instances, a sensitivity model can allow for user inputs or other outside inputs to specify, temporarily or persistently, a value for the input driver or outcome measure. In still other instances, the lack of a defined corresponding correlation function can permit the sensitivity model to also define, temporarily or persistently a dependency or formula for defining or calculating the value, among other examples. Further, the relationships and formulas underlying correlation models can be automatically generated through statistical modeling and analysis of data relating to input drivers and outcome measures of the domain.

Figure 9C:
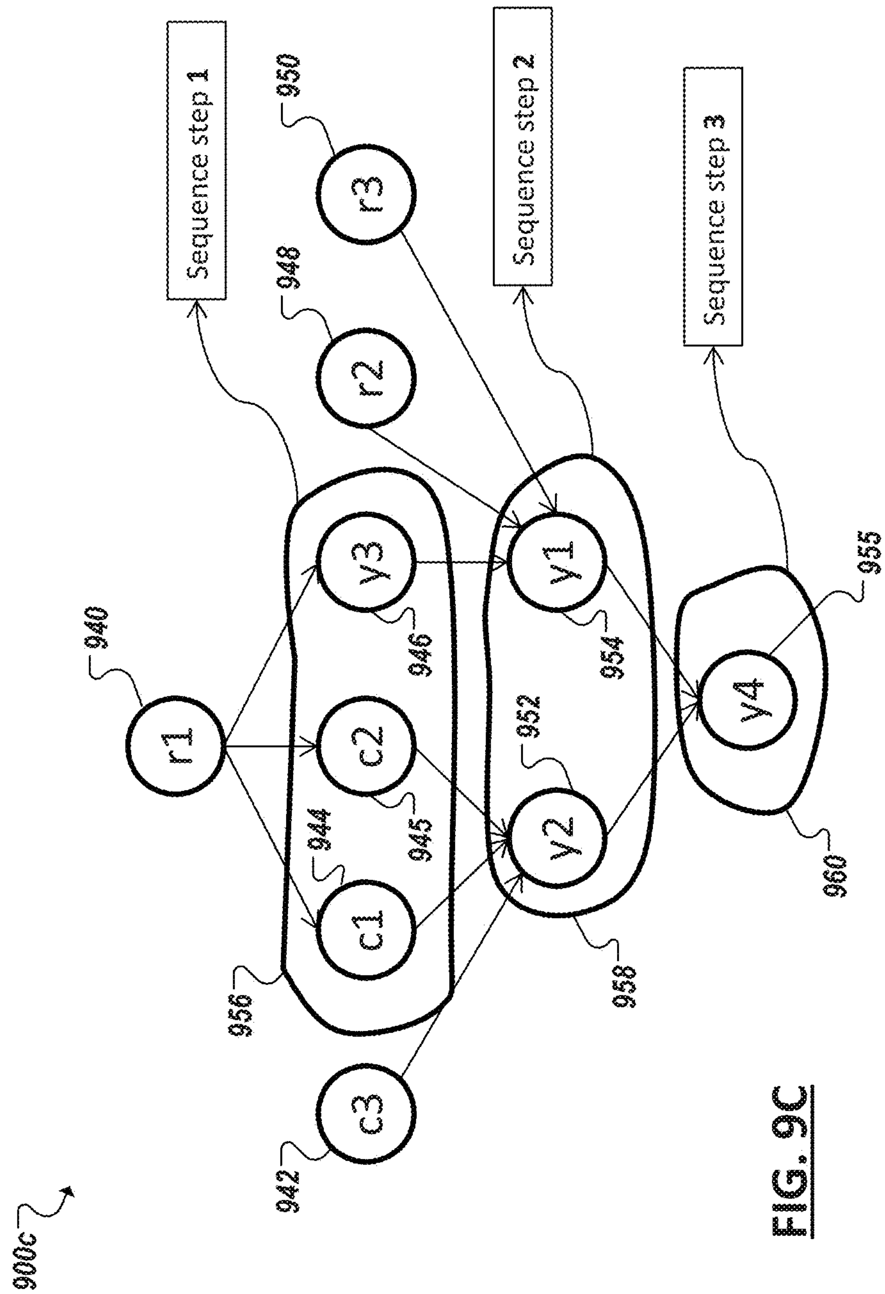

Turning to FIG. 9C, a simplified block diagram is shown illustrating principles of an example propagation model of an example plan model. Generally, a propagation model can specify, for each input driver or outcome measure of a plan model, the sequence of how changes to values of the specific input driver or outcome measure propagate to affect values of other input drivers and outcome measures in the plan model. Indeed, propagation models can be generated from or based upon (and in some cases, automatically generated from) a collection of correlation models defining the interrelationships of the input drivers and outcome measures of the plan model. Further, a propagation model can additionally enforce constraints to prevent circular references and other conditions. Additionally, propagation models can be used to dictate events allowing or requesting user inputs, such as in instances where an input driver (or outcome measure) is identified in a propagation sequence that lacks a correlation model, among other examples. Additionally, visual representations of a propagation sequence can be generated from propagation models for presentation on a display device to users, for instance, in connection with a scenario planning session based on a corresponding plan model, among other examples.

In the particular example of FIG. 9C, an example propagation sequence is illustrated as modeled by an example propagation model. As another illustrative example, FIG. 9C includes a simplified block diagram 900*c* showing how a variety of different example outcome measures and input drivers can be interconnected within the context of a particular example plan model. Such example input drivers and outcome measures can correspond to such domain-specific variables, decisions, and outcomes as Profit, Revenue, Cost of Goods Sold (COGS), Spend, Sales Volume, Channel Coverage, Coverage Spend, Sales Incentive Spend, Product Differentiation, Price, among potential others. Consequently also, a web of potential propagation sequences (and correlation models) can be defined for the various interconnections and dependencies of values of input drivers and outcome measures represented in the particular example of FIG. 9C. For instance, Profit can be a function of Revenue, COGS and Spend; Revenue can be a function of Price and Volume; Volume a function of Coverage and Differentiation; and so on. Further, the propagation model of the example plan model can include logic that disallows situations where infinite loops of evaluation can occur, such as circular references. For instance, because Sales Incentive is a function of Profit, Profit is a function of Spend, and Spend is a function of Sales Incentive Spend in this example, the propagation model can halt, suspend, or otherwise guard against evaluation through an infinite loop due to this inherent circular reference between corresponding input drivers and outcome measures.

Figure 9D:
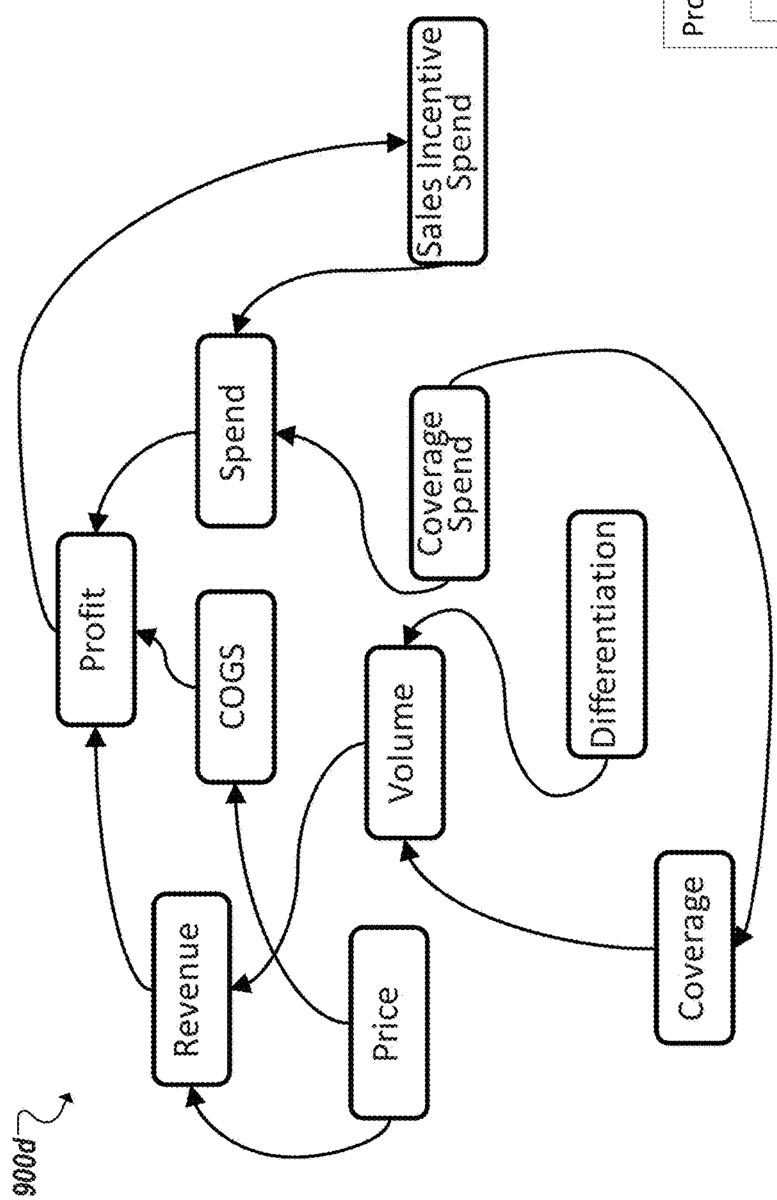

Turning to the example of FIG. 9D, a propagation model can define how a value or value change of a particular input driver (or outcome measure) propagates to and affects values of other input drivers and/or outcome measures. For instance, in the example of FIG. 9D, an example propagation sequence based on changes to values of input driver 940 can involve a plurality of other input drivers (e.g., 942, 944, 945, 948, 950) and a plurality of outcome measures (e.g., 946, 952, 954, 955). Other examples can include more or fewer input drivers and/or outcome measures, and in some instances, a single outcome measure or a single input driver, among other examples. In the particular example of FIG. 9D, the values of two other input drivers 944, 945 and an output measure 946 can be dependent on and affected by changes to the value of input driver r1 (940). This can be considered a first sequence step 956. As the values of input drivers 944, 945 and outcome measure 946 are at least partially dependent on input driver r1 (940), other input drivers and outcome measures (e.g., 952, 954) dependent on input drivers 944, 945 and outcome measure 946 can also be affected by the change to the value of input driver r1 (940). As input drivers and outcome measures can be dependent on values of multiple different other input drivers and outcome measures, subsequent sequence steps (e.g., 958) defining a propagation sequence for changes to the value of input driver r1 (940) can also be dependent on (and wait for) values of these other input drivers and outcome measures (e.g., 942, 948, 950). Some dependent input drivers (e.g., 944, 946) and outcome measures (e.g., 946) may only be a single sequence removed from the first input driver r1 (940), while others values are more removed within the propagation sequence, such as outcome measures 952, 954, 955 affected at second (958) and third sequence steps of this particular example propagation sequence.

It should be appreciated that the examples of FIGS. 9C and 9D (and other examples herein) are non-limiting examples provided merely for illustrating certain principles and features of this Specification. Propagation models (among the other models described herein) can be flexibly tailored to model any variety of propagation sequences involving any variety of combinations of input drivers and outcome measures commensurate with the modeling of particular outcomes of particular modeled domains.

Figure 10A:
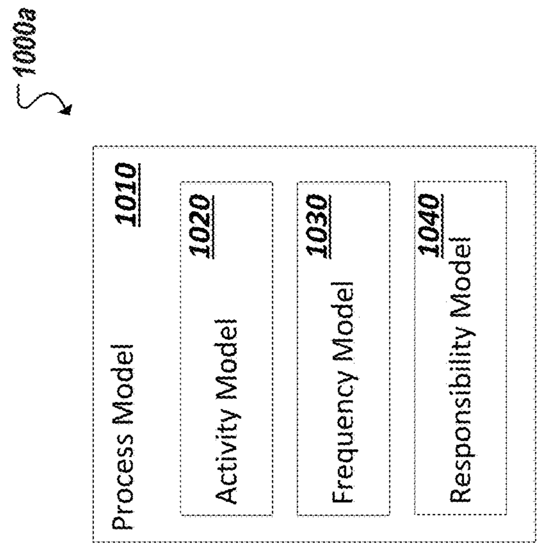
FIG. 10A is a simplified block diagram illustrating an example process model of an example plan model.

Turning to FIG. 10A, in some examples, in addition to including a scope model, input drivers models, sensitivity models, and outcome measures, a plan model can include other models used in the modeling of a domain's goals and enhancing use of the plan model itself, such as in scenario planning activities based on the plan model. In one example, as shown in the simplified block diagram 1000 of FIG. 10A, a plan model can further include a process model 1010 that further relates to the input drivers and outcome measures of the plan model. A process model, for instance, can specify the timing of planning activities designated for the corresponding plan model. For instance, in one example implementation, process models 1010 can include an activity model 1020, frequency model 1030, and responsibility model 1040, among potentially others. A process model 1010, in some instances, can be used to facilitate coordination between plan models of differing domains and potentially managed by different users by describing the various activities and tasks associated with the plan model, the timing of those activities (e.g., to assist in synchronizing use of the different plan models), and the users and parties responsible for those activities and/or the plan models themselves. In some implementations, a process model 1010 can adopt principles of responsibility assignment matrices, linear responsibility charts, and other protocols describing the participation by various roles in completing activities cross-functional and cross-departmental projects and activities, such as RACI, CAIRO, DACI-based process models, etc.

An activity model 1020 of an example process model can define planning activities of an organization relating to or using the plan model to which the process model 1010 belongs. An associated frequency model 1030 can define the timing of these planning-related activities, including the frequency at which the activities begin and end (e.g., daily, weekly, hourly, etc.), as well as more precise calendaring of activities that take place at less periodic intervals. With this information, planning activities involving multiple different plan models can be coordinated according to the respective planning activities defined for the respective plan models. In addition to activity 1020 and frequency models 1030, process models can further include a responsibility model 1040 identifying particular users, user groups, departments, etc. responsible for the planning activities described in the activity model 1020 as well as the plan model itself. Such models 1040 can be used as well in collaborative planning activities allowing users to identify other users responsible for other plan models linked to or otherwise involved in a planning activity, among other examples.

Figure 10B:
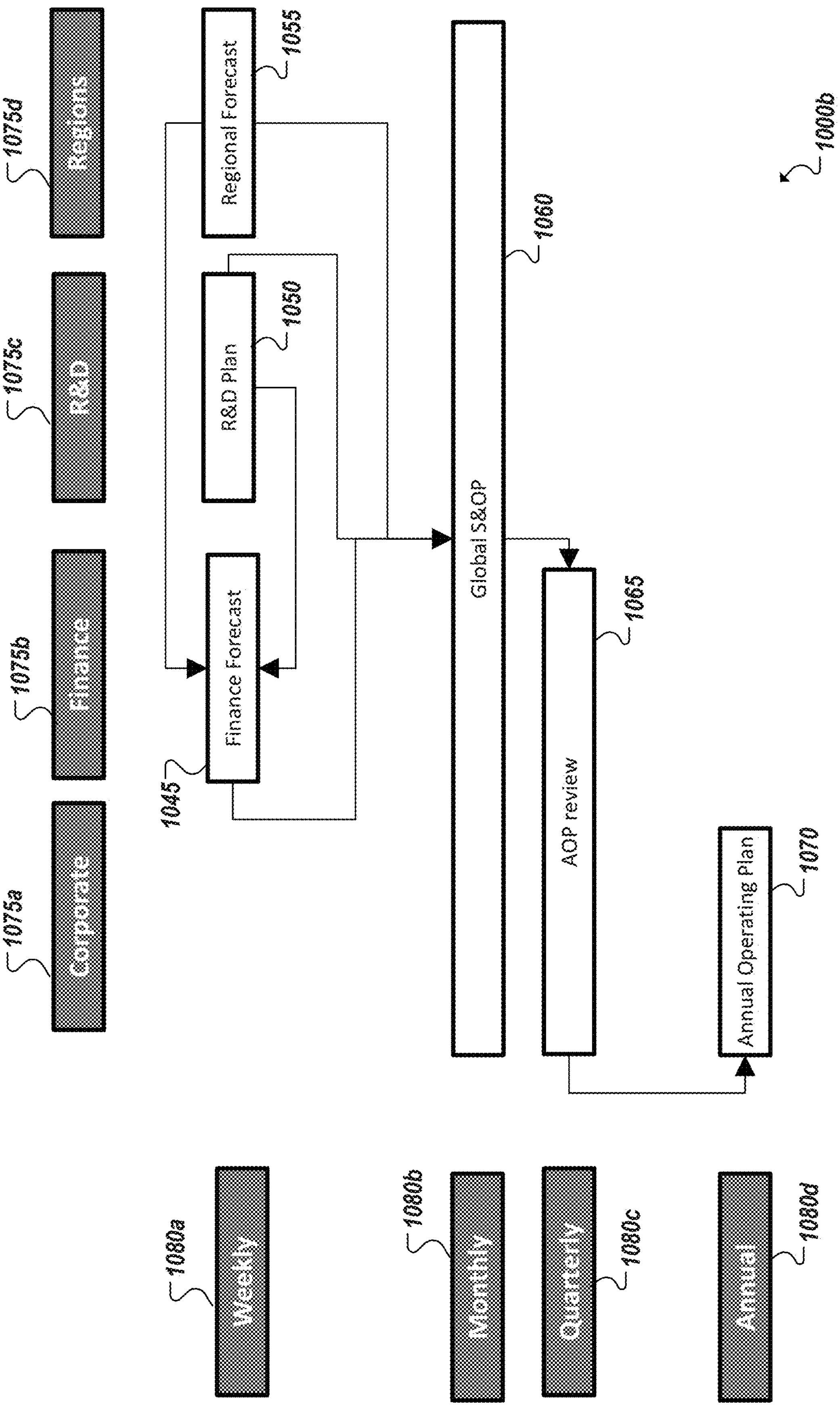
FIG. 10B is a simplified block diagram representing a set of plan model activities defined using example process models of the respective plan models.

The example of FIG. 10B illustrates some principles and features enabled through example process models, such as the example process model shown and described in the example of FIG. 10A. For instance, in the simplified block diagram 1000*b* of FIG. 10B, a set of interconnected plan models 1045, 1050, 1055, 1060, 1065, 1070 are shown modeling outcomes in domains of an example organization such as finance forecast (e.g., 1045), research and development (e.g., 1050), regional forecasting (e.g., 1055), global sales and operation (e.g., 1060), adjusted operating profit review (e.g., 1065), and annual operating plan (e.g., 1070) among other potential plan models and other examples. Each of the plan models 1045, 1050, 1055, 1060, 1065, 1070 can have respective process models modeling activities using the corresponding plan model, such as the development of certain scenarios, such as a plan of record for the organization, or other planning activities. As represented in FIG. 10B, the process models of the plan models 1045, 1050, 1055, 1060, 1065, 1070 can identify particular departments or user groups (e.g., 1075*a-d*) that is responsible for the activity or to which the plan model belongs. Some plan models (e.g., 1045, 1050, 1055, 1070) can be belong to or be associated with a single department, while other plan models (e.g., 1060, 1065) are controlled by multiple departments in concert. For example, both a Corporate group 1075*a* and Finance group 1075*b* can be defined (in a corresponding process model) as responsible for generating a plan of record scenario (as well as other scenarios) using the AOP Review plan model 1065. Further, in addition to indicating an activity and a group (e.g., 1075*a-d*) responsible for performing the activity, process models can also define the timing of the activity. For instance, a plan of record scenario activity can be defined as being generated on a weekly basis (e.g., 1080*a*) for plan models 1045, 1050, 1055, monthly basis (e.g., 1080*b*) for plan model 1060, a quarterly basis (1080*c*) for plan model 1065, and annually (e.g., 1080*d*) for plan model 1070. The process models of interconnected plan models 1045, 1050, 1055, 1060, 1065, 1070 can thereby assist users in coordinating and managing activities that could potentially be impacted by or influence other plan models in the interconnected network of plan models, among other examples.

As noted above, a single plan model can be but a single plan model in a network of plan models for an organization (or group of organizations). Indeed, plan models can be adapted to be interconnected with other plan models in a network of plan models. As each plan model is tailored to a particular objectives and goals of a particular, defined domain, a network of interconnected plan models, each corresponding to a distinct domain, can provide a powerful system of software-based models enabling interactive, quick, collaborative decision making across the different plan models and, consequently, across multiple different, corresponding domains of an organization. Each plan model can independently model goals of its particular domain as well as be adapted to interconnect to other plan models to generate multi-domain scenarios and perform multi-domain planning activities using multiple plan models. In some implementations, process models of the respective plan models can assist in facilitating such multi-plan model activities.

Figure 11A:
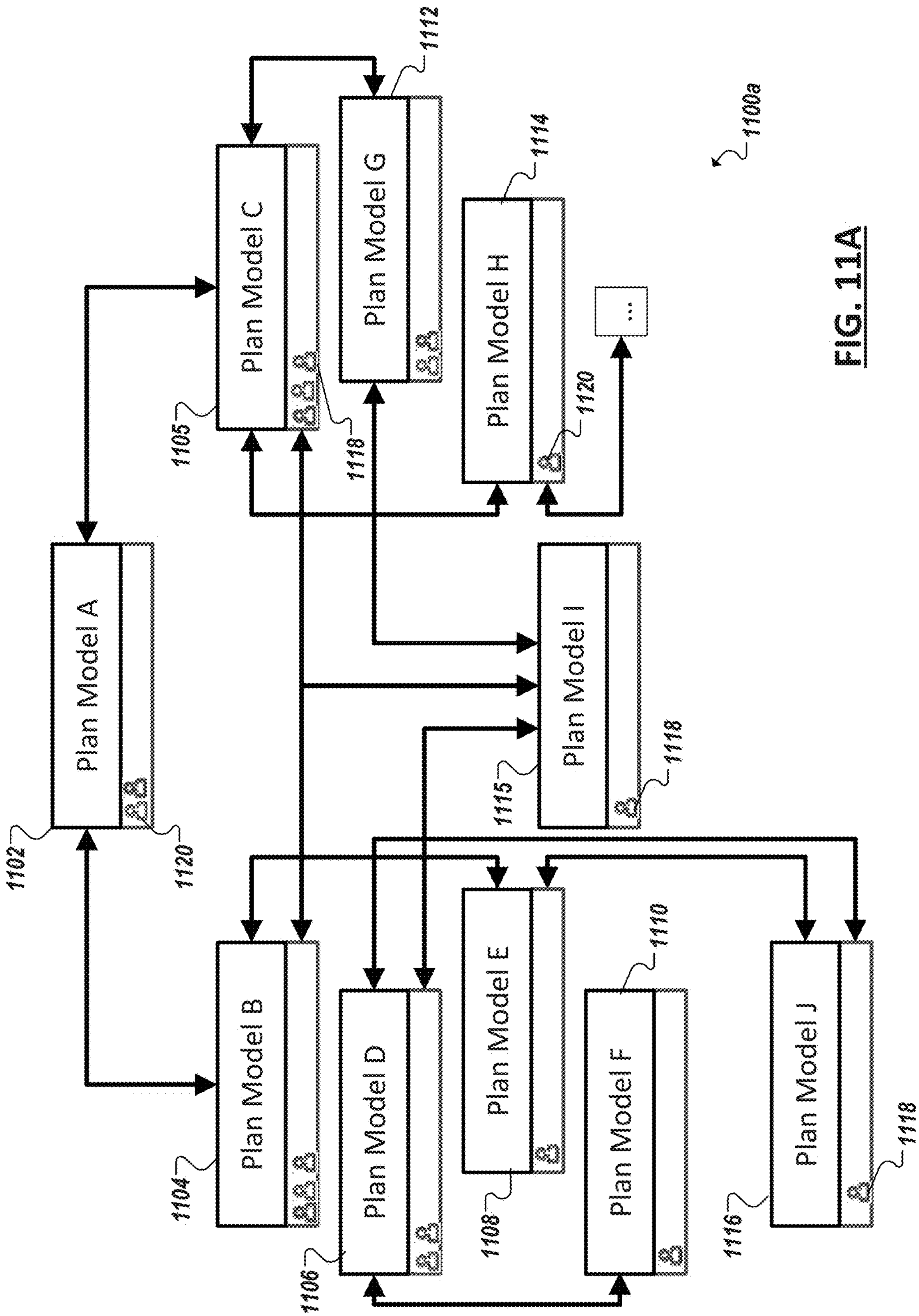
FIGS. 11A-11B are simplified block diagrams illustrating example networks of plan models.

Turning to the example of FIG. 11A, a simplified block diagram is shown representing a network 1100 of plan models (e.g., 1102, 1104, 1105, 1106, 1108, 1110, 1112, 1114, 1115, 1116). Plan models in the network 1100 can be interconnected with one or more different other plan models in the network 1100 based on one or more input drivers of the plan model being dependent on one or more outcome measures (or even input drivers) of another plan model in the network 1100. Further, a plan model in the network 1100 can also be interconnected with other plan models in the network 1100 by virtue of an outcome measure (or input driver) of the plan model driving values of input drivers of the other plan model. Each plan model in the network 1100 with respective included scope models, input drivers models, outcome measures models, sensitivity models, process models, etc. The respective models of each plan model in the network 1100 can be tailored to model outcomes for a particular, distinct domain within the network, including representative scope models, sets of input drivers and outcome measures, etc.

Further, different users (or groups of users) (e.g., 1118, 1120) within an organization (or organizations) of the network 1100 of plan models can be assigned to or associated with particular plan models in the network 1100. Such associations can be based, for instance, on the users' respective roles, office locations, departments, etc. within the organization, with particular plan models being made available to those users corresponding to the particular defined domain of the respective plan model. As a simplified example, a particular user can be a manager of a particular department of an organization that is responsible for one or more different product lines. As the particular user 1118 can be responsible for managing, planning, and making decisions within this particular realm of the organization, the particular user 1118 can be associated with plan models that relate to the user's role, such as plan models (e.g., 1105, 1115, 1116) with domains corresponding to the particular department or constituent product lines of the user. Being associated with the plan models can authorize access and use of the respective plan models 1105, 1115, 1116 associated with the user in some instances. Other users not associated with the plan models 1105, 1115, 1116 may be blocked or limited in their ability to access and use the plan model 1105, 1115, 1116. However, other users (e.g., 1120) can be associated with other plan models (e.g., 1102) with domains more pertinent to their role within an organization. Some users can be associated with multiple plan models based on their role(s) within the organization, among other examples.

Dependencies between values of outcome measures (or other input drivers) of one plan model and input drivers (or outcome measures) of another plan model can be defined through link expressions. Link expressions can be specific to a single input driver-outcome measure pair (or input driver-input driver or outcome measure-outcome measure pair) of a plan model and define such aspects of the relationship as the algorithms and functions determining the sensitivity and dependence of the input driver on the outcome measure (e.g., analogous to correlation models of plan models' individual sensitivity models), as well as aggregation and disaggregation relationships (i.e., allowing modeling of the effects of inter-plan-model dependencies at their respective levels of aggregation), filter conditions applicable to the input driver-outcome measure pair, and so on. Linking expressions can further utilize established dimension- and attribute-based relationships between members of two or more different plan models linked through the link expressions.

Linking of plan models can allow for analysis of one or more plan models as the focus of a planning activity (e.g., the "focus plan models" of the planning activity), based at least in part on the dependencies of the focus plan models on other plan models to which they are linked through link expressions (or the "linked" plan models of the focus plan models.

Figure 11B:
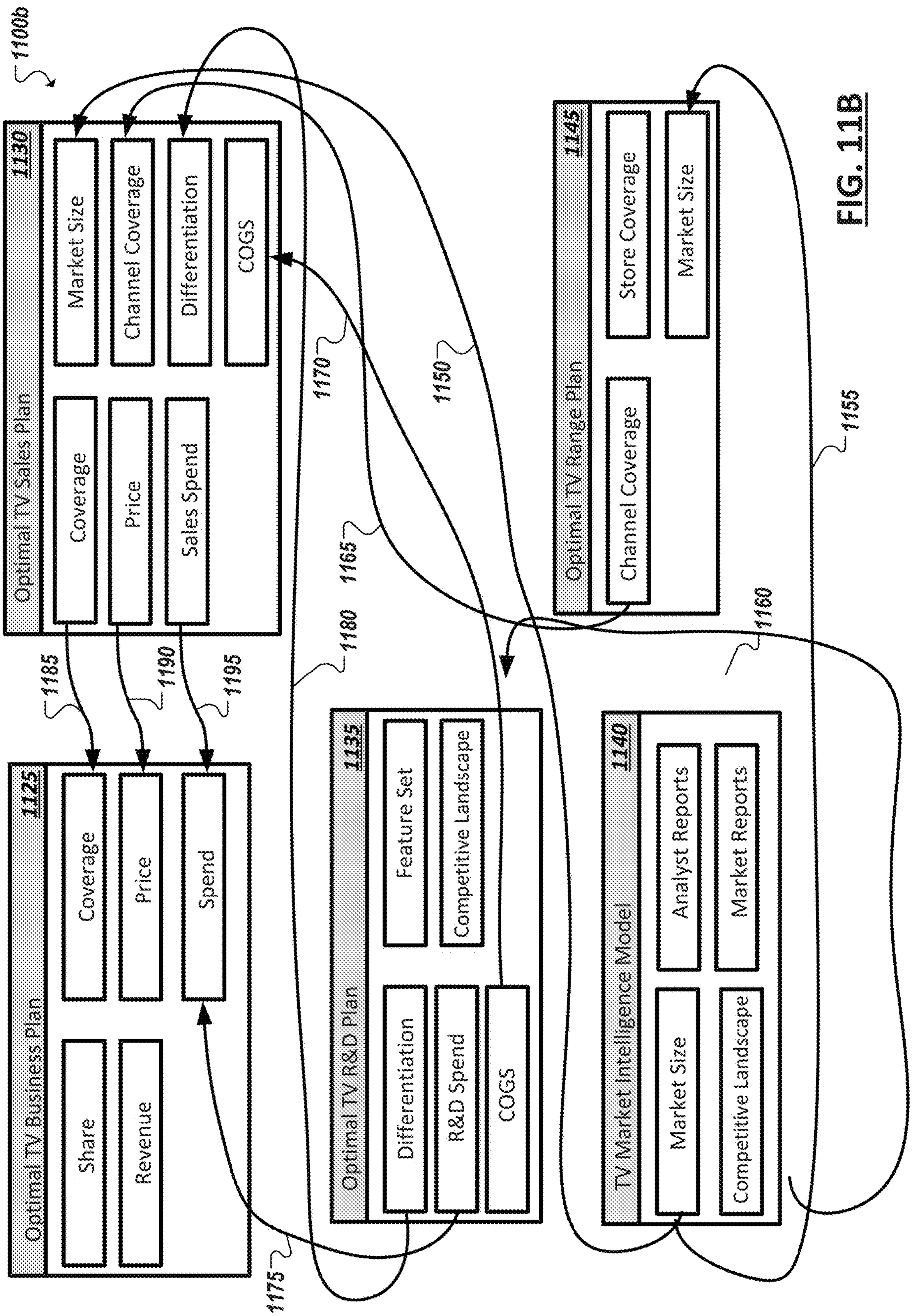

FIG. 11B illustrates one potential example of link expressions (e.g., 1150, 1155, 1160, 1165, 1170, 1175, 1180, 1185, 1190, 1195) between example plan models (e.g., 1125, 1130, 1135, 1140, 1145) in a network 1100*b* of plan models. In the example of FIG. 11B, input drivers of each of the represented plan models 1125, 1130, 1135, 1140, 1145 are listed in a right column and outcome measures in a left column. For instance, example Optimal TV Business Plan plan model 1125 can include input drivers Coverage, Price, and Spend while including outcome measures Share and Revenue. As further illustrated by FIG. 11B, inputs drivers of the example Optimal TV Business Plan plan model 1125 can be based on outcome measures of other plan models. For instance, values of Coverage input driver of example Optimal TV Business Plan plan model 1125 can be dependent on a Coverage outcome measure of example Optimal TV Sales Plan plan model 1130, the dependency defined through a link expression 1185. Similarly, the Price input driver of plan model 1125 can be dependent on a Price outcome measure of plan model 1130 and the Spend input driver of plan model 1125 can be dependent on multiple outcome measures (Sales Spend and R&D Spend) of two different plan models (e.g., 1130, 1135), with respective link expressions (e.g., 1195, 1175) defining the dependencies between the respective input drivers and outcome measures.

Continuing with the discussion of FIG. 11B, an example plan model (e.g., 1130) can serve as a focus plan model in one activity and as a linked plan model in another activity (e.g., where one of the example plan model's linked plan models is the focus plan model). For instance, while input drivers of plan model 1125 are represented as dependent on outcome measures of Optimal TV Sales Plan plan model 1130, the Optimal TV Sales Plan plan model's 1130 may itself be dependent on values of other plan models in the network 1100*b*, such as defined by link expressions 1150, 1165, 1170, 1180, among other examples.

Link expressions (e.g., 1150, 1155, 1160, 1165, 1170, 1175, 1180, 1185, 1190, 1195) can interconnect example plan models (e.g., 1125, 1130, 1135, 1140, 1145) in a network 1100*b* of plan models and further enable scenario planning, analyses, and other uses across multiple plan models. This can further enable users of the network of plan models to cross-collaborate and plan across multiple, corresponding domains within an organization. For instance, link expressions (e.g., 1150, 1155, 1160, 1165, 1170, 1175, 1180, 1185, 1190, 1195) between plan models (e.g., 1125, 1130, 1135, 1140, 1145) can enable an ask-response collaboration protocol within the network of plan models as well as automated network propagation between multiple plan models in the network 1100*b*.

An example ask-response collaboration protocol can enable the setup of process workflow parameters within a given organization that is based on at least two different plan models in a network of plan models. Such workflow parameters can include, for instance, a due date for response, owner of a request, owner of response, etc. In ask-response collaboration, a focus plan model can request or provide a particular target value for one or more target outcome measures of a corresponding linked plan model. In response, the linked plan model can provide a response with feedback concerning the feasibility of the target value and effects of applying the target value to its targeted outcome measure based on its plan model. In this manner, one department or business unit of an organization can collaborate with and solicit input from other departments (and corresponding plan models) in the scenario building, planning, and other uses of their own plan models.

To illustrate, in one particular example corresponding to the example of FIG. 11B, Optimal TV Business Plan plan model 1125 can be the requesting focus model in a planning activity and one or more linked plan models (e.g., 1130, 1135) of the Optimal TV Business Plan plan model 1125 can be identified. The Optimal TV Business Plan plan model 1125 can "ask," through an example ask-response-consensus protocol, that Price for a given television product be set, for instance, to $1000 in the United States (i.e., specifying a value corresponding to a particular level of aggregation for the plan model 1125 (e.g., the type of television and market region, etc.). A corresponding linked plan model, Optimal TV Sales Plan plan model 1130, can be identified as the recipient of the "ask" and can be used to assess the feasibility of the requested $1000 value. Accordingly, Optimal TV Sales Plan plan model 1130 come back with a response, based on its plan model 1130 and the input driver(s) that would enable the realization of a $1000 value of its corresponding Price outcome measure. In some instances, plan model 1130 could attempt to set the provided outcome measure to the targeted value (e.g., $1000) and report back whether or not the value could be achieved and what input driver values would result in such a value. This can be achieved, for instance, by analyzing and computing, through regression algorithms, or other techniques, the values (or sets of values) of input drivers of the linked plan model that would result in the requested value for the linked plan model's outcome measure.

In some instances, the "response" by the Optimal TV Sales Plan plan model 1130 can indicate that whether or not the "asked" value is obtainable as well as the consequences of adopting such a value across not only the Optimal TV Sales Plan plan model 1130 but also linked plan models (e.g., plan models 1135, 1140, 1145) of the Optimal TV Sales Plan plan model 1130 itself. Based on the feedback of the "response," a "consensus" value can be derived, in some instances through iterative ask-response exchanges between the plan models 1125, 1130, until a value is settled upon for Price that is agreeable to both the Optimal TV Business Plan plan model 1125 and the Optimal TV Sales Plan plan model 1130 (as well as, potentially, other plan models in the network linked to the Optimal TV Business Plan plan model 1125 and/or the Optimal TV Sales Plan plan model 1130), among other examples.

As noted above, because input drivers of a linked plan model (e.g., 1130) in an ask-response exchange can themselves be dependent on outcome measures of other plan models (e.g., 1135, 1140, 1145) of the network 1100*b*, a request of a focus plan model (e.g., 1125) to a linked plan model (e.g., 1130) that is itself also a focus plan model, can result in a chain of ask-responses. In other instances, the requested linked plan model (e.g., 1130) can ignore, for purposes of providing a response to a focus model's request, its own dependencies on other plan model (e.g., 1135, 1140, 1145). However, more powerful and accurate modeling can be achieved by considering a larger chain of interconnected plan models, potentially modeling effects across an entire organization, business unit, or department having multiple related plan models. For instance, input drivers of a plan model 1130 can themselves be dependent on outcome measures of plan models 1135, 1140, 1145. In order to set values of the input drivers of plan model 1130 to respond to the "ask" request of plan model 1125 relating to a Price outcome measure, plan model 1130 can initiate its own series of ask-response exchanges with each of plan models 1135, 1140, 1145 to confirm the feasibility of values for input drivers Market Size, Channel Coverage, Differentiation, and COGS of Optimal TV Sales Plan plan model 1130 used as the basis of delivering a response to the original request from Optimal TV Business Plan plan model 1125 regarding the feasibility of a $1000 value for Price.

Given the interconnection of plan models, a single input driver or outcome measure of any given plan model can be considered dependent on values of other interconnected plan models' input drivers and outcome measures. In simple analyses, these dependencies can be ignored, however, as illustrated in the example above, a chain or sequence of link expressions can be leveraged to more completely model effects and dependencies across multiple plan models. Automated network propagation can automate this propagation of ask-responses across multiple plan models, for instance, with one user-generated ask from a first focus plan model (e.g., 1125) to a first requested linked plan model (e.g., 1130) prompting the automated generation of asks directed to other plan models (e.g., 1135, 1140, 1145) upon which the first linked plan model (e.g., 1135) is dependent as well as automating propagation of responses to these asks through the interconnected plan models to generate the ultimate response to the original ask (e.g., from plan model 1125). Automated network propagation can further enable and drive execution of goal-based scenario planning involving two or more linked plan models, including plan models within a network of plan models (e.g., 1100*b*), among other examples. Indeed, many other examples of ask-response exchanges and automated propagation between plan models are possible, not only within the context of this particular example, but generally across any conceived network of plan models, particularly considering the potentially infinite number of different plan models that can be developed to model various domains and the potentially infinite ways such plan models can be interconnected in plan model networks modeling organizations and other entities.

As discussed above, one or more plan models can be used in a variety of ways to model and analyze particular outcomes, goals, objectives, scenarios, and other characteristics of related domains. For instance, input driver scenario planning can be enabled through the use of one or more plan models. Turning to the example of FIG. 12A, a simplified block diagram 1200*a* is shown representing principles of an example scenario planning session involving one or more plan models (such as linked models in a network of plan models). Values of input drivers (or outcome measures) of a particular plan model can be set to any number of values or combination values, based, for instance, on the restraints set explicitly and inherently through the structure of the particular domain-specific plan model (e.g., through input driver and outcome measure guidance rules). Accordingly, multiple scenarios can be generated based on different versions of the same plan model(s), each scenario defined by the particular input driver values (and/or outcome measure values) set for that version of the plan model(s). Accordingly, plan model versions can represent a scenario capturing a set of plan model values and the effects (outcomes) generated from those values. Further, a given scenario can be developed from one or more plan models, saved, and identified by values such as a scenario name, date of creation, identification of the user(s) that created the scenario, a description of the scenario, and so on. Plan models that are recorded and archived in the generation of scenarios can be managed, in some implementations, through a plan version control model. The plan version control model can allow for analytics to be conducted on the various versions that are stored. The plan version control model can also provide for management that defines the number of scenarios that the system can simultaneously evaluate and compare, among other examples.

Figure 12A:
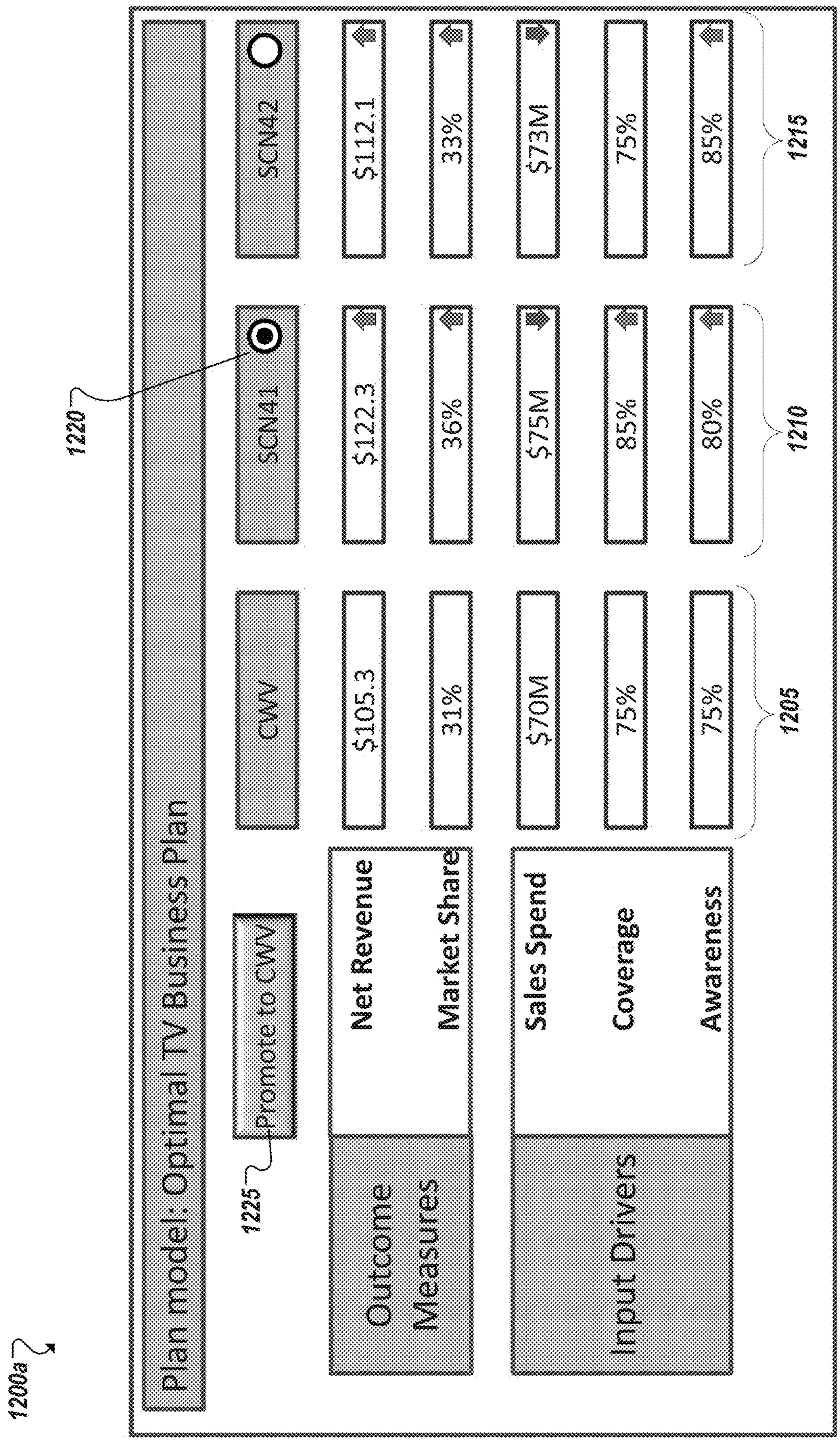
FIG. 12A is a simplified block diagram illustrating principles of input driver scenario planning utilizing one or more plan models.

In the example of FIG. 12A, at least three scenarios 1205, 1210, 1215 have been developed based on the same set of one or more plan models. The plan model(s) upon which the scenarios 1205, 1210, 1215 have been based can include outcome measures Net Revenue and Market Share and input drivers Sales Spend, Coverage, and Awareness. As shown in the example of FIG. 12A, scenarios 1205, 1210, 1215 can have different defined input driver values for each of the combination of example input drivers Sales Spend, Coverage, and Awareness. Correspondingly, the respective outcome measures of the three scenarios 1205, 1210, 1215 can also be different. Alternatively, outcome measure values can be defined and input driver values derived that permit the specified outcome measure values, among other examples.

Through input driver scenario planning, users can be provided with interactive user interfaces presenting users with a view of the relevant input drivers and outcome measures of plan models used in the scenario planning that drive and model the particular scenario. In some instances, a scenario can only pertain to a subset of the available input drivers and outcome measures of the plan model(s) used in the scenario planning. Further, input drivers and outcome measures can be viewed at particular levels of aggregation available through the plan models and defined for the scenario planning. For instance, a scenario may be concerned with analyzing input driver values and responsive outcome measures for breakfast cereal in Germany, whereas the plan models used in the scenario planning model higher levels of aggregation, such as Food Products (e.g., of which breakfast cereal is one member group at a particular level of aggregation) and Worldwide Geographical Regions (e.g., of which Germany is one member group at a particular level of aggregation falling below a highest level of aggregation including all regions in the world), among other examples.

Input driver scenario planning can be utilized to allow users to manipulate values of a set of input drivers exposed by the plan models used in the scenario planning to observe effects on related outcome measure values. Input driver scenario planning can, in some instances, involve planning across multiple plan models, with modeling of at least some outcomes based on automated propagation of values of input drivers of a first plan model affecting input driver and outcome measure values of other plan models linked to the first plan model through link expressions, among other examples. In some instances, users can manipulate values iteratively in an attempt to realize what combinations of input driver values result in an optimal, hypothetical, or other desired outcome measure value(s). For instance, a user can be presented with a user interface (e.g., adopting a presentation similar to the example of FIG. 12A), and view values of input drivers and outcome measures of one or more scenarios as defined in one or more plan models used in the scenario(s). From the view, the user can manipulate one or more input driver values and observe how the manipulations affect values of the corresponding outcome measures of the scenario (e.g., 1210), as well as compare how the resulting scenario values compare against goals of the domain (e.g., as defined in a goal model of the plan model) or values set in other versions (e.g., 1205, 1215) of the same scenario. Further, in some implementations, a user may determine that underlying plan models or other factors cause incorrect or unrealistic outcome measures (or input drivers) to be generated in a scenario based on the plan models and may override one or more values manually, for instance, by providing a substitute value and marking the substitution as an override. Such manual overrides can then be used, in some implementations, as feedback for improving or correcting the plan models underlying the manipulated scenario.

Scenario planning can involve the definition of a particular scenario from one or more plan models, as well as the selection of input drivers and outcome measures of interest together with selected levels of aggregation for the values of the inputs drivers and outcome measures. In other instances, a scenario planning session can instead be based on a pre-existing scenario, such as a previously generated scenario or scenario template. For example, in some instances, the manager or user of a particular plan model or scenario can set a scenario with values representing a current working view of the user, user group, or organization. In one example, the current working view can represent the most ideal version of the scenario (and related plan models) yet realized during scenario planning. Consequently, in some examples, such as the example of FIG. 12A, a user can use a saved current working view scenario (e.g., “CWV” 1205)

as the basis for a subsequent scenario, such as scenarios "SCN41" (1210) and "SCN42" (1215). A pre-existing scenario used as the basis for another scenario can be considered the "seed scenario" of the new scenario. The seed scenario can supply not only the basic structure of the scenario (e.g., the plan model, input drivers, outcome measures, levels of aggregations used, etc.) but also a set of default values, such as the values of input drivers and outcome measures defined in the seed scenario. Scenarios can also be generated "from scratch," through the identification of one or more focus plan models and other parameters designating the levels of aggregation to be employed, the extent to which linked models should be considered, etc.

Continuing with the example of FIG. 12A, a current working view can serve as a common scenario used by potentially multiple users as the basis of a set of collaborative scenario planning sessions. A collaborative scenario planning session can be used to attempt to reach a consensus based on a comparison of a set of different scenarios potentially generated by a variety of different users, user groups, departments, etc. In some instances, input driver scenario planning can involve comparisons of two or more scenarios (e.g., 1205, 1210, 1215), including comparisons with a set current working view scenario (e.g., 1205), as illustrated in the example of FIG. 12A. Through the comparison, users can identify how scenarios compare, both in terms of the demands and decisions implied through input driver values of the respective scenarios 1205, 1210, 1215, as well as the outcomes realized in each scenarios. For instance, a user interface can be provided in connection with scenario comparison similar to the block diagram illustrated in FIG. 12A, with indicators being presented indicating how the values of the new scenarios compare against a current working view, for instance. As an example, the Sale Spend input driver value (e.g., $75M) of SCN41 (1210) is less favorable than that (e.g., $70M) set in a current working view scenario (e.g., because of the higher cost), while the values of outcome measures Net Revenue and Market Share of SCN41 (1210) are represented as more favorable in comparison with those of the current working view scenario 1205, among other examples.

A scenario can be promoted or reassigned as a current working view based on scenario planning, for instance, based on a determination that the new scenario (e.g., 1210 or 1210) is more favorable or desirable than the current working view scenario (e.g., 1205). For instance, in connection with a scenario comparison, such as represented in the example of FIG. 12A, a user can designate another scenario (e.g., through the selection go a radio button 1120 or other user interface control) and confirm (e.g., through button 1225 or another user interface control) that the designated scenario (e.g., 1210) should be promoted to the current working view, thereby replacing the previous current working view (e.g., 1205) in future comparisons or generations of new scenarios from the seed current working view scenario, among other examples. Scenarios can be designated or promoted in other ways as well. For instance, a scenario (such as a current working view or other scenario) can be set or promoted as a plan of record for an organization responsible for the plan model. A plan of record can define those input driver values and outcome measure values that the corresponding domain(s) will attempt to execute in their real world decisions, activities, and goals. In some instances, the promotion of a scenario to plan of record can be based on the reaching of consensus through collaborative scenario planning that the particular promoted scenario best meets the goals of the domain(s). In some instances, multiple versions of the same scenario seed can be set as the plan of record, for instance, to capture the timing with which the processes (associated with the plan model's domain) repeats itself, among other examples.

Figure 12B:
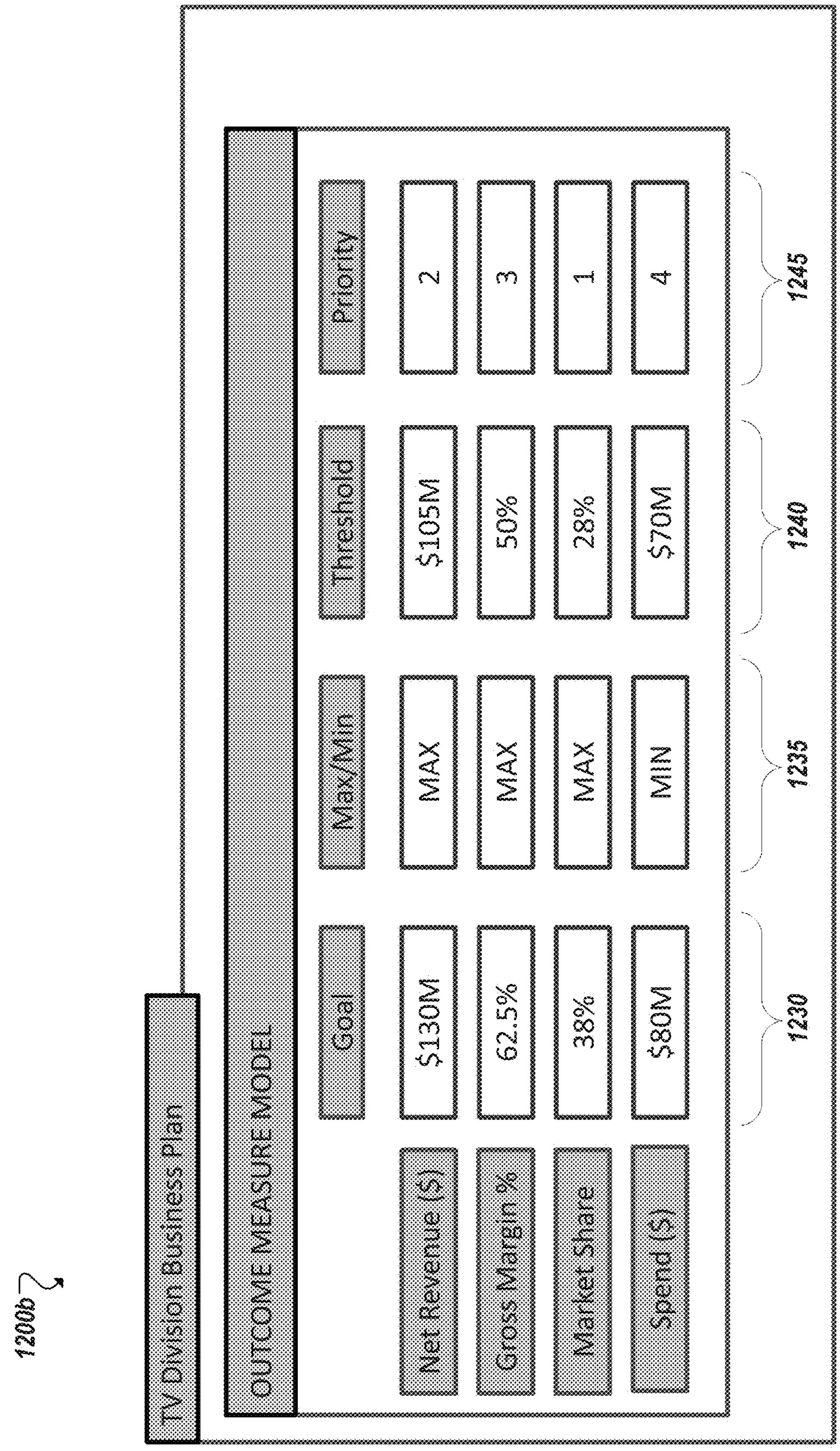
FIG. 12B is a simplified block diagram illustrating principles of goal-based scenario planning utilizing one or more plan models.

In addition to input driver scenario planning, goal-based scenario planning can also be enabled through the use of one or more plan models, as represented in FIG. 12B. Goal-based scenario planning can be utilized by users to automatically generate and present scenarios based on one or more specified goal values for outcome measures of one or more focus plan models. Accordingly, goal-based scenarios, rather than being input driver-driven can be based on changes or definitions to outcome measure values of plan models underlying the scenario(s). Applying principles similar to some of those described in connection with automated propagation with plan model networks, one or more goal values or value ranges for outcome measures of underlying plan models can be set (e.g., by a user) and serve as the basis for determining sets of input driver values that would realize, or at least approximate, if possible, the set goal values, based on the definitions of the underlying plan models, genetics and other algorithms and logic. Indeed, in instances where multiple sets of possible input driver values are identified as realizing a particular outcome measure goal, a plurality of distinct scenario versions can be generated corresponding to each set of possible input driver values. The resulting set of scenarios can then be compared, such as through a presentation similar to that in FIG. 12A, for instance, to determine and promote a most-desirable one of the generated scenarios, for example, to a current working view or plan of record, among other examples.

Goal values, in some instances, can include non-discrete values, such as in instances where the goal is to maximize or minimize a particular outcome measure value. In some instances, outcome measure guidance, as well as input driver guidance, defined in underlying plan models can be used in the setting of one or more goal values together with guiding and filtering the sets of input driver values derived to achieve the specified goal value(s). In the example of FIG. 12B, a simplified example user interface 1200*b* is presented in connection with an example goal-based scenario planning session. Through the user interface 1200*b*, a user can view and select a variety of values for a set of outcome measures included in the goal-based scenario, such as a Net Revenue outcome measure, Gross Margin outcome measure, Market Share outcome measure, and Spend outcome measure. Values (e.g., 1230) of the set of outcome measures can be manipulated in connection with the example goal-based scenario planning session, as well as values of outcome measure guidance rules and goal model parameters (e.g., 1235, 1240, 1245) provided through the plan models underlying the scenario. For example, a user can set a particular goal value (e.g., 1230), threshold values (e.g., 1235), minimization/maximization guidance (e.g., 1240, for instance, in the event the goal value 1230 of any one of the outcome measures cannot be reached), and relative priority guidance values (e.g., 1245) for any combination of the outcome measures. Based on the selections, one or more sets of corresponding input driver values can be returned, as well as, in some instances, generated scenarios incorporating the input driver values and additional feedback data, such as data indicating what input drivers, dependencies, other plan models, are preventing a particular goal value or set of goal values from being realized, among other examples. Additionally, as in input driver scenario planning, in some implementations, users may be provided with the additional option of manually overriding values of scenarios generated in response to provided goal values, for instance, to more accurately capture real world attributes of the domain modeled by the plan models underlying the scenario(s).

Figure 13A:
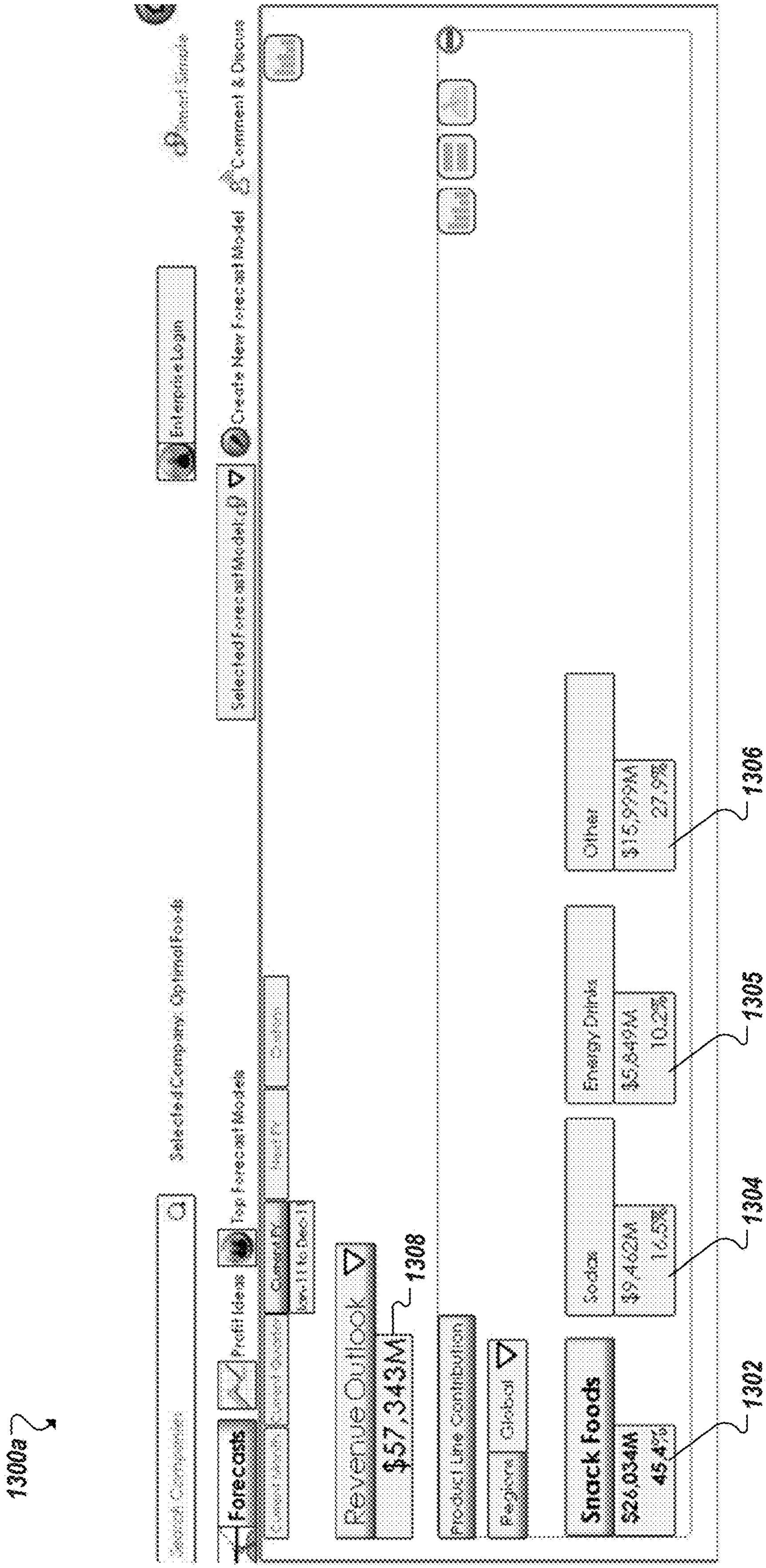
FIGS. 13A-13H are screenshots of example user interfaces for use in connection with one or more example plan models.
Figure 13B:
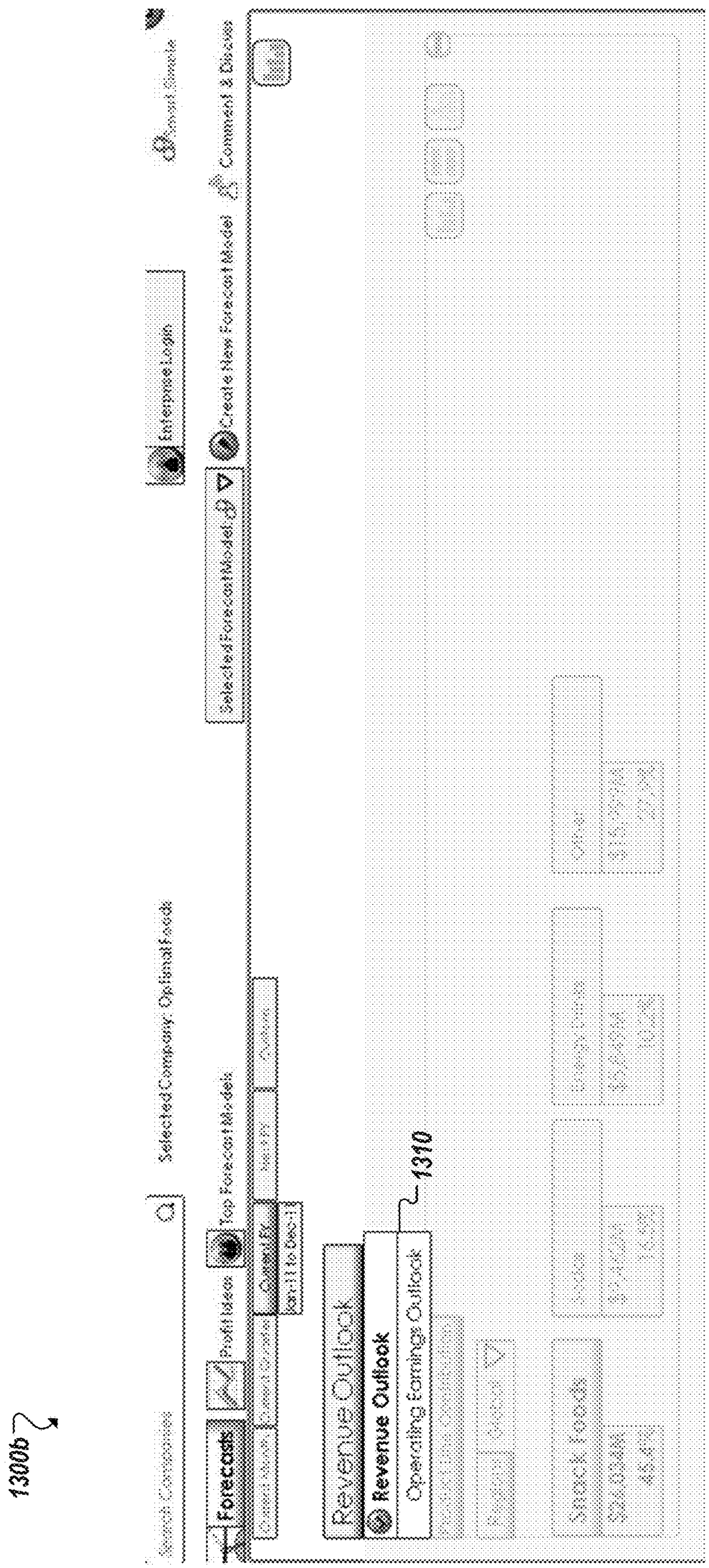

Turning now to the examples of FIGS. 13A-H, a set of example screenshots 1300*a-h* are presented illustrating additional examples and features in connection with plan models, plan model networks, and the use of such plan models (e.g., in scenario planning). Referring first to FIG. 13A, a screenshot 1300*a* of a user interface of an example planning system is shown. The planning system can be customized to a variety of different organizations and types of organizations and can apply and consume corresponding plan models of the organizations and their various respective domains. In the examples of FIGS. 13A-H, the planning system can be customized for a food company (e.g., "Optimal Foods") with four divisions: snack foods, sodas, energy drinks, and miscellaneous food products. Accordingly, one or more plan models can be developed and used by the planning system that correspond to the four divisions. One of the plan models can include, for instance, an Optimal Foods Forecast plan model that will be referenced in the particular example screenshots of the examples of FIGS. 13A-H. The scope model of the Optimal Foods Forecast plan model can include a scope model with included entities such as Time, Product, and Region. Outcome measures of the Optimal Foods Forecast plan model can include Revenue Outlook and Operating Earnings Outlook, with input drivers including Snack Foods Revenue Outlook, Sodas Revenue Outlook, Energy Drink Revenue Outlook, and Other Revenue Outlook corresponding to the four divisions of the company. Accordingly, the user interface of the planning system can include windows, presentations, icons, fields, and controls corresponding to views of plan models, outcome measure values, input driver values, and other plan model-related views as exposed by the plan models of the planning system, as illustrated in the example screenshot 1300*a* of FIG. 13A. For instance, fields 1302, 1304, 1305, 1306 can correspond to values of the input drivers of Snack Foods Revenue Outlook, Sodas Revenue Outlook, Energy Drink Revenue Outlook, and Other Revenue Outlook input drivers and field 1308 can correspond to the value of a Revenue Outlook outcome measure defined in a particular scenario, such as a current working view or plan of record of the company. Further, turning to the example of FIG. 13B, further views can be exposed and presented through other controls of the user interface, for instance through a dropdown menu 1310 allowing a user to view details relating to one of the two outcome measures included in the plan model (or scenario) highlighted in the user interface view of screenshots 1300*a-b*, among other views, features, and examples.

Figure 13C:
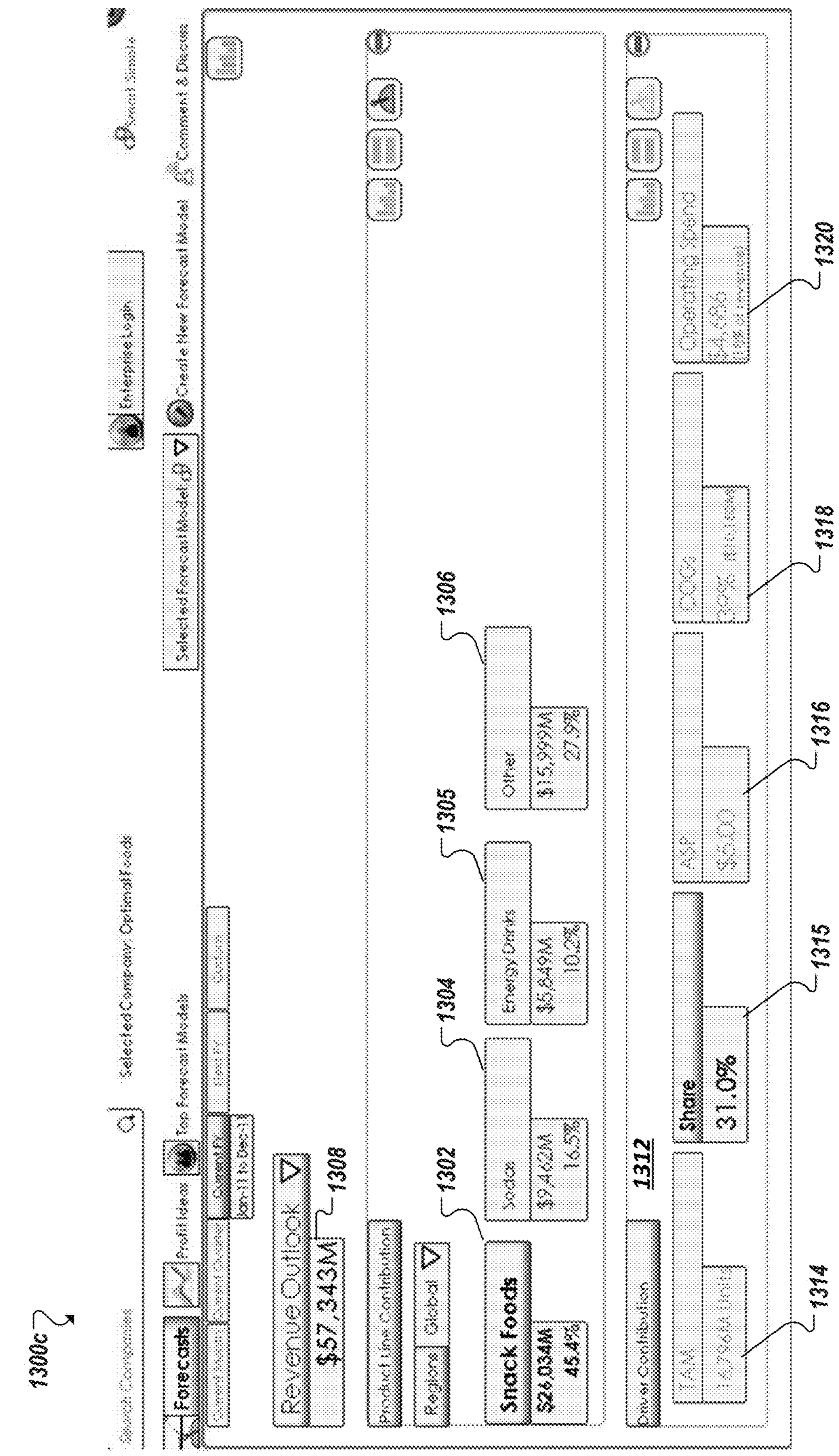
Figure 13D:
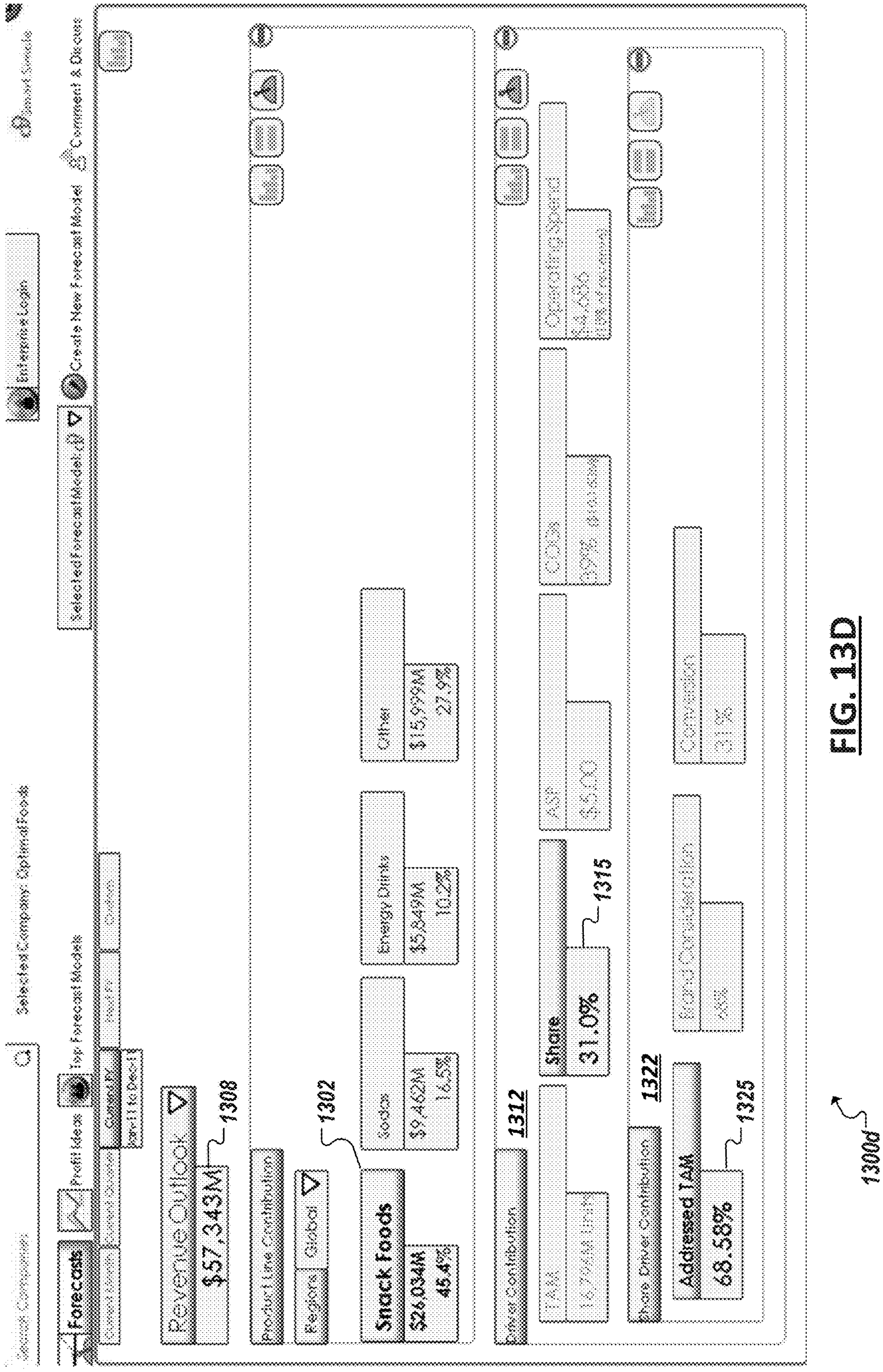
Figure 13E:
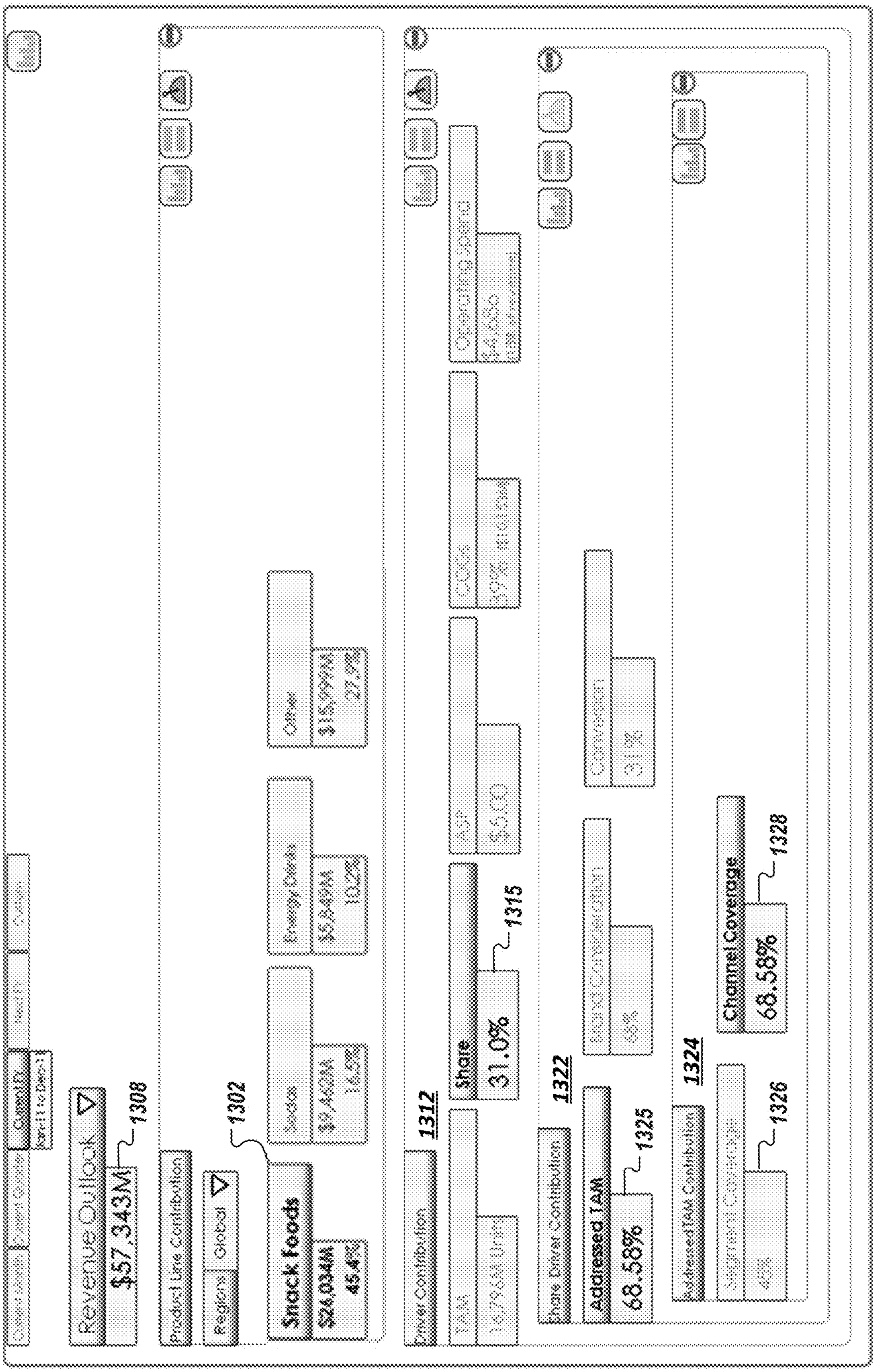
Figure 13F:
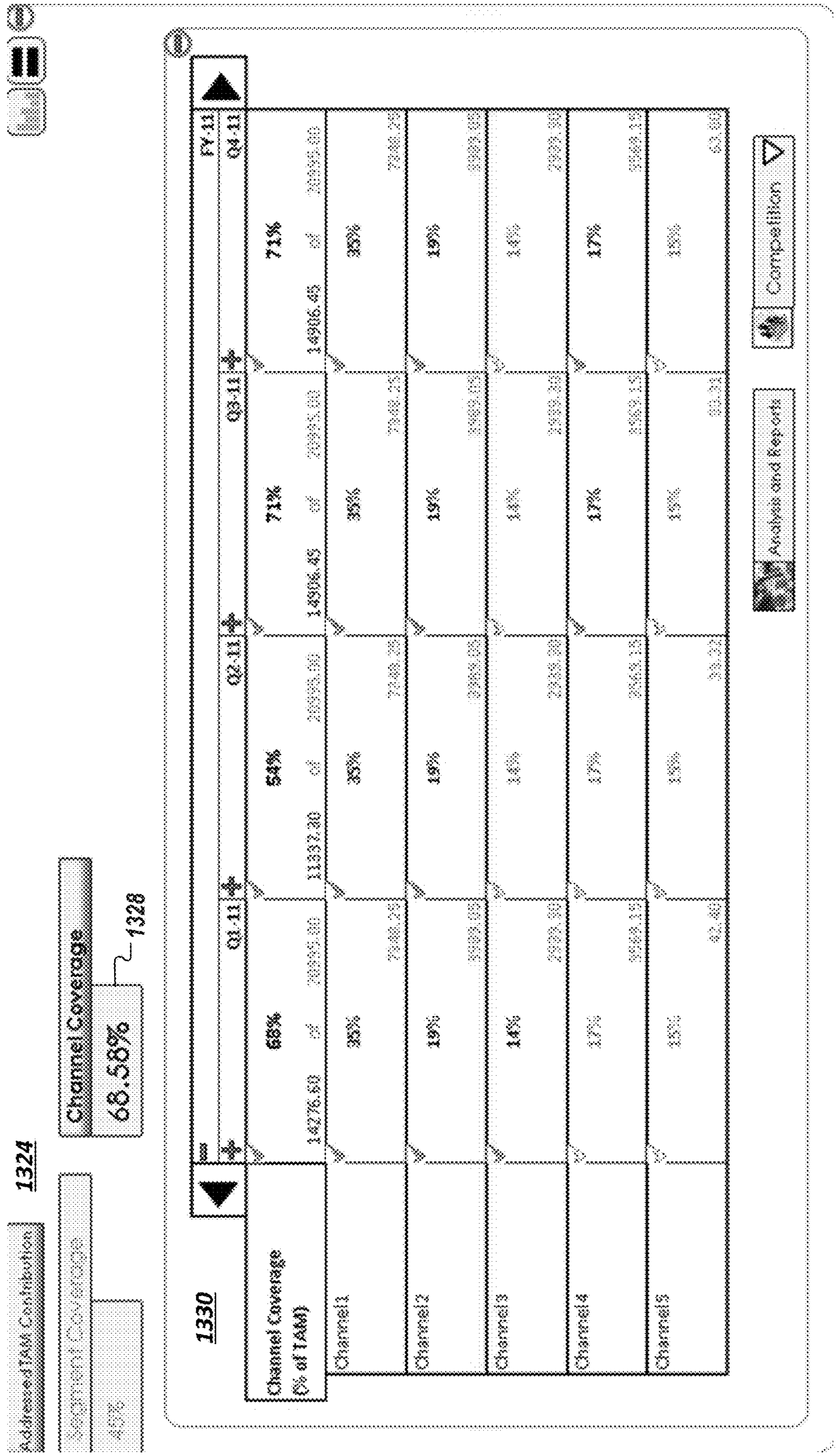

As noted above, plan models can be linked to other plan models in a network of plan models allowing collaborative, inter-domain, and more comprehensive modeling of planning and goals within a multi-faceted organization. In the example of FIG. 13C, a Snack Foods Forecast plan model, corresponding to the example company's snack food division, can be linked to the company-wide Optimal Foods Forecast plan model, along with potential other plan models corresponding to the remaining company divisions. In this example, the Snack Foods Forecast plan model can include a scope model including entities such as Time, Product, and Region, outcome measures such as Outcome measures such as Revenue Outlook, Operating Earnings Outlook, and input drivers such as Total Available Market Size (TAM), Share, Average Selling Price (ASP), Cost of Goods Sold (COGS), and Operating Spend, among other examples.

In the screenshot 1300*c* of FIG. 13C, a user can select a particular one of the fields (e.g., 1302) corresponding to an input driver of the Optimal Foods Forecast plan model resulting in a new window 1312 being presented providing a view into a particular linked plan model (i.e., the Snack Foods Forecast plan model), corresponding to the selected input driver at 1302. The window 1312 can include additional fields 1314, 1315, 1316, 1318, 1320 corresponding to the input drivers of the linked Snack Foods Forecast plan model and display values of the input drivers that inevitably relate to the input driver values of Optimal Foods Forecast plan model (at 1302, 1304, 1305, 1306). From these views, a user can interact with the user interface fields 1302, 1304, 1305, 1306, 1314, 1315, 1316, 1318, 1320 to change particular values of the respective input drivers. Changes to the scenario underlying the presented graphical user interface (in screenshot 1300*c*) can also affect values of other linked or focus models in the network. For instance, changing one of values 1314, 1315, 1316, 1318, 1320 can lead to automated changes to the value in field 1302 (as well as to changes to other plan models to which the Snack Foods Forecast plan model is also linked). Indeed, as shown in the example screenshots of 1300*d-e* of FIGS. 13D and 13E, the Snack Foods Forecast plan model can be linked to a Snack Foods Share plan model which is itself linked to yet another plan model, an example Snack Foods Addressed TAM plan model. Further, views 1322, 1324 of the respective Snack Foods Share plan model and Snack Foods Addressed TAM plan model can be accessed through the respective selection of corresponding fields or controls 1315, 1325 (in FIGS. 1300*d* and 1300*e* respectively), and so on. Further selection of other fields (e.g., 1304, 1305, 1306, 1310, 1314, 1316, 1318, 1320, 1326, 1328) can open additional views corresponding to still other plan models or portions of plan models consumed by the example planning system.

User interfaces of an example planning system can provide additional views of information included in scenarios and underlying plan models, including views of values at varying levels of aggregation. Indeed, a user can select and toggle between different views displaying plan models at varying levels of aggregations defined for the domain(s) of the corresponding plan model(s). In one example, shown in the screenshot 1300*f* of FIG. 13F, a channel coverage input driver value of the example Snack Foods Addressed TAM plan model can be viewed according to a particular level of aggregation, such as presented in window 1330 of screenshot 1300*f*. For instance, the Channel Coverage value can be viewed at levels of aggregation corresponding to entities such as Time, Product, Region, and Channel. In the particular example of FIG. 13F, a view is displayed with Channel Coverage represented at a level of aggregation corresponding to a quarterly time period in the year 2011 and according to the particular individual channel members of the domain. A user can further interact with the window 1330, for instance, by modifying individual values of Channel Coverage for each of the displayed member groups, thereby possibly also changing values of plan models linked to outcome measures or input drivers of the Snack Foods Addressed TAM plan model or another model (such as a Channel Coverage plan model, among other examples).

Figure 13G:
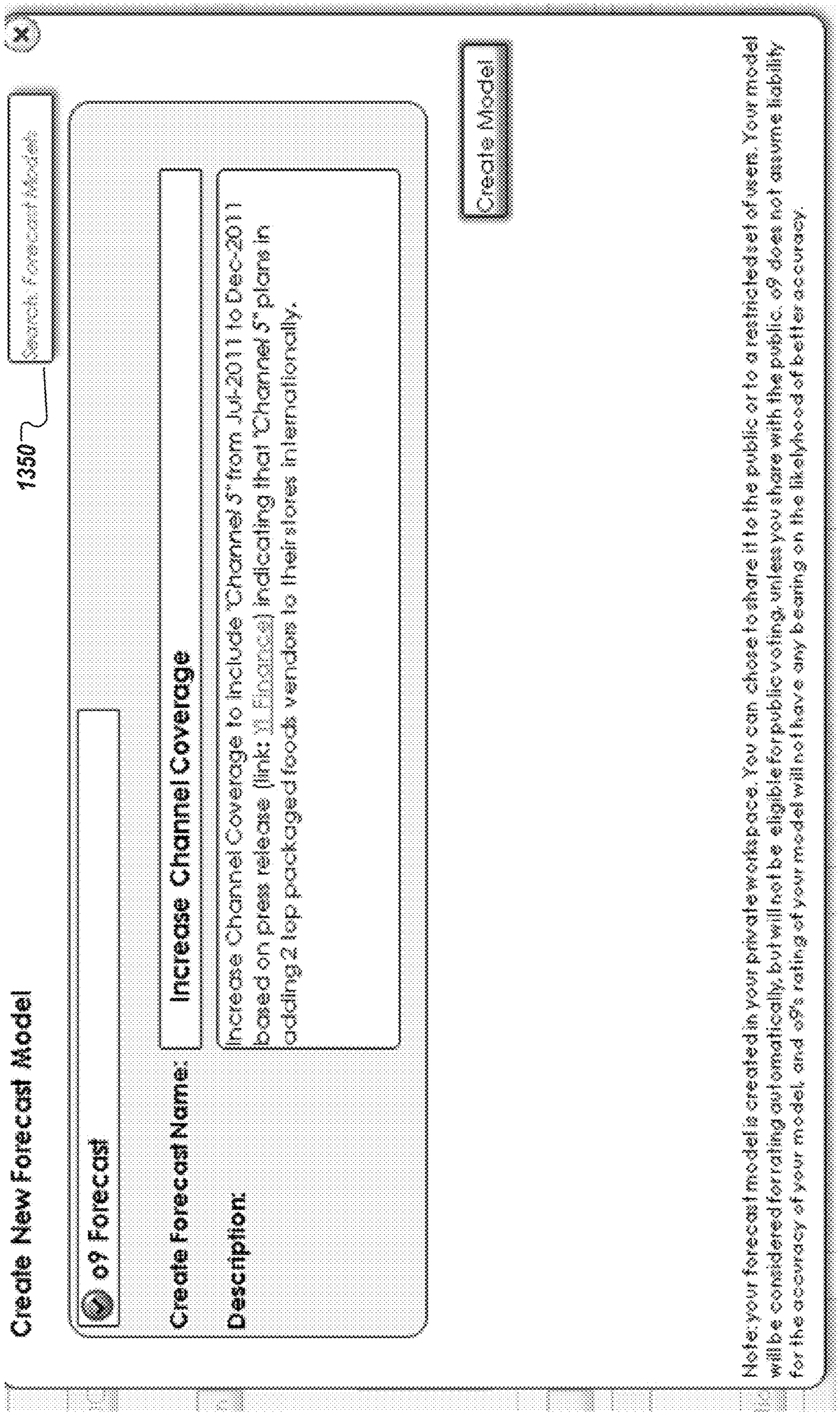
Figure 13H:
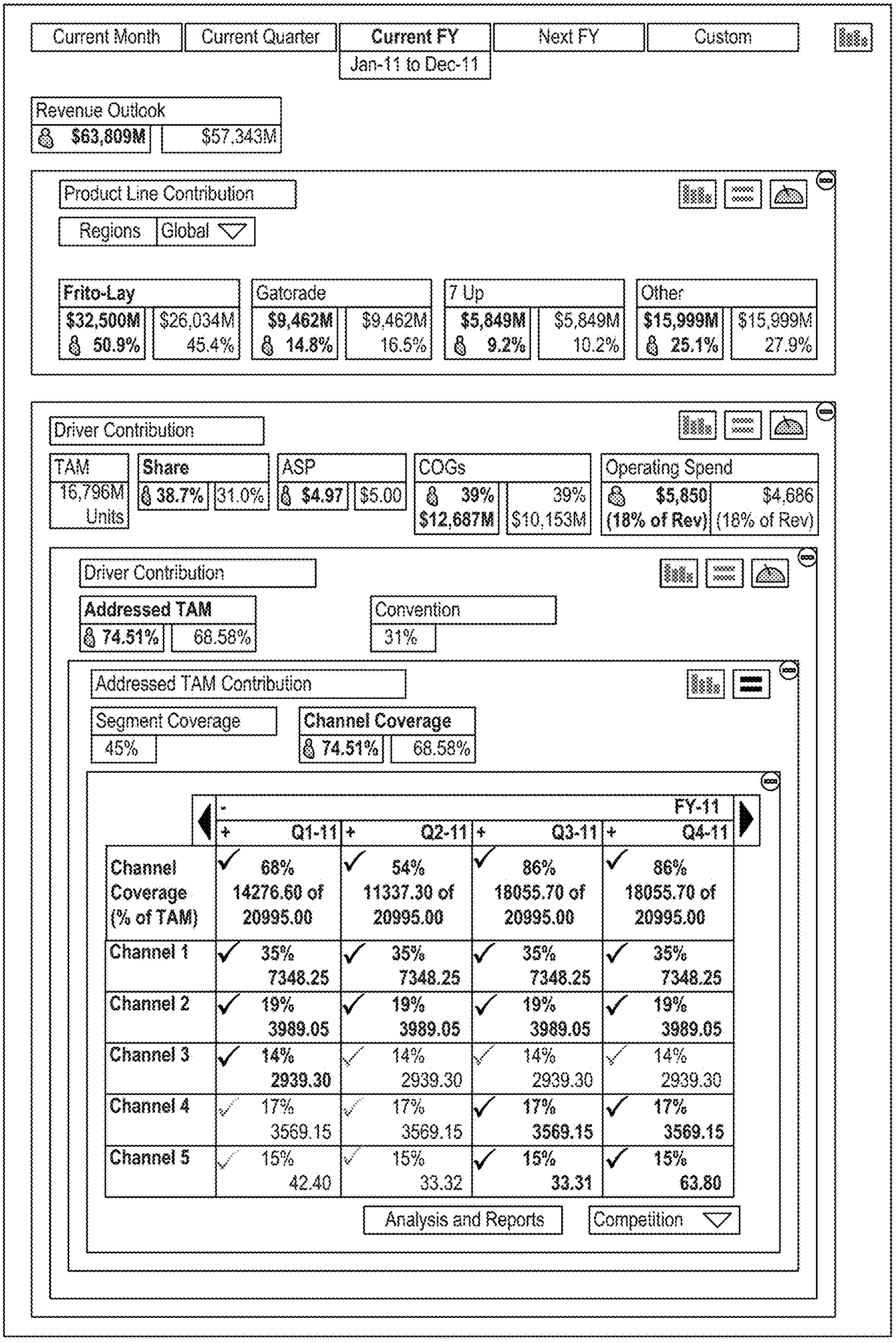

Turning to the example screenshot 1300*g* of FIG. 13G, an example user interface is shown allowing a user to create, define, and name a new scenario for use, viewing, and manipulation in the planning system. In some examples, the new scenario can be generated from a seed scenario. Such seed scenarios can be searched for (e.g., through search field 1350) or otherwise identified and selected through additional user interfaces and user interface controls of the planning system. For instance, the scenario (and incorporated plan models) of the examples of FIGS. 13A-F can be used as a seed scenario and a user can manipulate the values of various fields corresponding to input drivers (and/or outcome measures) of the seed scenario to define a new version of the seed scenario. Additionally, as shown in the screenshot of FIG. 13H, guidance can be provided to a user showing the user a value of the seed scenario, current working view scenario, or other scenario, as well as values defined in guidance measures to assist the user in defining values for the new scenario. The user can then use the newly generated scenario is comparisons with other versions of the scenario and further modify or promote the scenario according to the desires of the user(s) through additional user interfaces, such as user interfaces adopting principles of the examples of FIGS. 12A-B, among other examples.

Figure 14A:
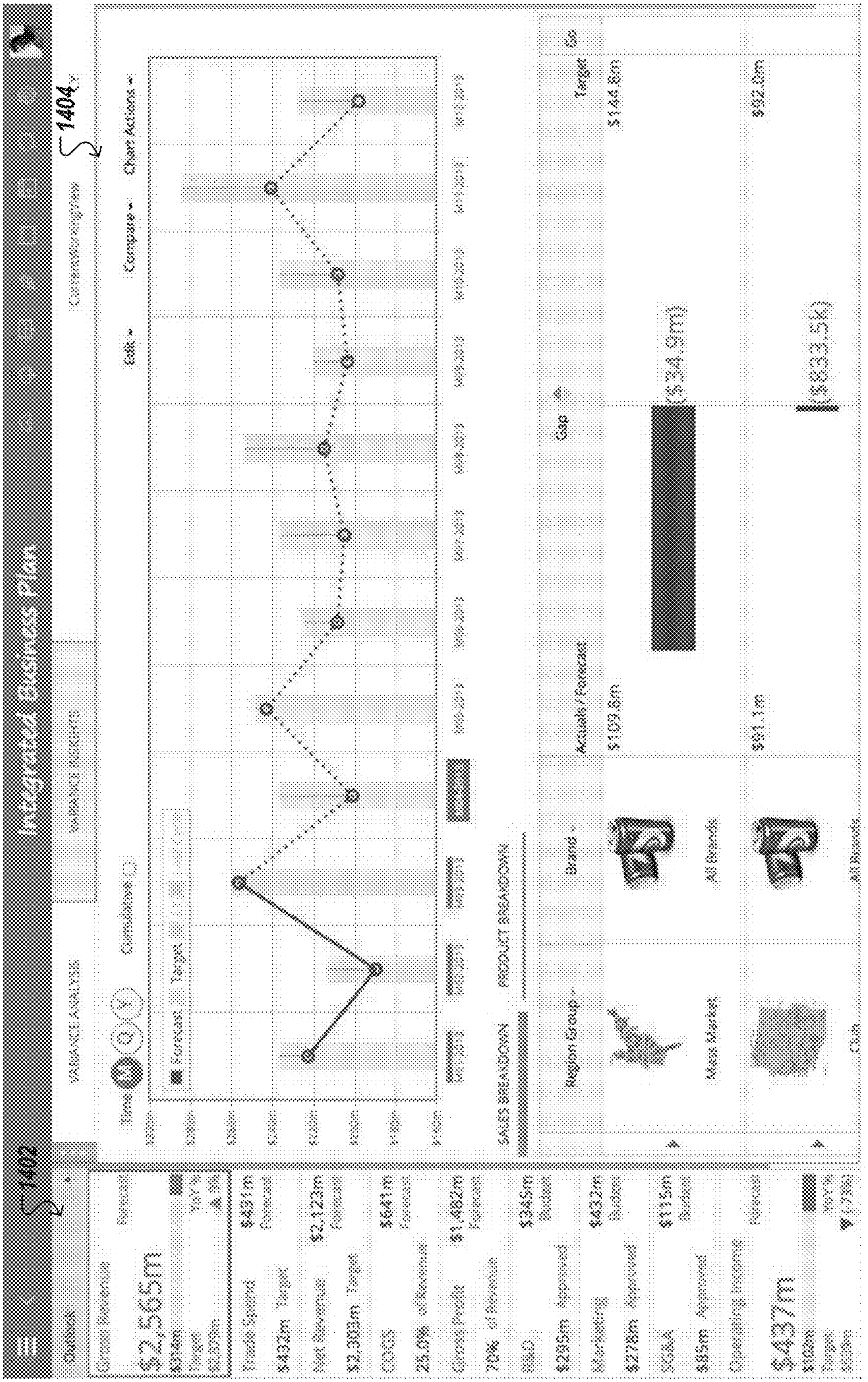
FIGS. 14A-14S are screenshots of example user interfaces for use in connection with one or more example plan models.
Figure 14B:
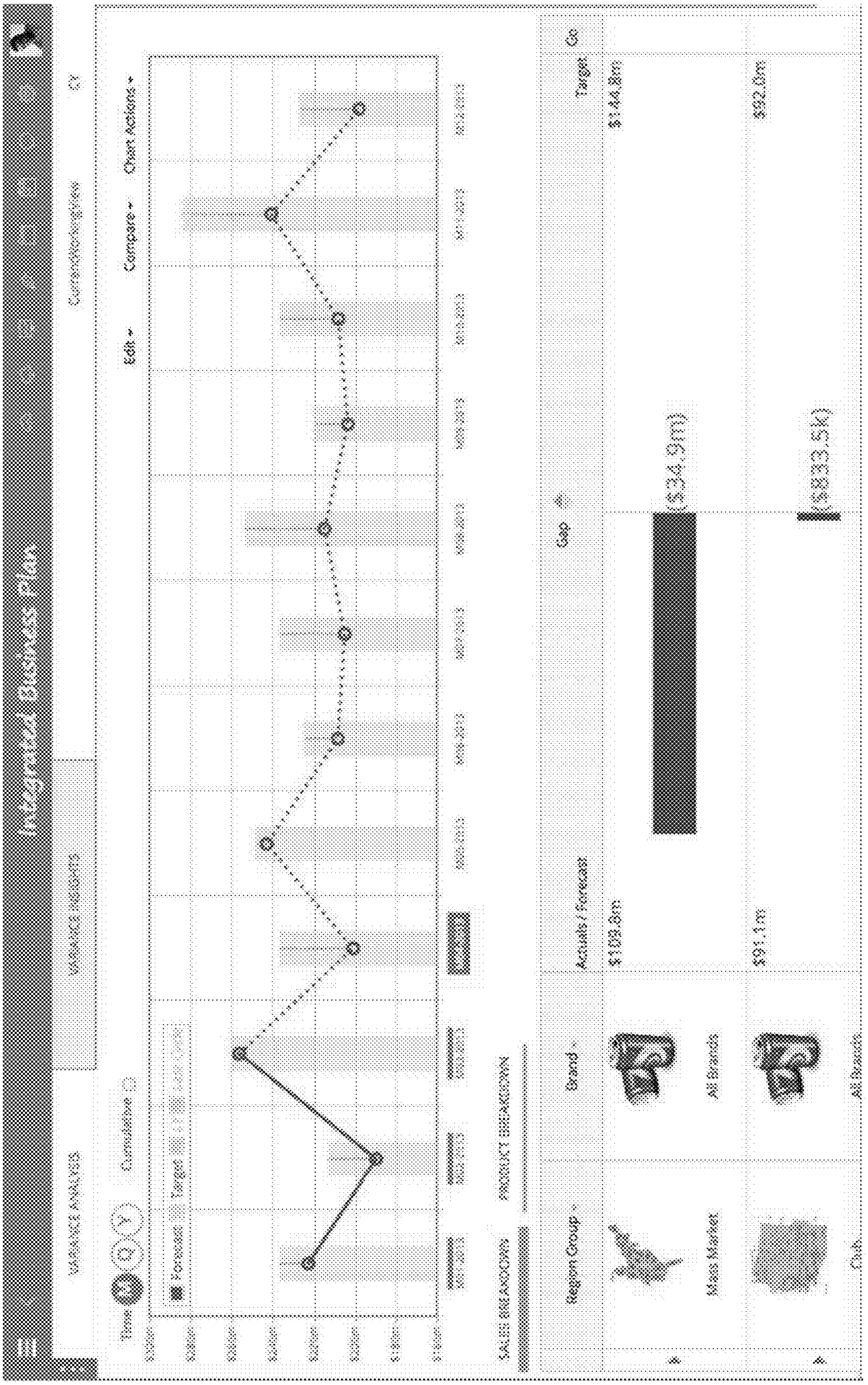
Figure 14C:
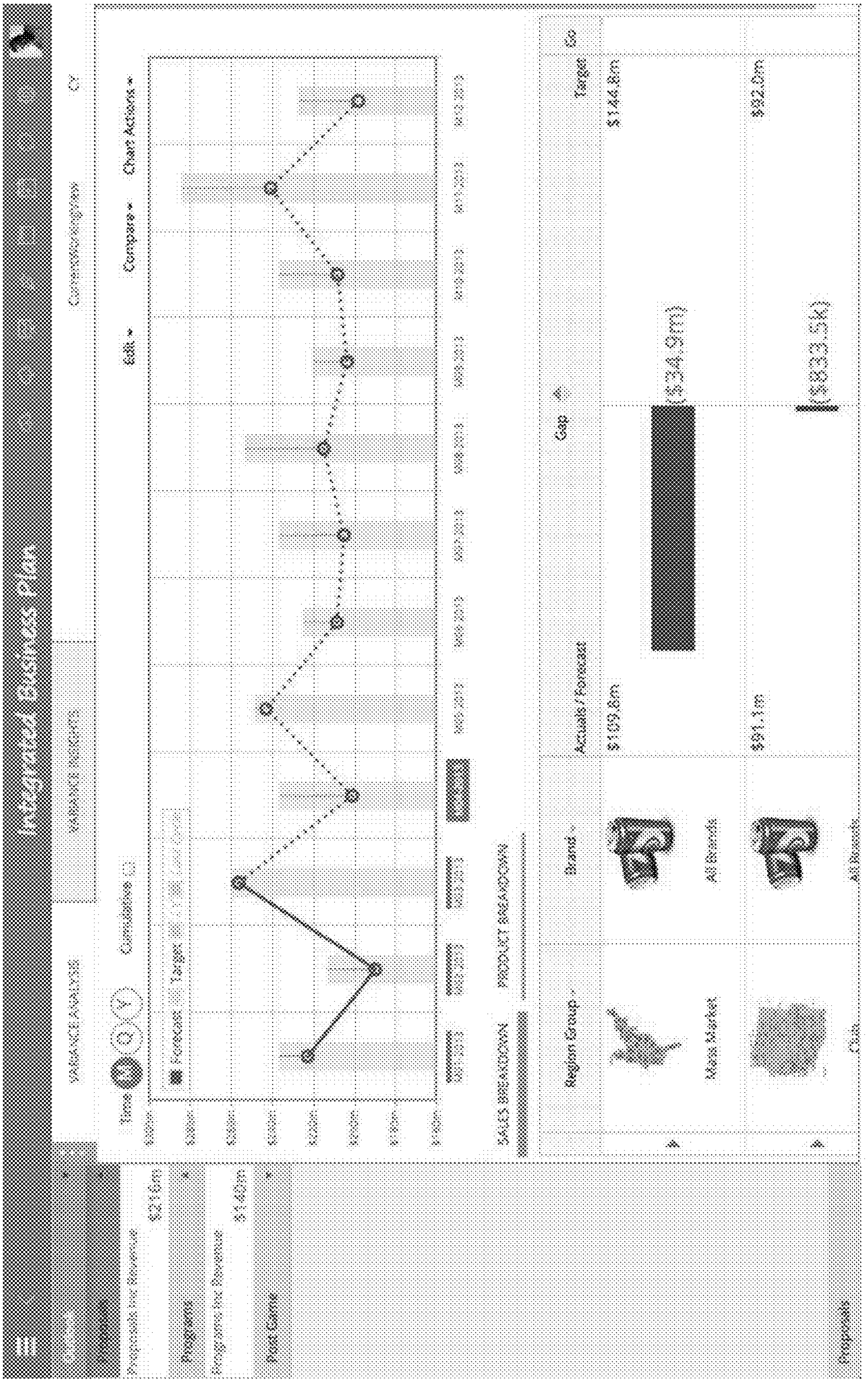
Figure 14D:
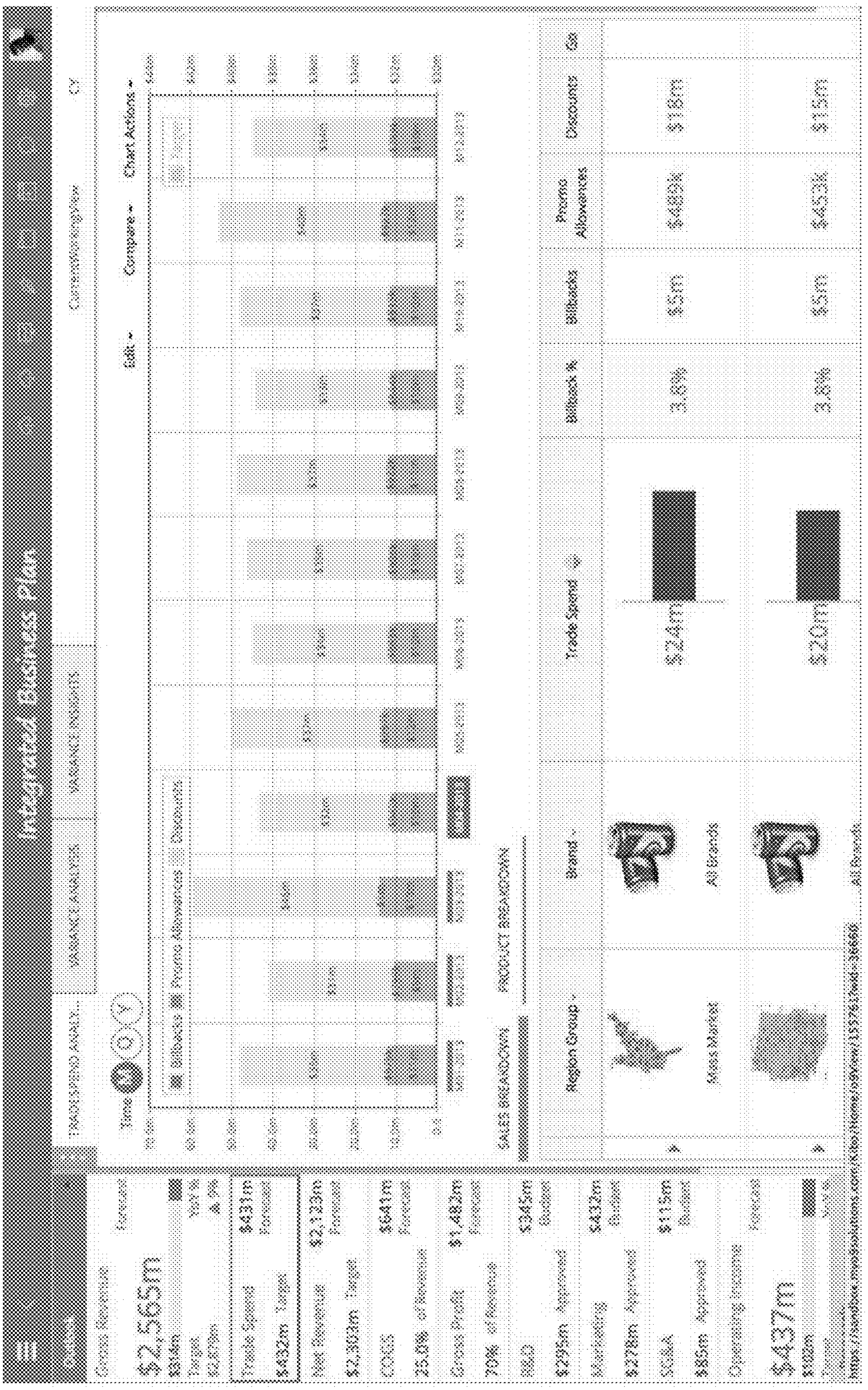
Figure 14E:
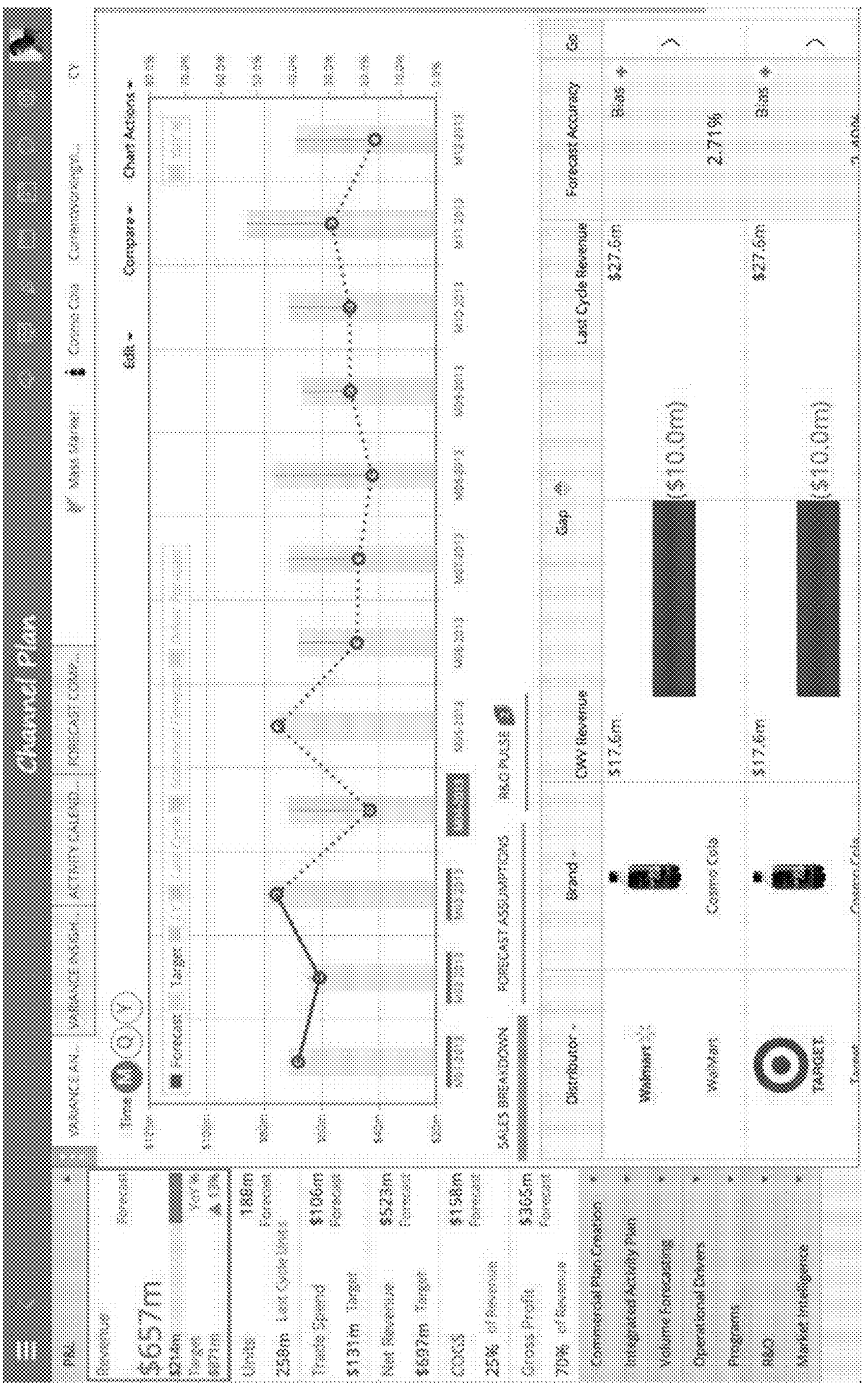
Figure 14F:
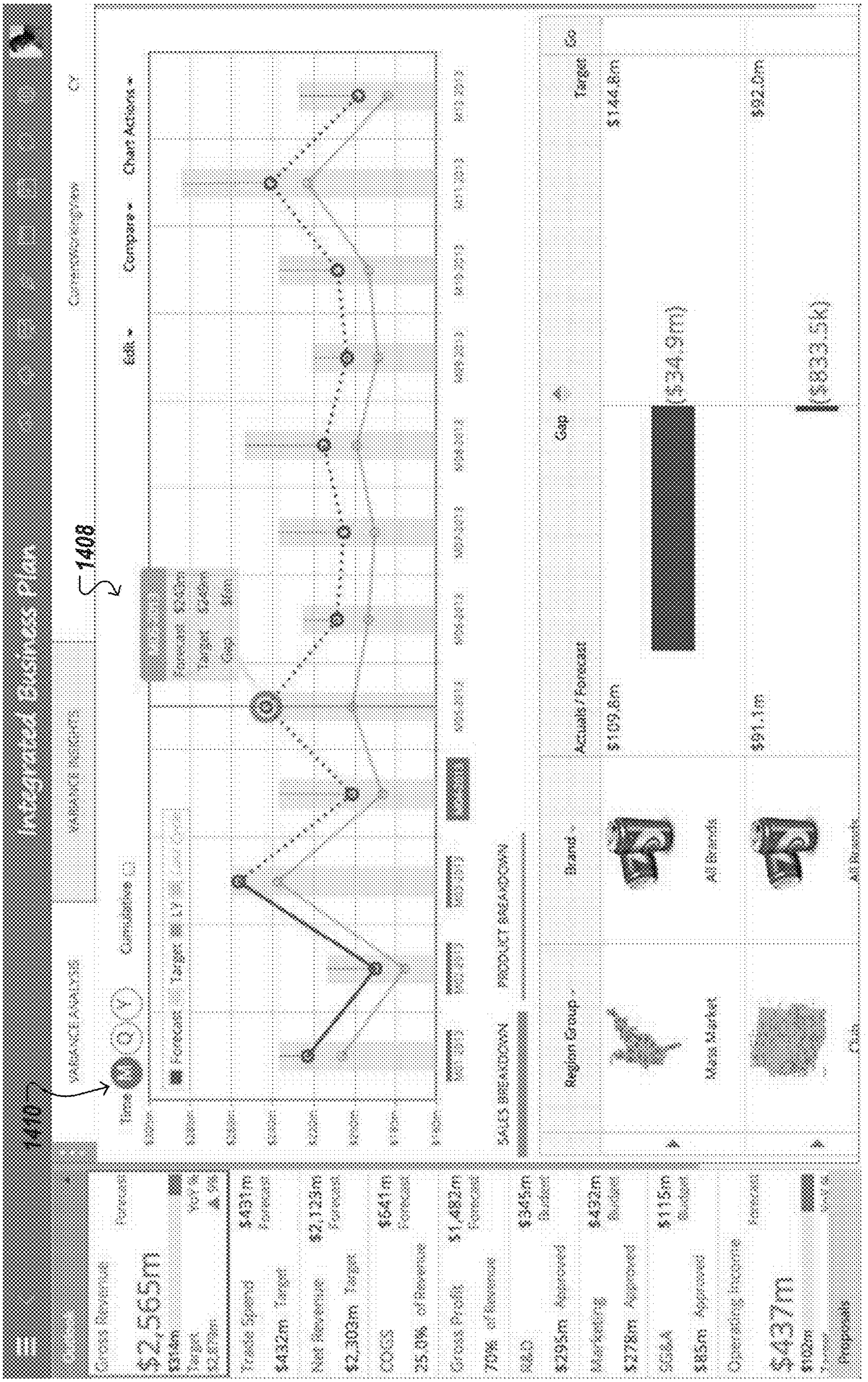
Figure 14G:
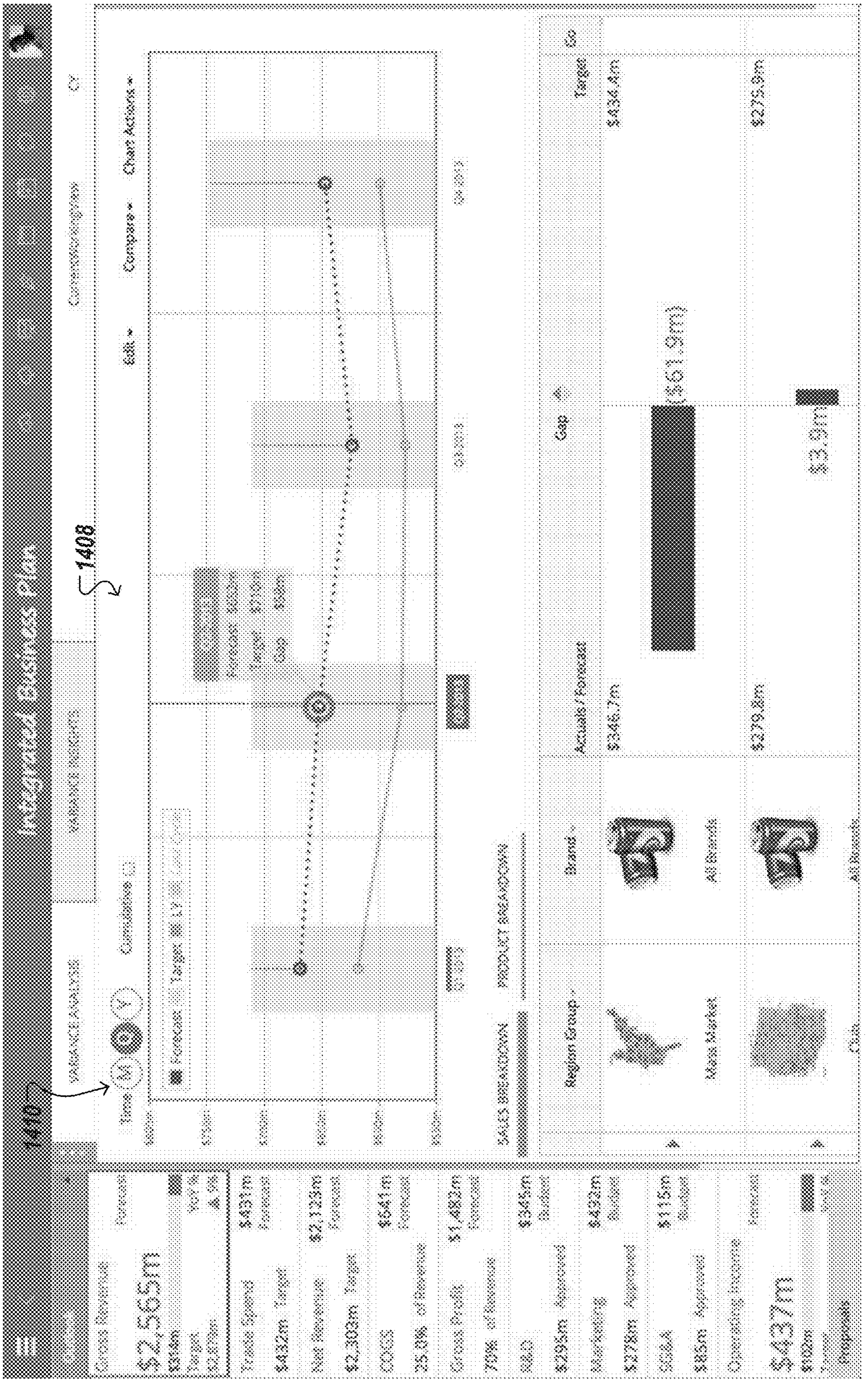
Figure 14H:
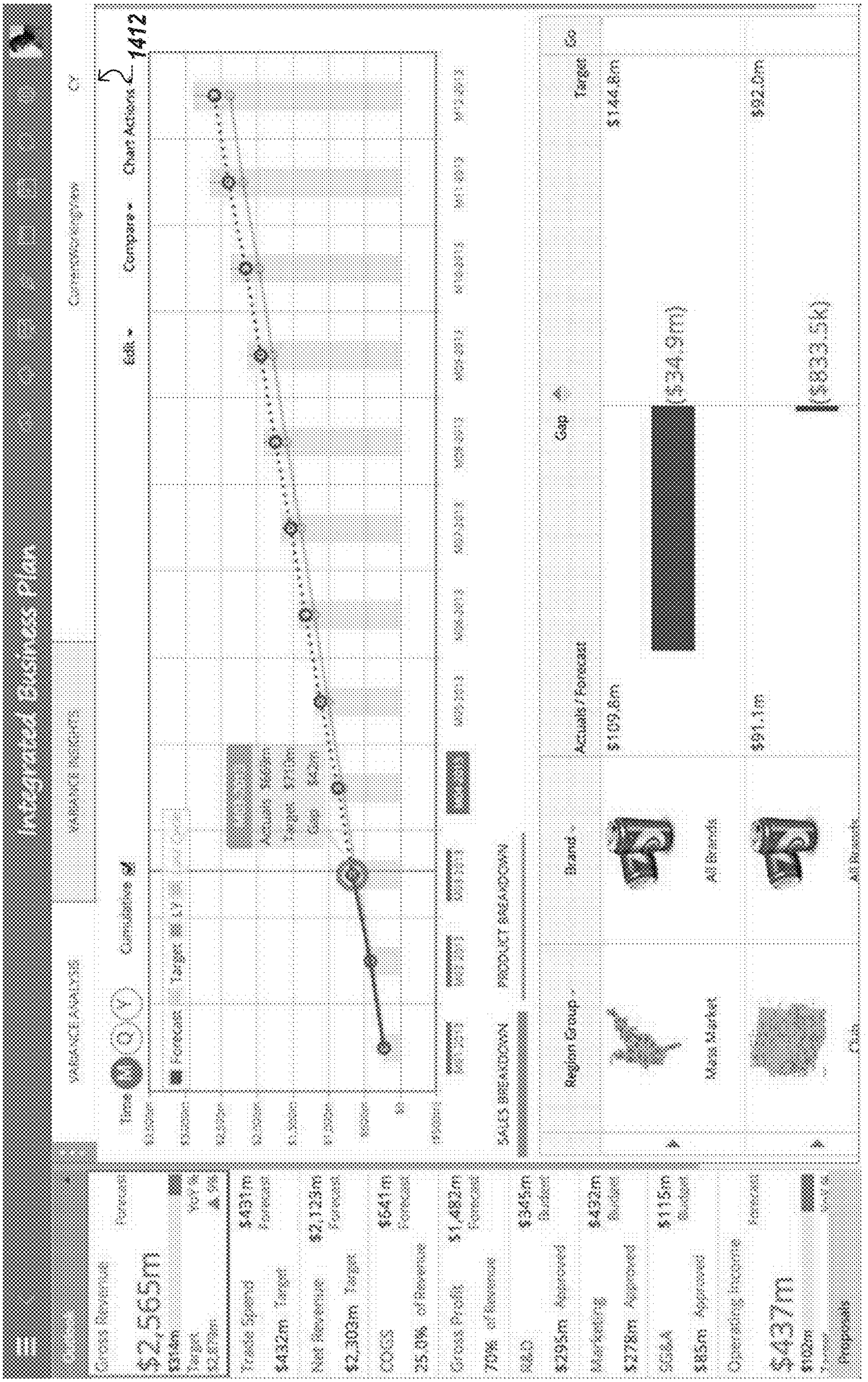
Figure 14I:
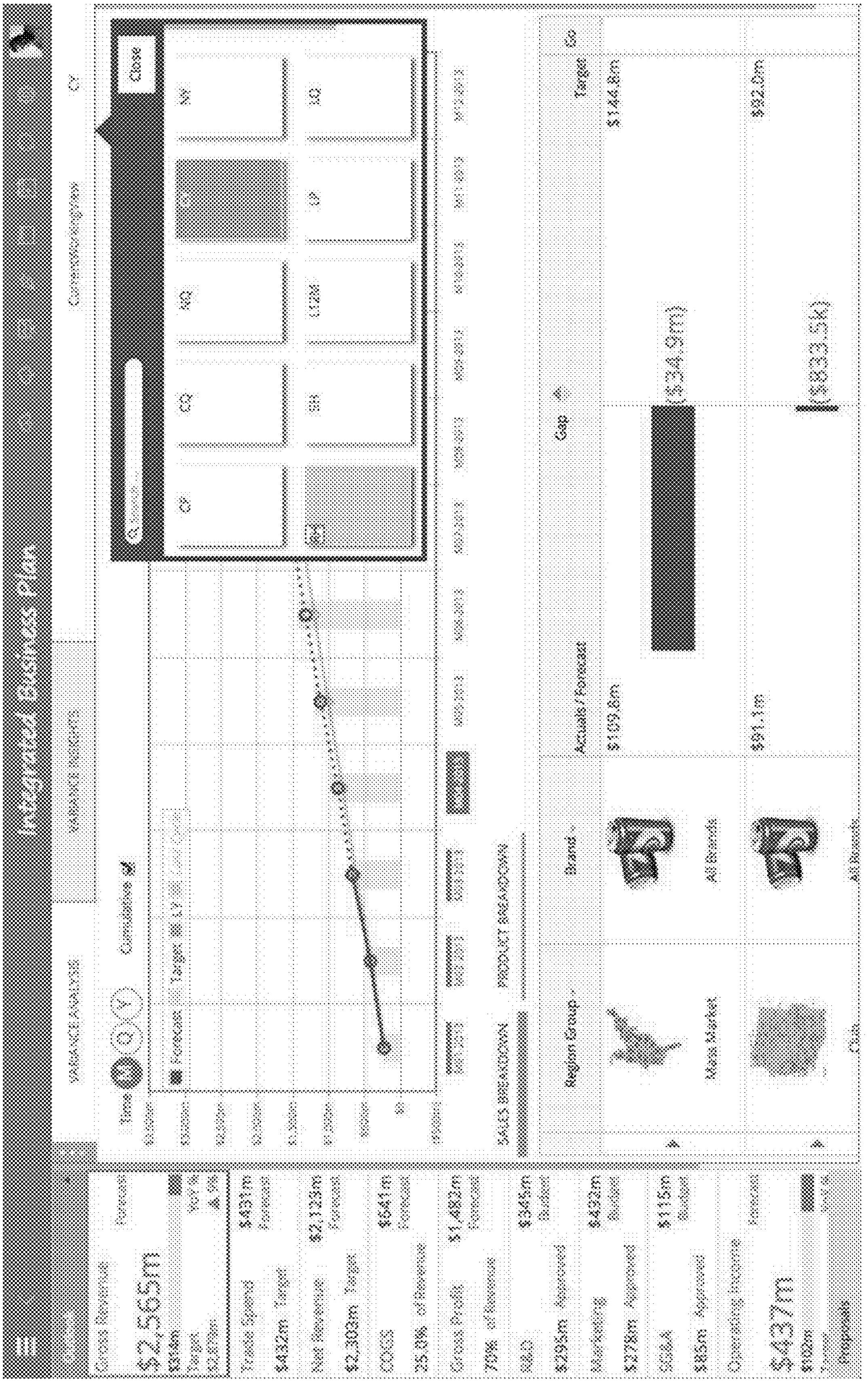
Figure 14J:
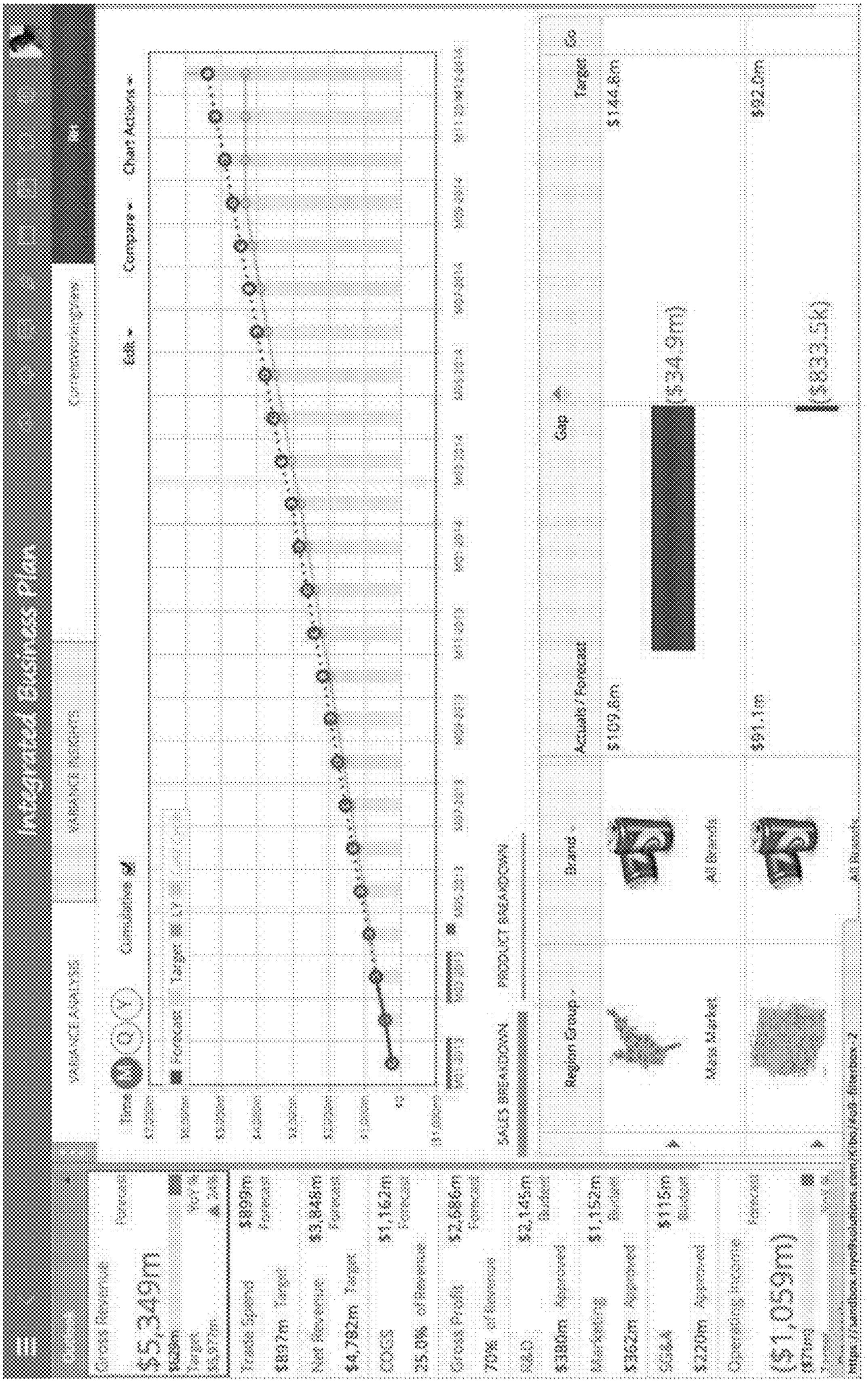
Figure 14K:
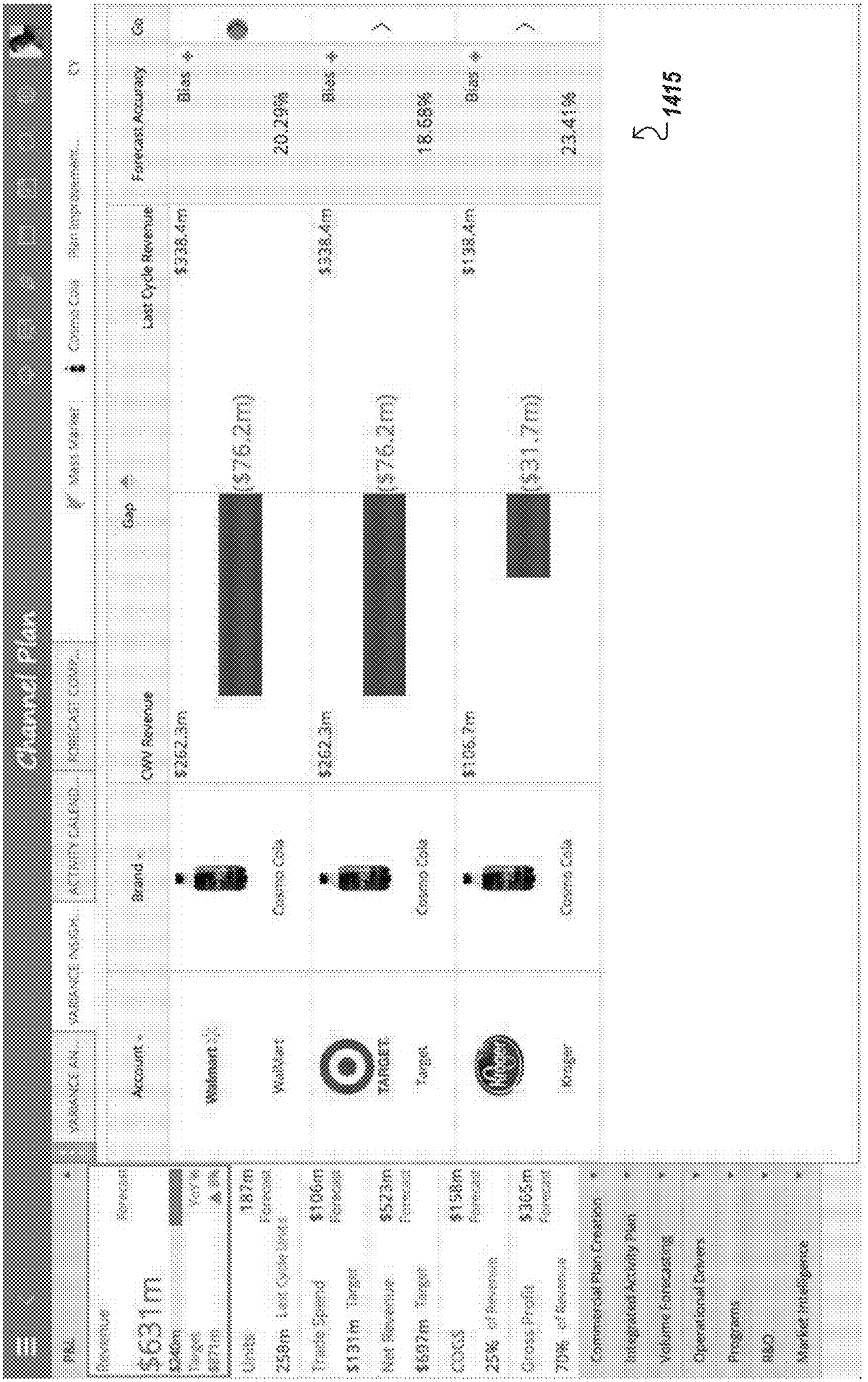
Figure 14L:
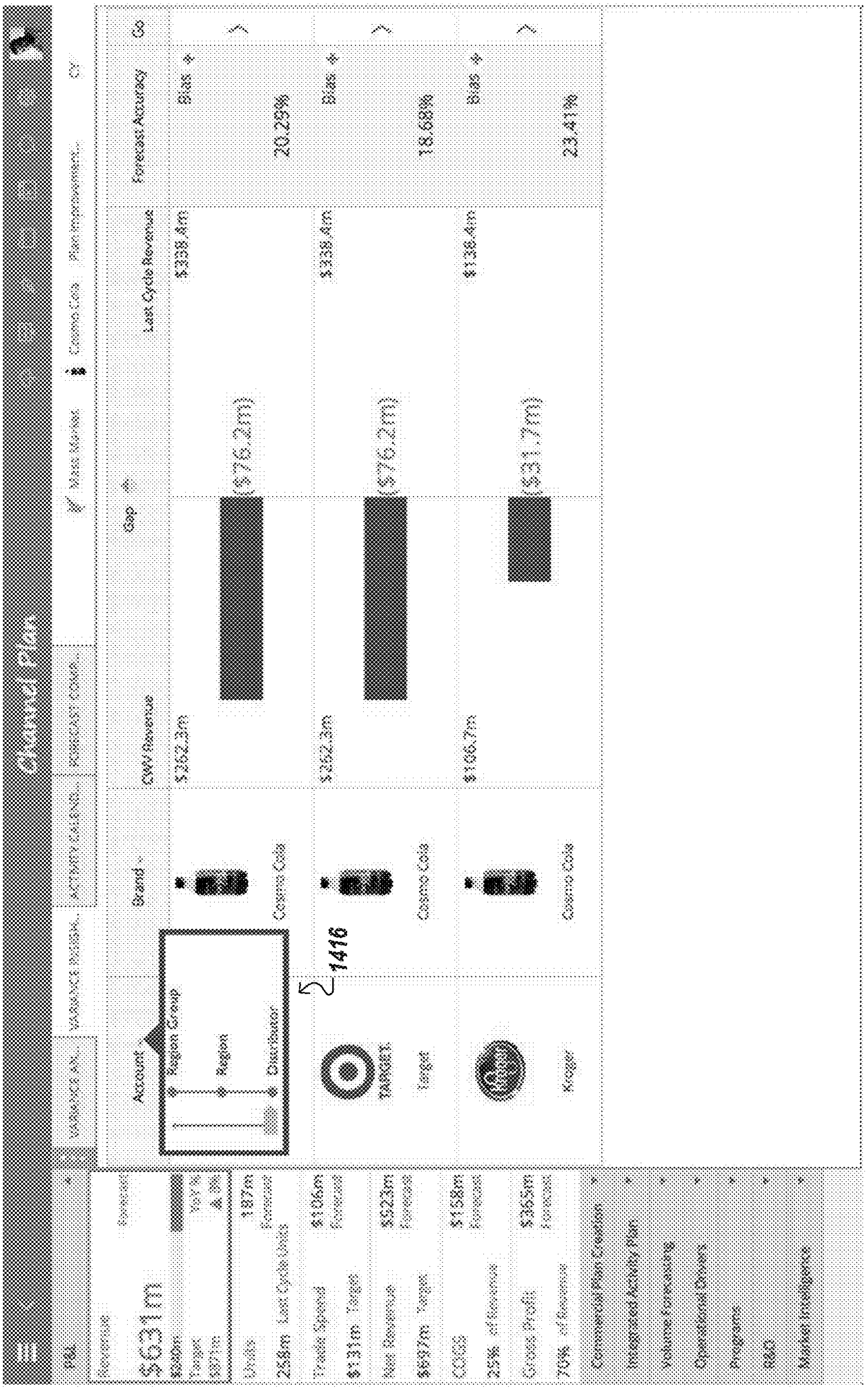
Figure 14M:
Figure 14N:
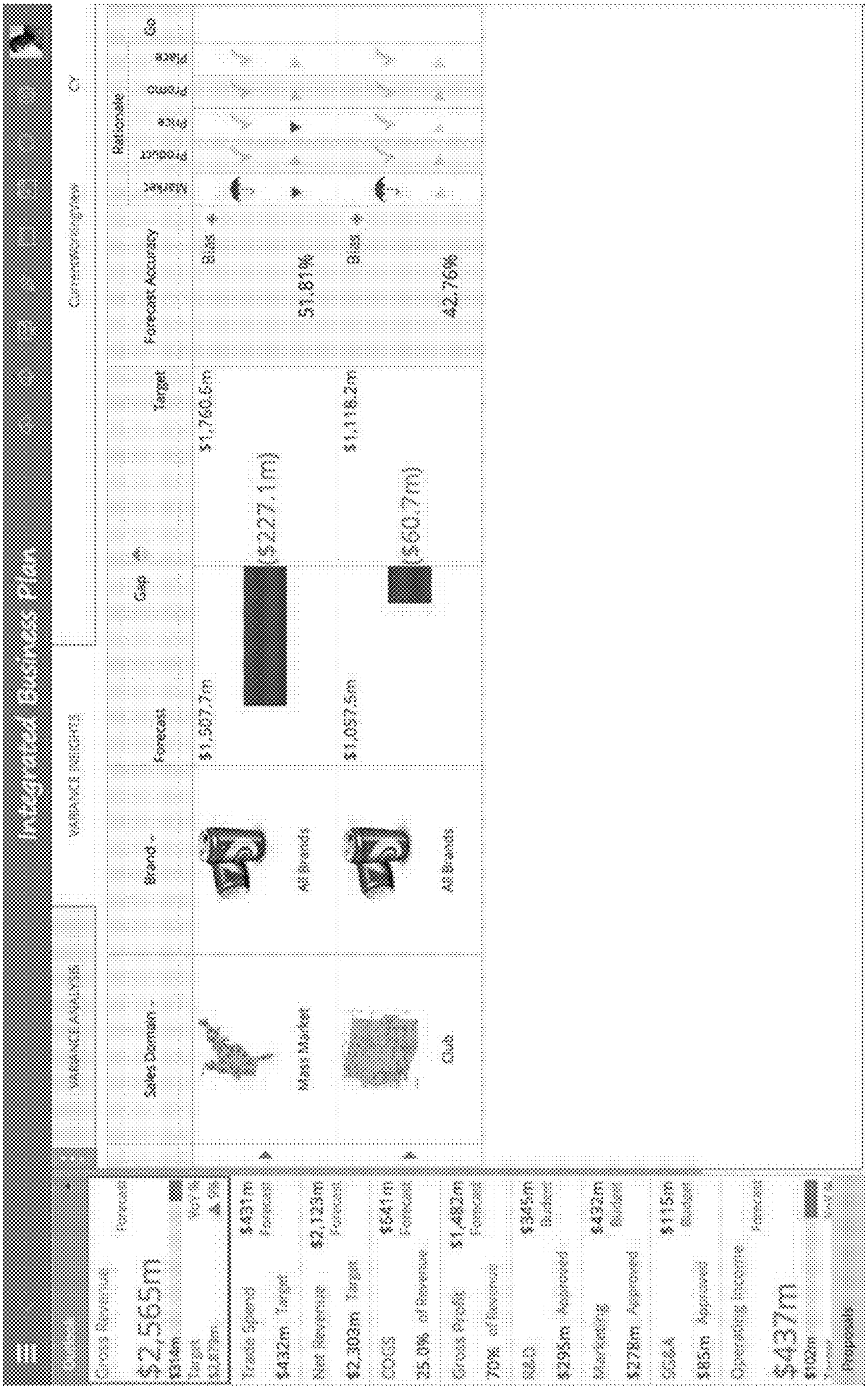
Figure 140:
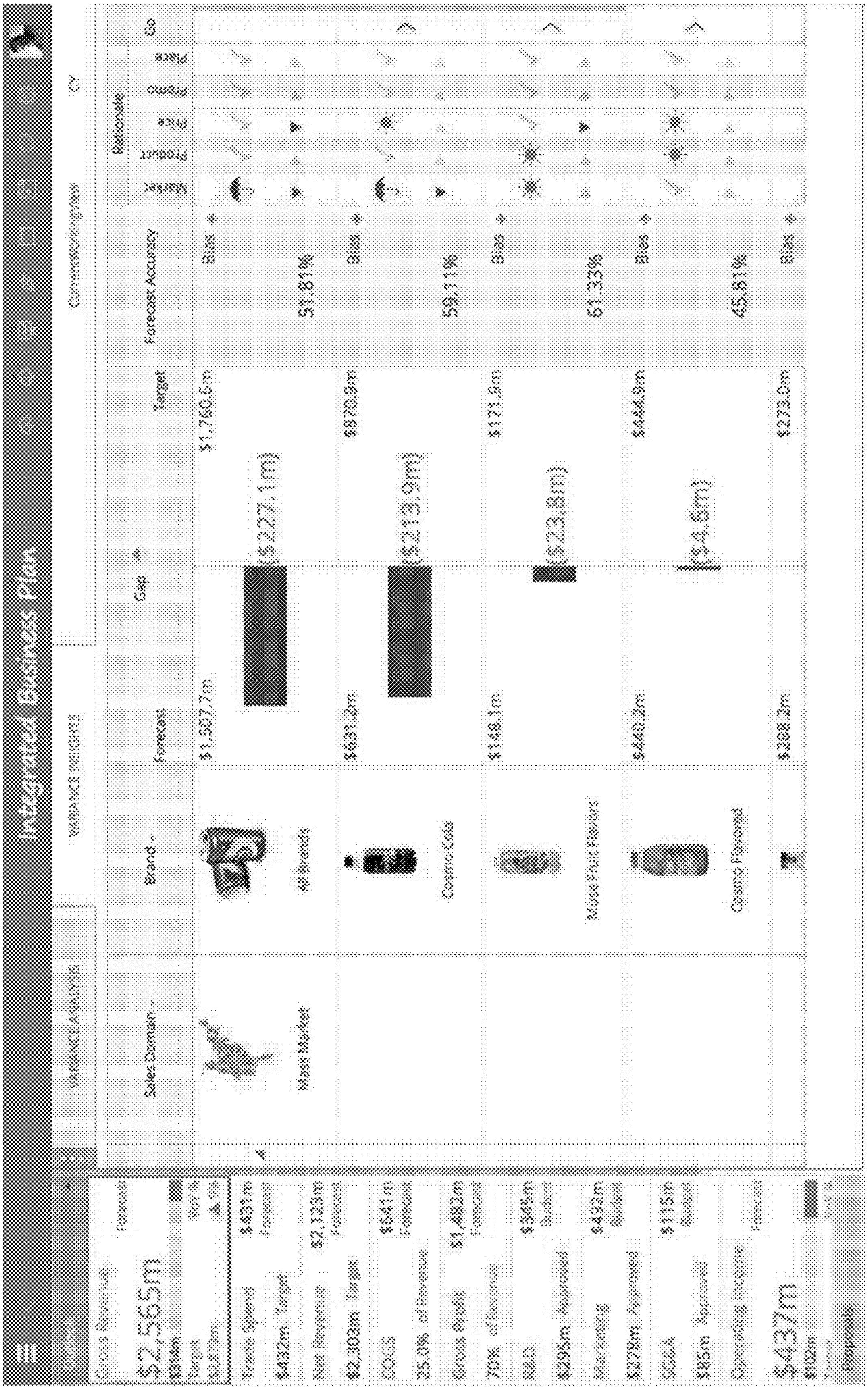
Figure 14P:
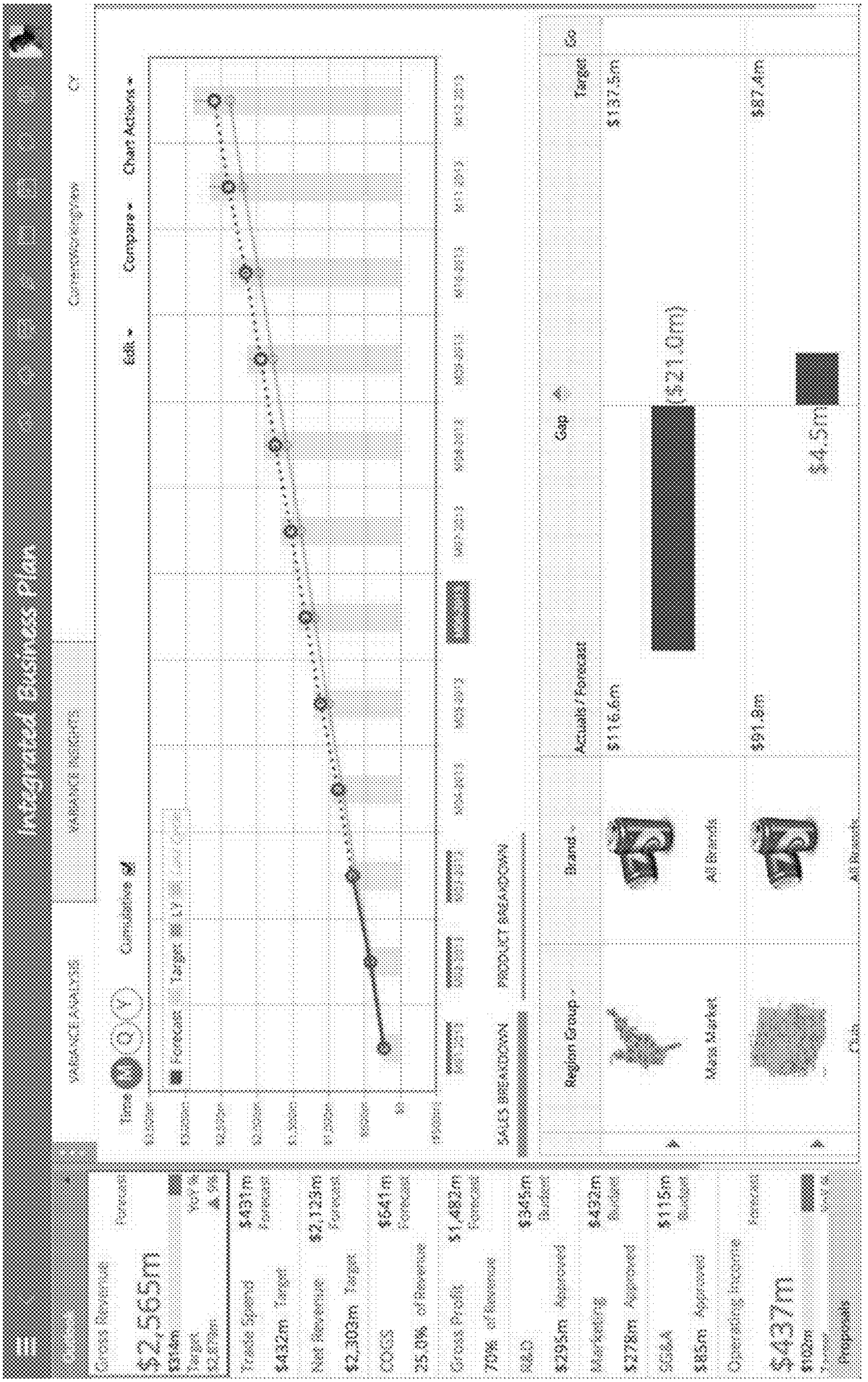
Figure 14Q:
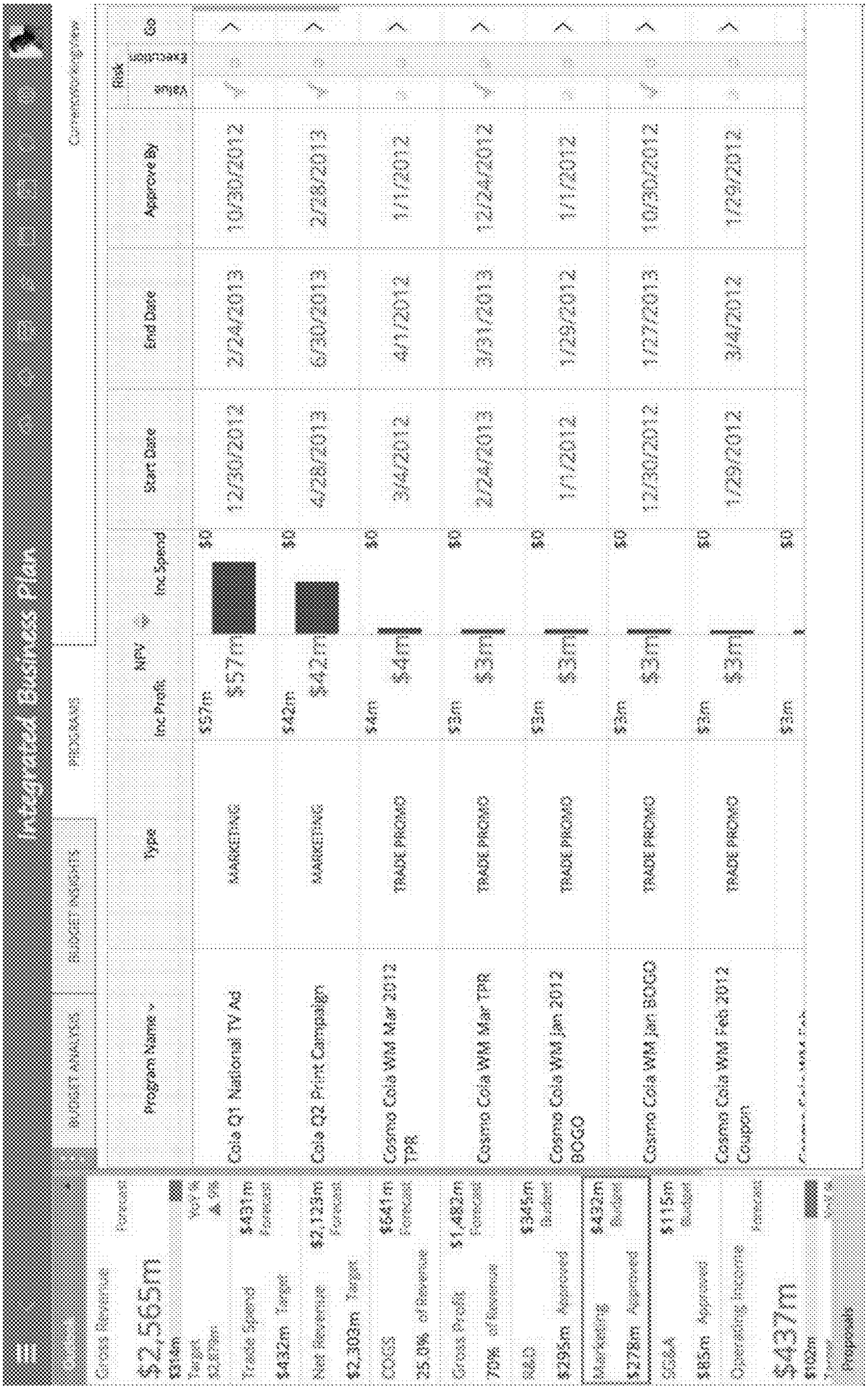
Figure 14R:
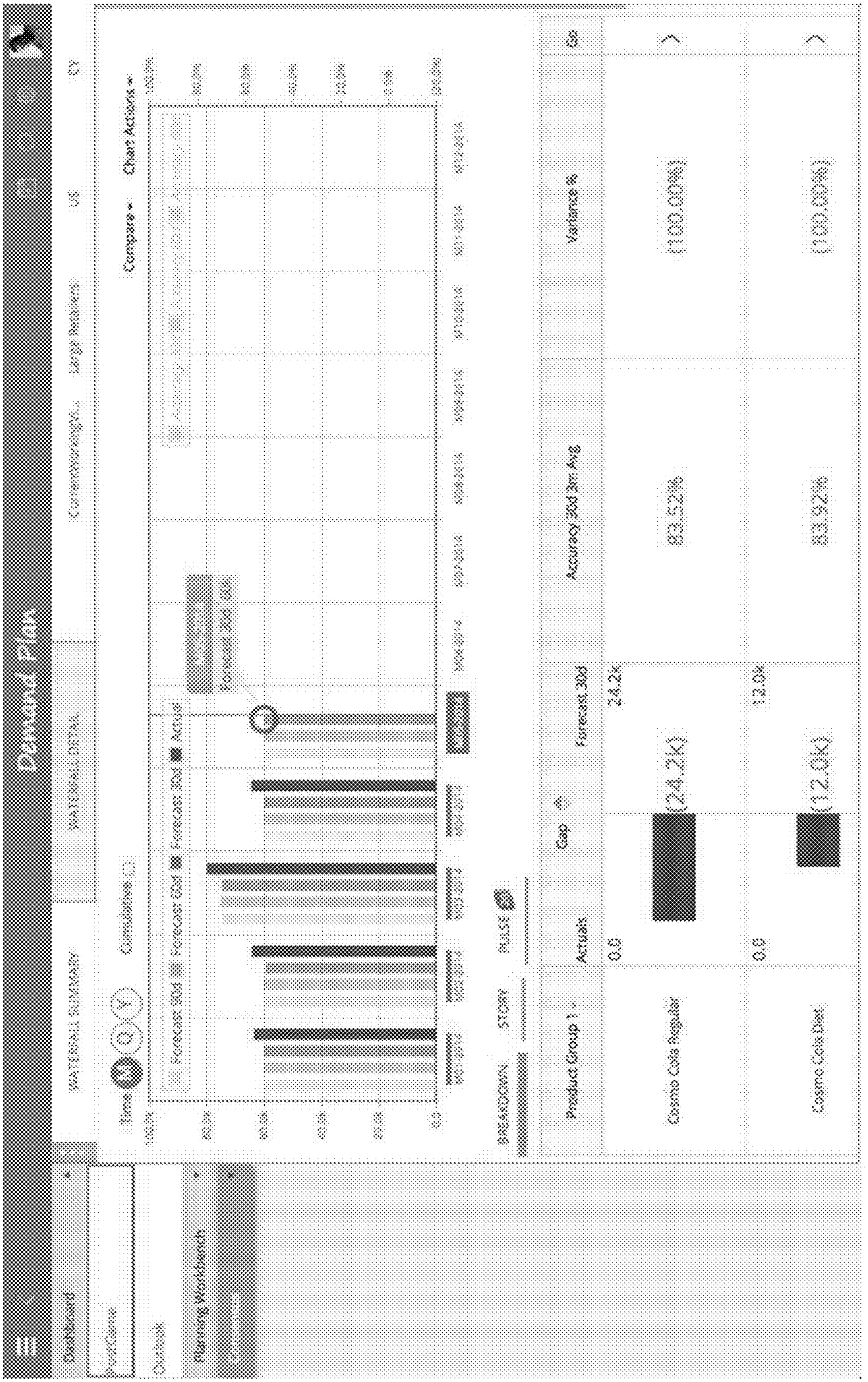
Figure 14S:
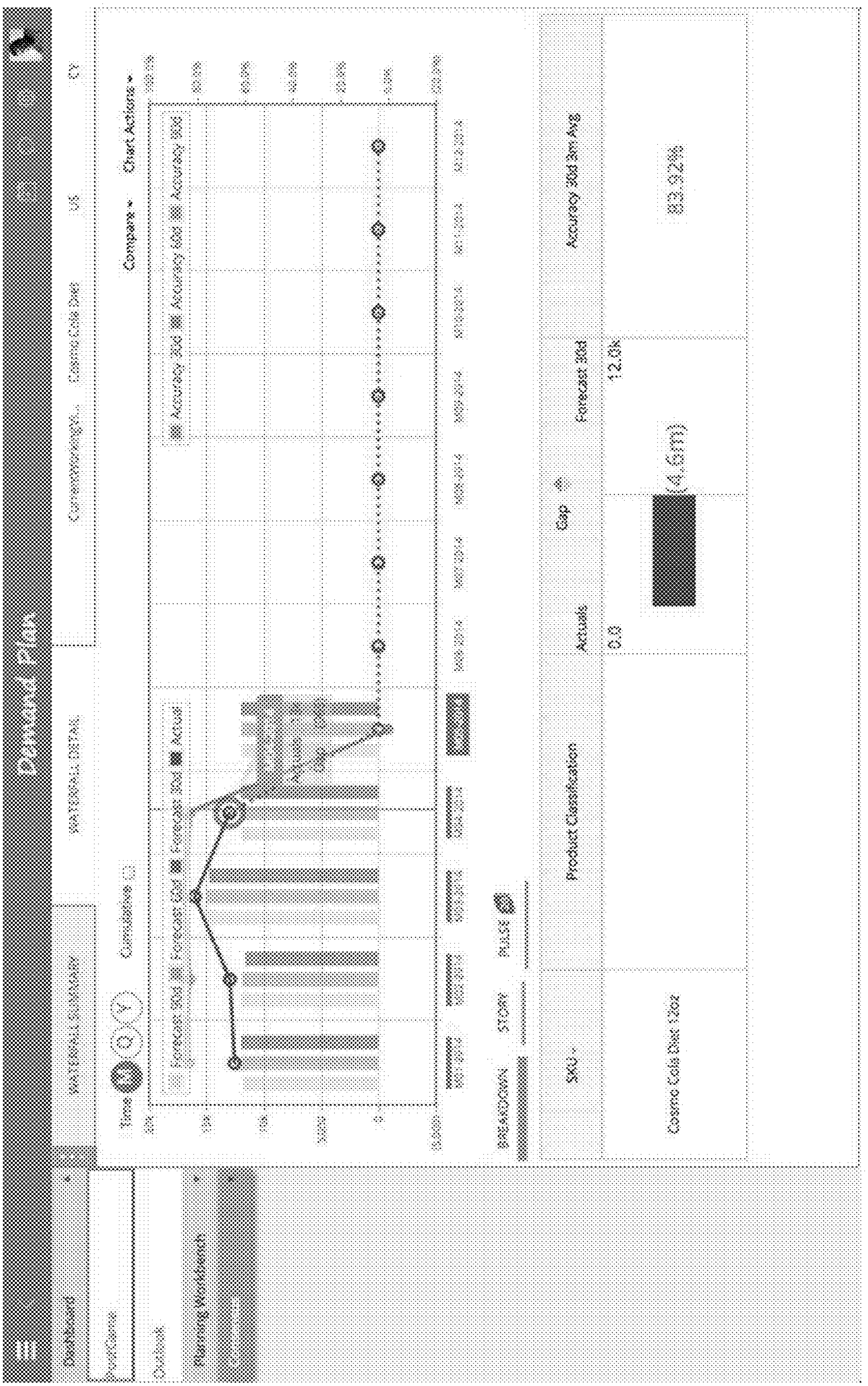

Turning now to the examples of FIGS. 14A-14S, further example screenshots are presented illustrating additional examples and features in connection with user interfaces that can be provided in connection with a plan modeling system and plan models managed and used by the plan model (or planning) system. Referring first to FIG. 14A, in some implementations a tower view 1402 can be provided that is based on underlying plan models and other business models. The tower view can provide a dashboard-type view of various high-level planning metrics defined or recorded in an underlying plan model to thereby provide a user with a summary of measures of interest to the user that relate to goals defined within the plan model. The tower view 1402 can be displayed alongside other windows in a working pane 1404 of the user interface. The working pane can toggle between a variety of different views showing various representations of plan model information (including examples described herein), while the tower view remains presented. These views in the working pane can be interactive and users can perform planning activities using the graphical interfaces and representations corresponding to various plan models presented in the working pane.

In addition to presenting useful information to a user, such as metrics that pertain to particular goals modeled in plan models of the system, the tower view can also serve as a navigation tool for a user interface of a planning system utilizing and managing the plan models. For instance, each cell of the tower view can correspond to a respective goal, or key performance indicator, within a plan (as modeled by a corresponding plan model). As a user navigates between plan models, different, corresponding tower views can be presented that correspond to the selected plan model. For instance, while a first tower view can be presented (as in FIG. 14A) when an Integrated Business Plan plan model is selected and viewed within the user interface, selecting another plan model, such as a Channel Plan plan model in the example of FIG. 14E, can cause a corresponding tower view to be presented with goal metrics relevant to that particular plan modeled by the plan model. Selecting a particular one of the tower cells, such as "Gross Revenue", can cause one or more views (such as shown in working view 1404 of the example of FIG. 14A) can populate or be made available (e.g., through tabs or additional navigation tools) in the working view. As shown in FIG. 14D, if a user selects a different one of the goal metrics in the tower view, a different view or set of views can be presented (e.g., within the working view) in response to the selected goal metric (e.g., Trade Spend).

While a user can desire to have the tower view present (e.g., as a summary view or navigation aid), the user can also have the option of collapsing the tower view, such as shown in FIG. 14B. A tower view can be customized according to the preferences of a user. For instance, the user can be associated with a subset of the plan models in the planning system, and cells in the tower view can reflect goals and goal-related metrics relevant to and based on this subset of plan models. A user can also designate which metrics are to be included in the cells of the tower view, as well as the order of the metrics.

As shown in FIGS. 14C and 14F, a tower view can categorize the metrics included in the tower view. For instance, an outlook category (as shown in the example of FIG. 14A) can include a set of metrics that relate to the general outlook of an organization or business unit, such as Gross Revenue, Trade Spend, Net Revenue, etc. Other categories of metrics, such as shown in the example of FIG. 14F, can also be defined for a plan model (e.g., a Channel Plan), such as a Proposals category, Programs category, and Post Game category of metrics. Selecting a different one of these categories in the tower view can cause a different set of goal metrics within the selected category to populate the tower view. As noted above, different categories and metrics can be included in respective tower views of different plan models. For instance, in FIG. 14C, an Integrated Business Plan plan model is active and a different set of categories and goal metrics are provided. Users can also configure the categories and associated goal metrics to personalize their tower view. A default tower view, with a default set of categories and goal metrics can also be determined and provided, for instance, based on the roles and plans associated with the user. Some goal metrics can be key performance indicators. A particular goal metric can also be included in multiple different categories, and even multiple different plan models, and categories and plan models can overlap in their scope.

FIG. 14F includes a time-axis representation of plan model metrics within a corresponding working view. Different metrics can be associated with respective sets of different working view types. Accordingly, different working views may be available for different metrics, as some working views will be more relevant to some types of metrics than others. A mapping can be defined to provide associations between each metric and a respective subset of working views provided through the plan modeling user interface. Time-axis representations can serve as another example of a category of working views available through the plan modeling user interface.

As illustrated in the example of FIG. 14F, the time-axis representation can be user-configurable, allowing a user to examine plan model data at varying levels of granularity and along different time horizons, or windows. Individual plans modeled by corresponding plan models may involve planning progress of various goals according to different scopes. Some plans can include measures that account for daily, weekly, monthly, etc. measures. The duration of a plan can also vary, depending upon the subject matter of the plan. For instance, an Accounting plan can have a different duration than a Marketing plan, and so forth. The duration of a plan can correspond to its horizon.

Depending upon the plan, and how it is defined through its corresponding plan model, various options can be provided allowing users to examine the plan through various time-based views. For example, aspects of a plan (e.g., an Integrated Business Plan) can be viewed along a time axis and the view can be adjusted through the user interface according to various tools. For instance, actuals, current forecast, and previous forecast, on a month-by-month basis, can be overlaid in a time-axis view 1408 of the example of FIG. 14F. In FIG. 14F, the granularity of the view can be monthly. Through control 1410, the user can adjust the level of granularity of the display 1408. For instance, in FIG. 14G, selection of a quarterly view (through control 1410) can change the time-axis view 1408 accordingly. The levels of granularity that are presented as options to a user in control 1410 can be based on the underlying plan model and the granularity of the measures within the model. For instance, if a plan model allows a finest granularity for measures at a week basis, it can permit presentation of information of the plan model at levels of granularity including weekly, monthly, quarterly, yearly, etc. If the model's lowest granularity is at the month level (or higher) the control 1410 may not allow selection of a weekly level of granularity (although monthly, quarterly, annual, etc. levels of granularity are preserved for adjusting the time-axis presentation of plan model data.

In some use cases, a cumulative view can be supported and enabled, showing how measure values cumulate over a time horizon. For instance, as shown in the example of FIG. 14H, a user can select to view a presentation within a time-axis view as a cumulative measure. For instance, the actual and forecast values can each be cumulated and presented according to a horizon allowed by the underlying plan model. This can be useful, for instance, in assessing gaps that may be developing between the forecast and the actual value of metrics presented in the time-axis view. Cumulative time-axis presentations can also be adjusted, for instance, according to a level of time granularity or time horizon. For instance, a user can adjust the time horizon by selecting tool 1412. In some implementations, as illustrated in FIG. 14I, selection of tool 1412, can cause a window to be displayed that allows a user to select from various time horizons supported by the underlying plan model. Indeed, in some implementations, the time horizons presented in the window can be dynamically identified based on the scope of the plan modeled by the plan model for inclusion in the window. Such alternative time horizons can include, for instance, current year (CY), current quarter (CQ), next quarter (NQ), current period (CP), next year (NY), rolling horizon (RH), last twelve months (L12M), last period (LP), last quarter (LQ), and strategic horizon (SH) (e.g., a strategic horizon of time that is of specific interest to that particular plan, the duration of which can be defined in the plan model), among other examples. In one example, shown in FIG. 14J, a user has selected a different time horizon (e.g., from the window corresponding to tool 1412), such as rolling horizon, resulting in a re-rendering of the time-axis presentation (e.g., of FIGS. 14H and 14I) to present the plan model data according to the newly selected time horizon.

In some implementations, additional presentations can be provided to represent information of an underlying plan model, provide opportunities to contribute, edit, or add data to the plan model, and navigate to other views of the plan data. For instance, as shown in FIG. 14K, an interactive grid view 1415 can be provided. The grid view can present various business entities within the plan model and can be organized in accordance with hierarchical or other relationships between the business entities and other entities. For instance, selection of a goal metric (e.g., Revenue) can cause a corresponding representation of business entities, such as accounts and brands, that correspond to the selected goal metric. In the example of FIG. 14K, the grid can show the respective revenue contributions of a selected brand (e.g., Cosmo Cola) through a particular distributor (e.g., Walmart, Target, Kroger). The grid can be interactive allowing users to configure what measures are presented corresponding to combinations of business entities, to show how these various combinations contribute to the overall, corresponding goal metric. For instance, as shown in FIG. 14L, rather than presenting the revenue contributions of the Cosmo Cola brand by distributor, a control 1416 can allow a user to alternatively select and have displayed the contributions of the Cosmo Cola brand by Region, Region Group, Channel, etc.

The grid view can also be utilized to assist in navigating among views of various information embodied in an underlying plan model (e.g., a Channel plan model). For instance, selecting the revenue measure or gap value corresponding to the Cosmo Cola-Target combination can cause more detailed views, including graphs, time-axis, and other graphical representations, to be presented relating to that particular combination. Additionally, a user can select a grid cell to gain access to the underlying model values and edit the values. For instance, as shown in FIG. 14M, a user can select the revenue value corresponding to the Cosmo Cola-Walmart combination and change the value (or suggest a new value) directly from the grid user interface. Other user interfaces and representations described herein or otherwise provided through a plan model system user interface can allow for similar editing of underlying plan model measure values, among other examples.

Grid values can be sorted, for instance, to create leaderboard views, and allow users to identify segments of their business that are in most (or in least) need for attention. In the example of FIG. 14N, another grid view is shown corresponding to an integrated Business Plan plan model and a Gross Revenue goal metric. Further the metric has been selected (or has defaulted) to a presentation that pairs sales domain with brand to identify each pair's contribution to the Gross Revenue goal metric. The grid can be sorted, for instance, in descending order according to the gap value of each grid row (and its corresponding sales domain-brand pairing). The grid can be sorted according to other measures, in ascending/descending order, among other features. In this particular example, by sorting by gap (e.g., the gap between actual revenue and forecast revenue, as calculated and defined in the underlying Integrated Business Plan plan model), a user can identify that Mass Market is underperforming relative to the Club sales domain. The user can interact with the grid to research additional details relating to the Mass Market sales domain's underperformance. For instance, as shown in FIG. 14O, a user can select the Mass Market sales domain cell, causing the grid to expand to show the Sales Domain-Brand pairing at a finer level of granularity (e.g., for each individual brand within the sale domain. The same sort can be applied to identify which specific brand is contributing the most to the underperformance of the mass market sales domain. In this example, it can be easily identified from the grid presentation, through the sort by gap, that Cosmo Cola is underperforming the most within this domain.

Turning to FIG. 14P, grid views and leaderboards can be further filtered and sorted, based on user's interactions with other views in the user interface, such as a time-axis view concurrently presented with the grid view. The different views can be tied together in a sense, as both are based on the same underlying plan model, and interactions within one context can cause a re-rendering of the other view. For instance, in this particular example, selection of a particular time period (e.g., M06-2013) can cause the grid to be re-rendered to show the actuals and forecast information for revenue in June 2013. Further, the sorting of the grid by gap value can also be refreshed (based on the interaction with the corresponding time-axis view) to show which pairing of sales domain and brand is underperforming the most in the selected time period. Each interaction allows a user to view a different snap shot of a corresponding portion of the information modeled in a corresponding plan model. Indeed, the grid presentation can be based on the plan model, including the type of measures that can be viewed, the various business entity pairing that are available and selectable, etc. For instance, FIG. 14Q shows another example of a grid view, in this instance, generated in accordance with a different plan model than the examples of FIGS. 14N-P.

Still additional type of views can be supported by an example plan model system user interface. Turning to FIG. 14R, a screenshot is shown that includes a view showing a waterfall presentation that includes, for each time period (at a selected level of granularity), each of the forecasts that have been at one point adopted for the time period. As discussed, forecasts can be adjusted periodically, either automatically, based on new source data, changes to assumptions, or changes to other related metrics, or manually by a user. The changes can attempt to bring the forecast measure values more in-line with the world that is known to the corresponding plan model and user. Previous forecasts (i.e., that have been replaced by updated forecasts) can be persistently stored or modeled, allowing for the current forecast to be compared against former forecasts. This can help the user observing the user interface presentation to assess trends, based on these changing forecasts, as well as inform the accuracy of this or other time periods' forecasts. Additionally, the historic accuracy of forecasts can be determined as well from the historical forecast information. As shown in FIG. 14S, a representation of forecast accuracy can be presented along the time axis, allowing a user to identify trends in such forecast accuracy. The user can then select (or modify) particular current forecast measures that appear to be inconsistent with the trends expressed through the representation.

Figure 15A:
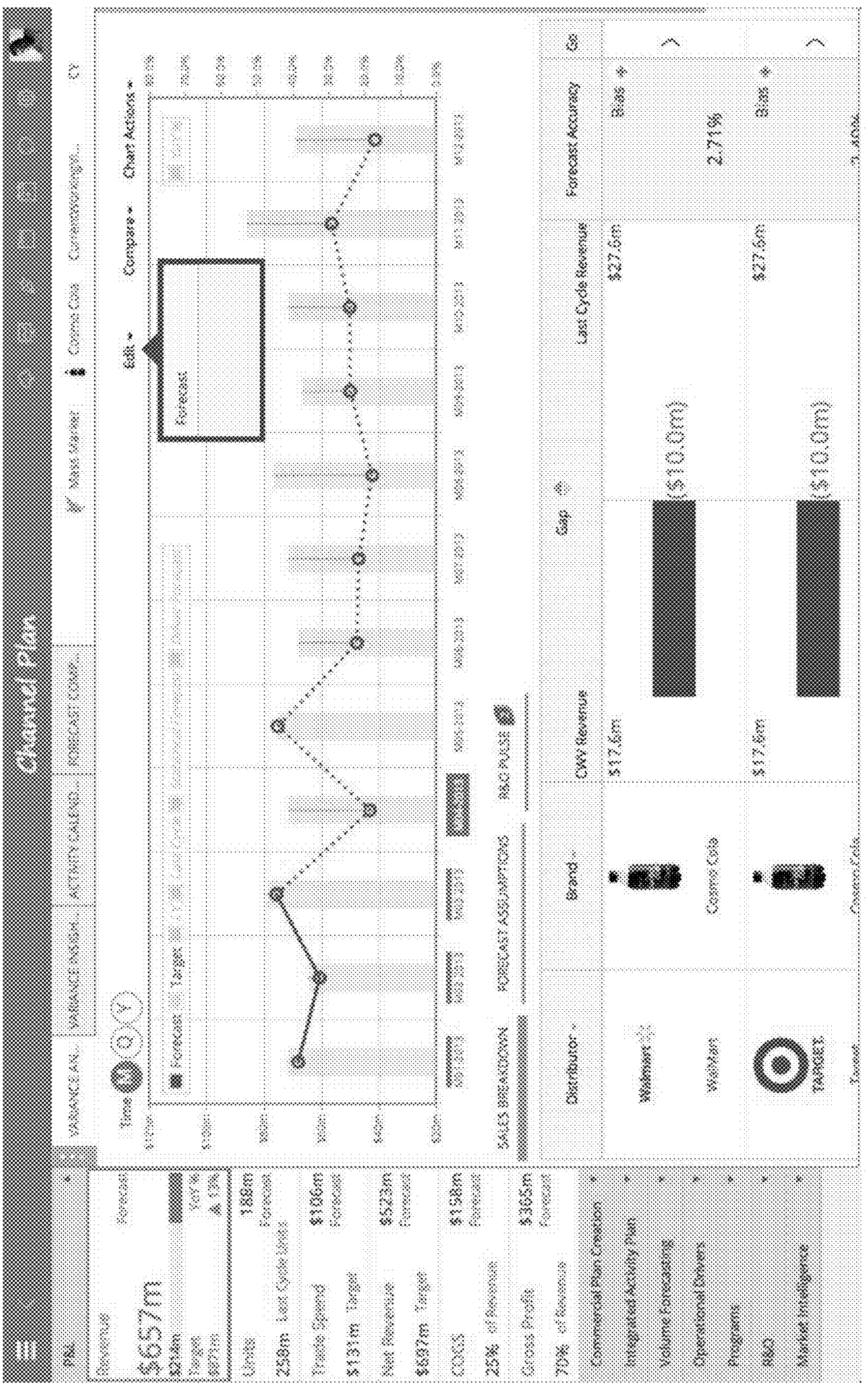
FIGS. 15A-15G are screenshots of example user interfaces for use in connection with one or more example plan models.
Figure 15B:
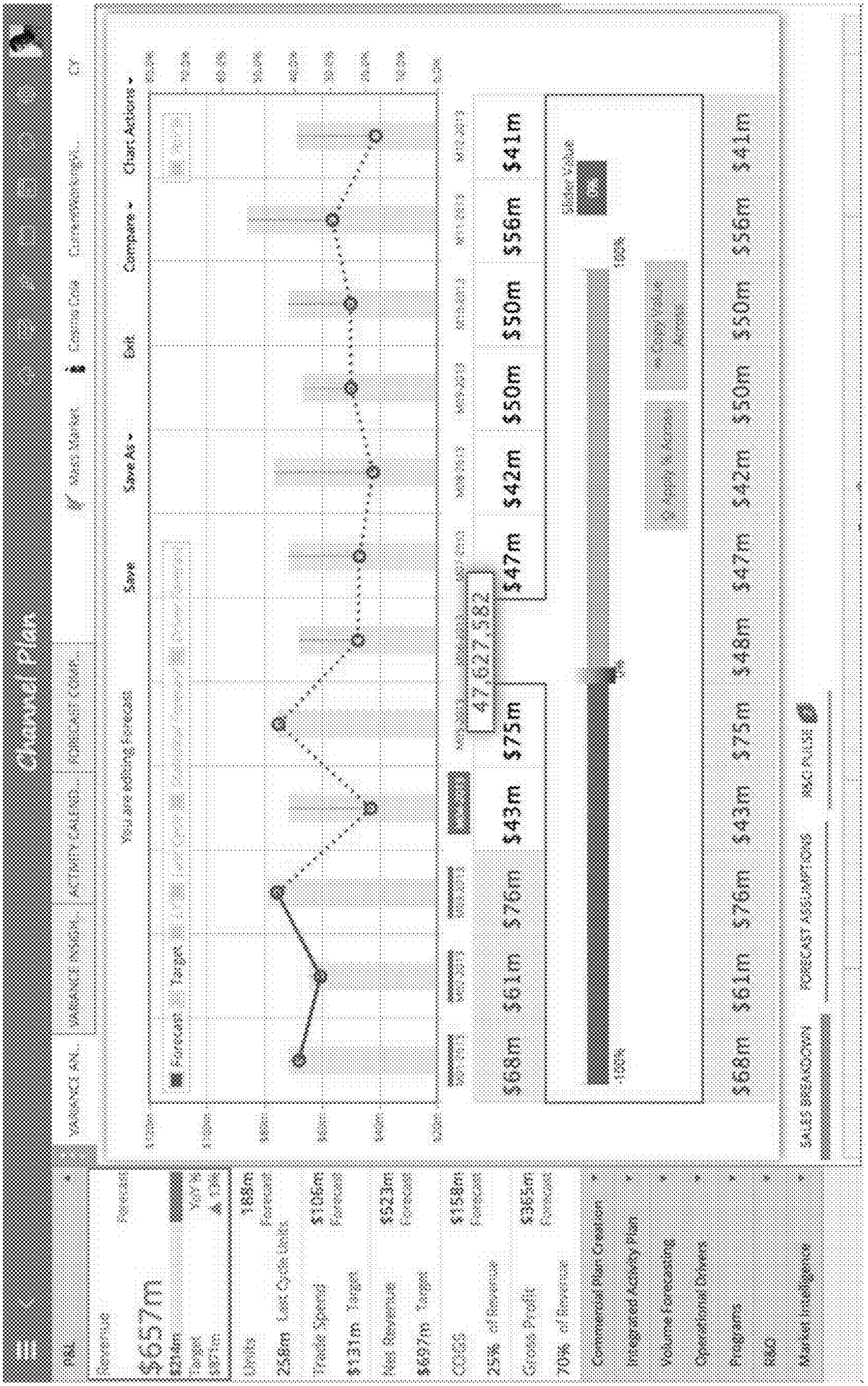
Figure 15C:
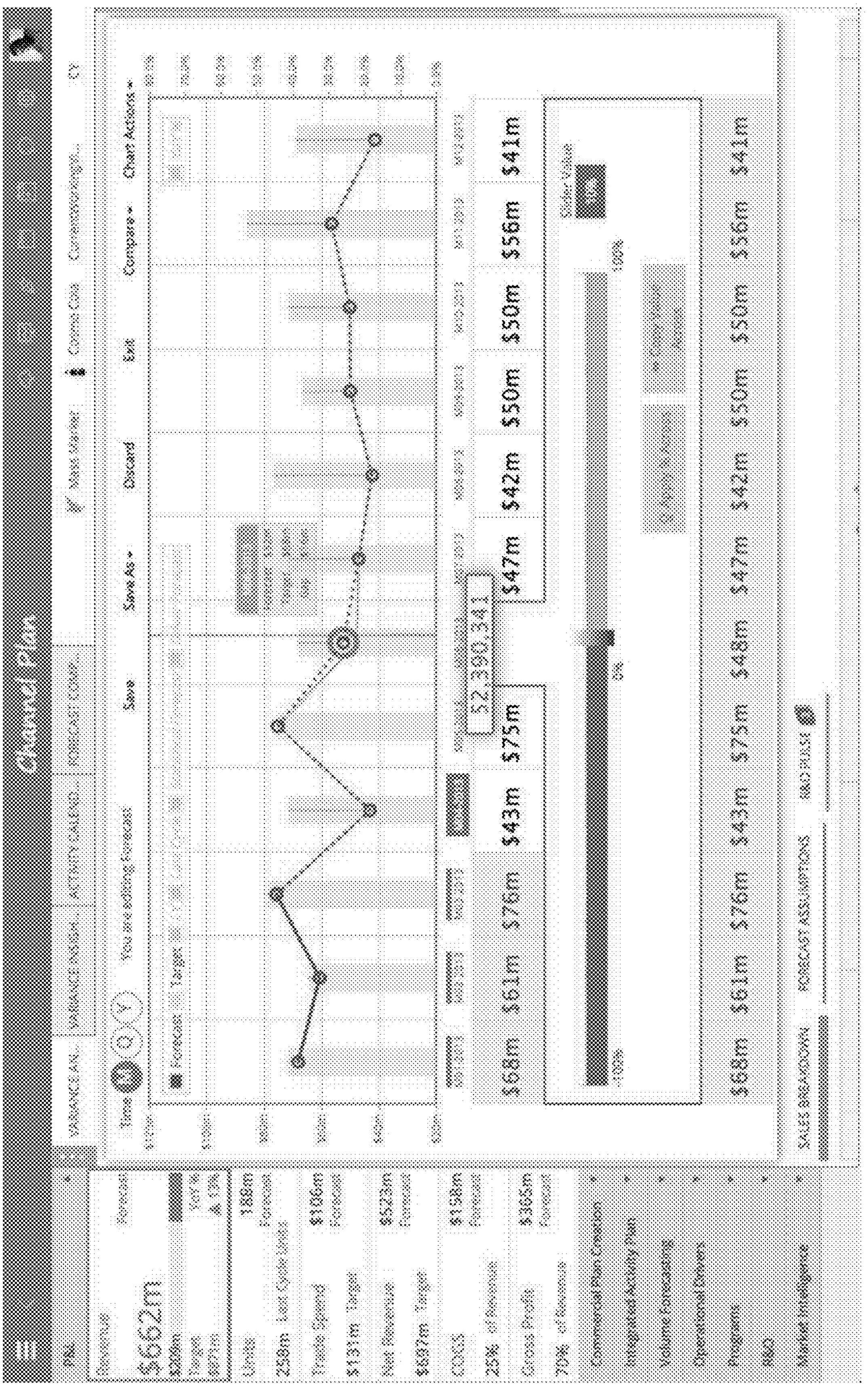

FIGS. 15A-15G illustrate further screenshots that can be provided in connection with scenario planning activities. A current working view is selected in this example and revenue measures and forecasts can be displayed that relate to and have been defined in connection with the current working plan view. As noted above, a user can test various hypothetical changes in scenarios driven by the plan model. User interfaces of the plan model system can facilitate interactive scenario building and planning. For instance, in FIG. 15A, a user can elect to edit a particular value, such as a forecast, within the current working plan (e.g., in connection with a scenario or hypothetical). Turning to FIG. 15B, a user interface can be provided that allows a user to select a particular one of the forecasts (e.g., by selecting a particular portion of the column/line graph representation corresponding to the forecast) and a slider tool can be provided allowing a user to change the value of the selected forecast (e.g., a revenue forecast for Mass Market distribution of Cosmo Cola in M06-2013). The user can change the value of this single, selected forecast, or apply the change across additional or all other forecast values that can still be changed (e.g., the corresponding period still lies in the future). For instance, a user can change a value of the forecast (using the slider control) by a particular value. That particular increase or decrease in value can, selectively, also be applied to one or more of the other remaining forecasts in that domain or market segment. Alternatively, the user can change the value of the selected forecast by a percentage value. Additionally, the user can elect to also apply that percentage change to other remaining forecast values (e.g., the forecast for Mass Market distribution of Cosmo Cola in M07-2013). As the user manipulates the value of the forecast (or other measures of the underlying plan model), the effect of this change can be illustrated in one or more (automatically updated) views of the plan model presented to the user, including the tower view. For instance, as illustrated in FIG. 15C, changing the selected revenue forecast value from $47,627,582 to $52,930,341 can result in the graphical representation being adjusted, as well as the aggregate revenue value presented in the top cell of the corresponding tower view. Indeed, (although not shown in this simplified representation of a user interface), the change can propagate across all key performance indicators (or goal metrics) whose value depends on revenue (e.g., Gross Profit) as represented in the tower view, or in any other graphical representation of the active plan model within the user interface. A user, as in the examples above, can navigate to other work views to assess other representations of the metrics updated on the basis of the change.

Figure 15D:
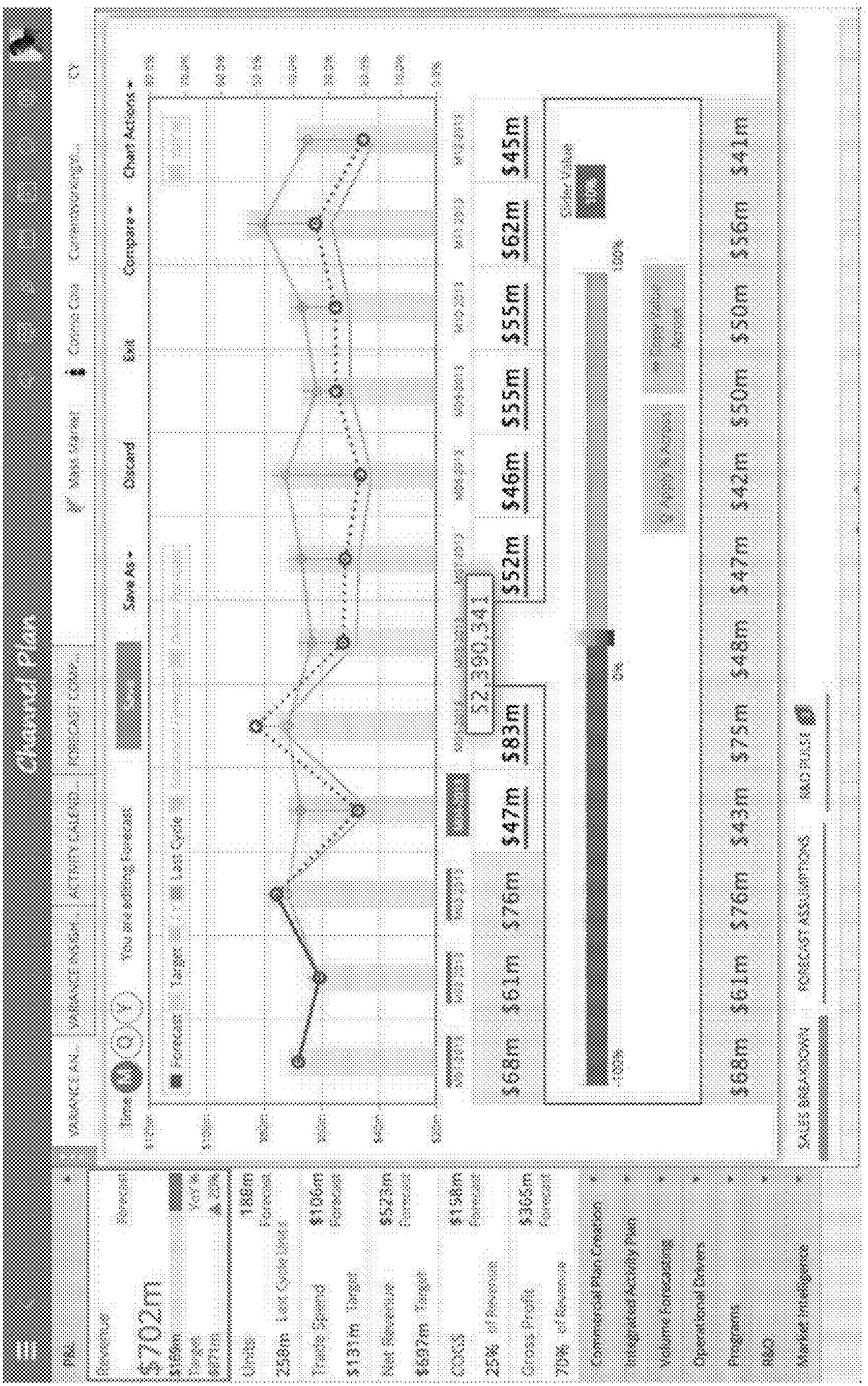

FIG. 15D illustrates an example where a user has not only elected to make a change to the selected forecast value, but to propagate this change (e.g., a uniform 10% increase) across the remaining monthly forecast measures modeled in the Channel Plan plan model. As key performance indicators can be based on the aggregate of revenue across all distribution channels, brands, etc. of an enterprise, modifying values of multiple forecasts (or other plan model measures) can result in potentially more substantial changes to the net key performance indicator (e.g., the Revenue forecast value for the entire enterprise represented in the top cell of the tower view of FIG. 15D), among other examples.

Figure 15E:
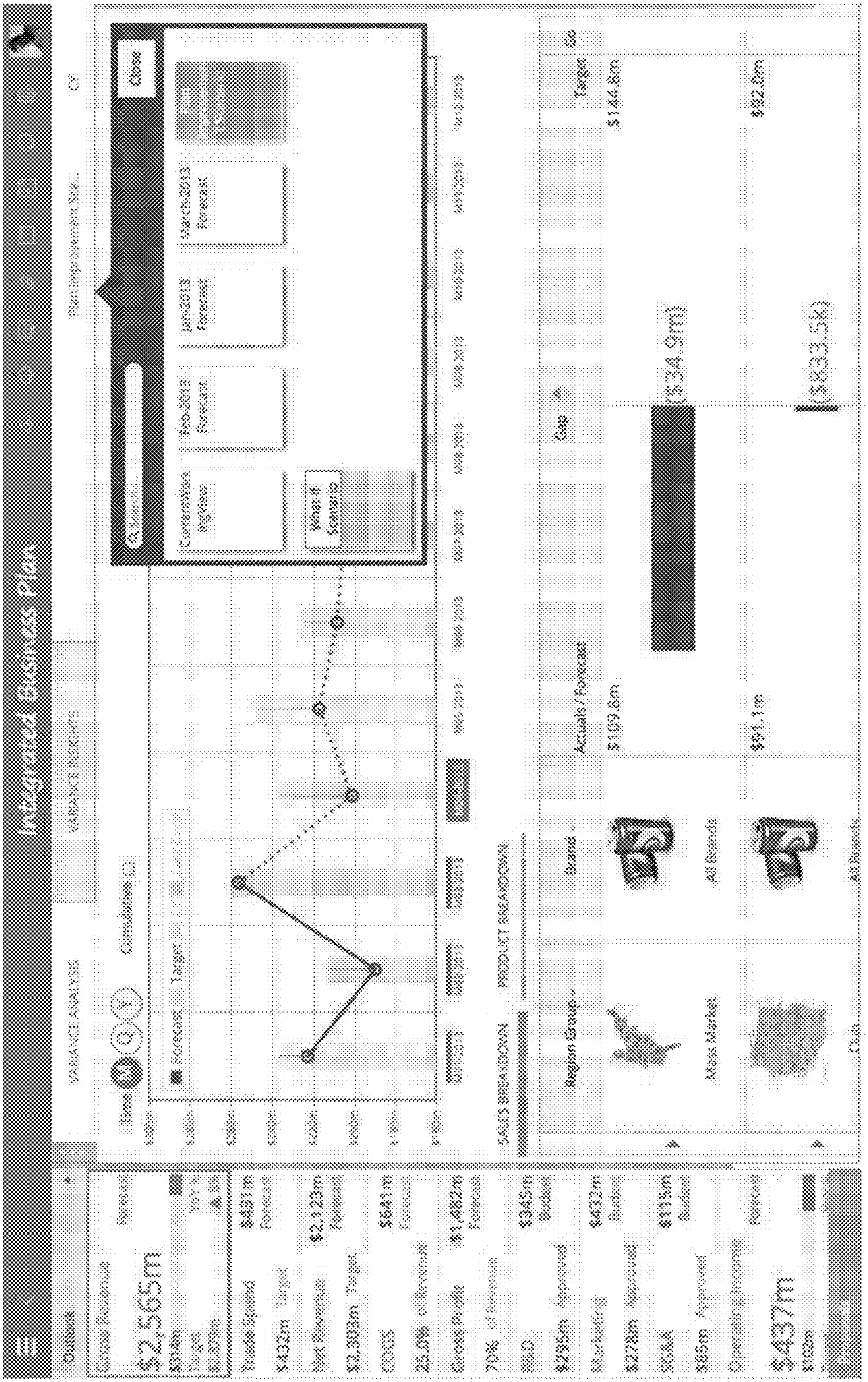

While a user can utilize planning system user interfaces as a sandbox for experimenting with various hypotheticals, the changes made to measure values during such sessions need not be permanent. Indeed, the original values (e.g., of a current working plan, or other base scenario) can revert back after the scenario planning session has completed. However, if the user identifies promising or more accurate alternative plan model measure values (e.g., forecast values, programs, costs, etc.), the user may wish to save the hypothetical changes made during the session as a scenario that the user can utilize to make or promote a corresponding business decision. In the example of FIG. 15E, a user has saved the changes made during the session as an alternate version of the plan, or a scenario. In this example, the user has named their scenario as the "plan Improvement Scenario". It can be saved alongside other scenarios that have been created by this or another user based on a particular plan model. For instance, base scenarios (that may be fixed, or require special authorization to define or edit) such as the Current Working View, or entered Forecasts, can be saved. These can nonetheless be accessed, allowing users to use these as a starting point for a new scenario within a scenario planning session. While changes may not be able to be saved to the underlying scenario directly, a new scenario can be created (while maintaining the base scenario used in the scenario planning session). These new scenarios (e.g., Plan Improvement Scenario) can then also be later used as a starting point for the same or a different user's scenario planning session.

Figure 15F:
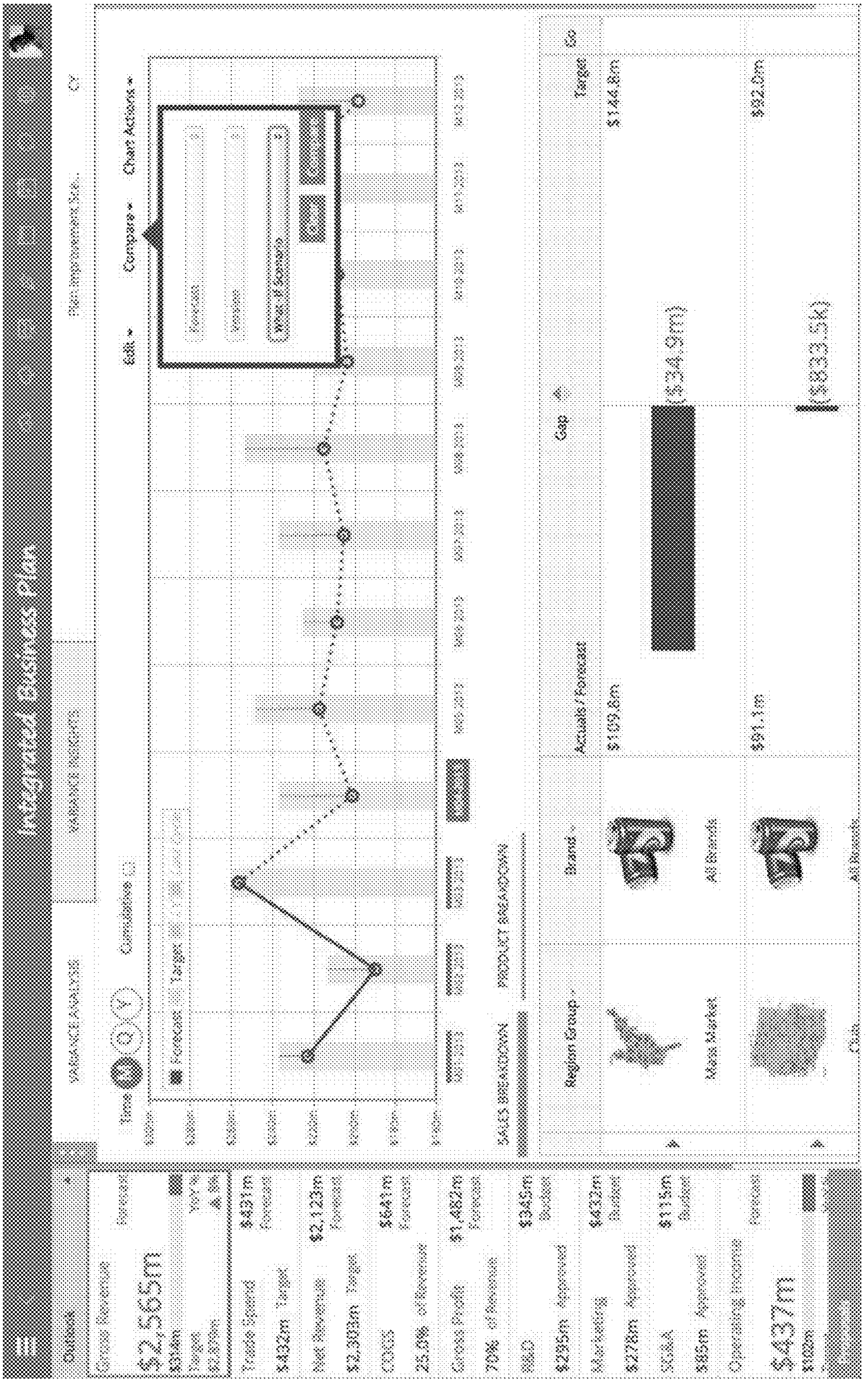
Figure 15G:
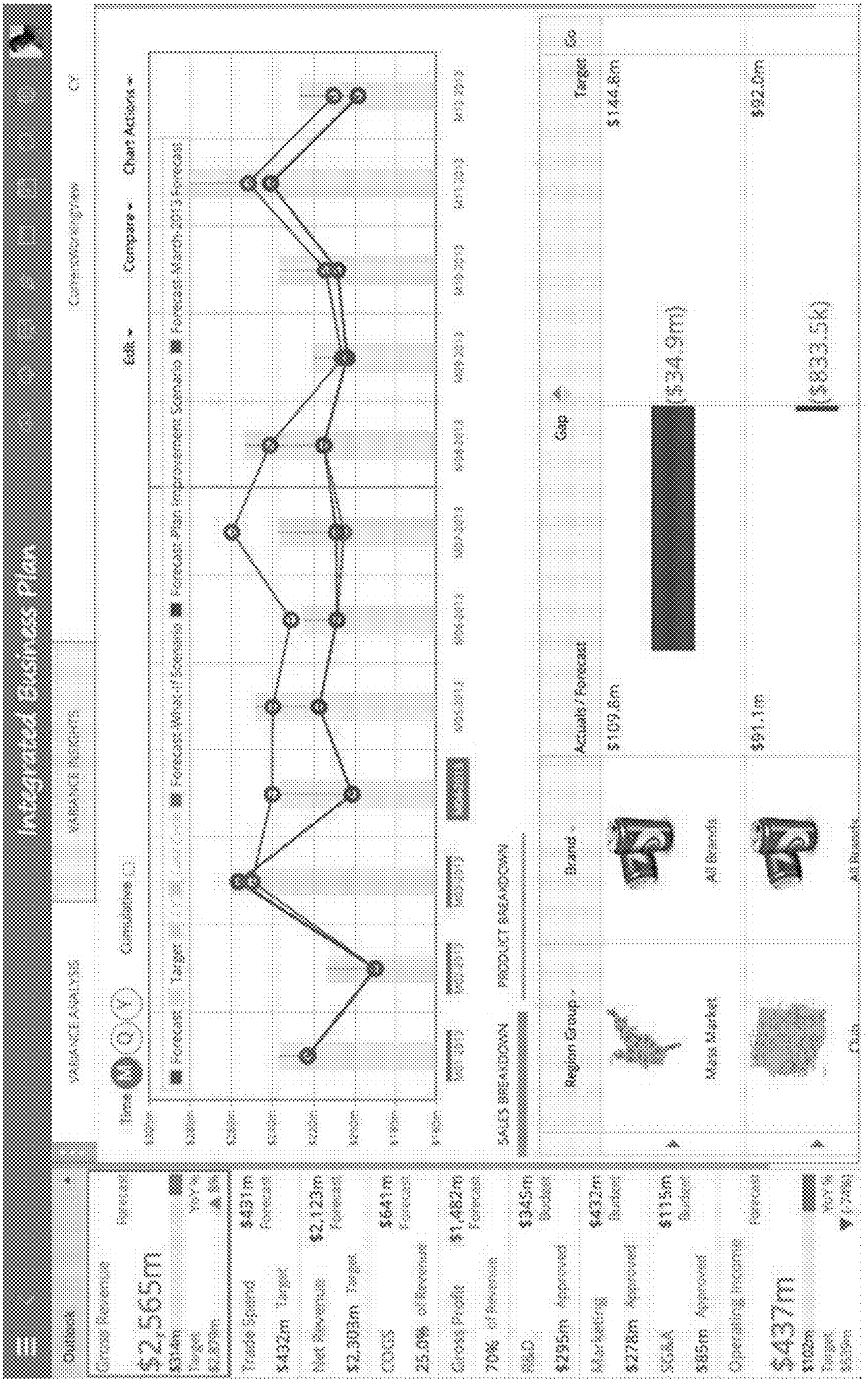

As noted, multiple different scenarios can be created for a single plan modeled by a particular plan model. As shown in FIGS. 15F-15G, additional user interface features can be provided, allowing a user to compare, using the plan model visualization mechanisms available through the planning system user interface, multiple different scenarios against each other to identify how they perform relative to each other. This can assist the user in appreciating how the differences between the scenarios potentially affect the business. For instance, in FIG. 15F, a user can select two or more scenarios to compare against each other. The user can also select a key performance indicator and graphical representation type for the comparison, among other examples. As shown in FIG. 15G, a resulting presentation can be rendered in a display device of a user computing device that shows a portion of the comparative differences resulting from the two or more scenarios, among other examples.

Figure 16A:
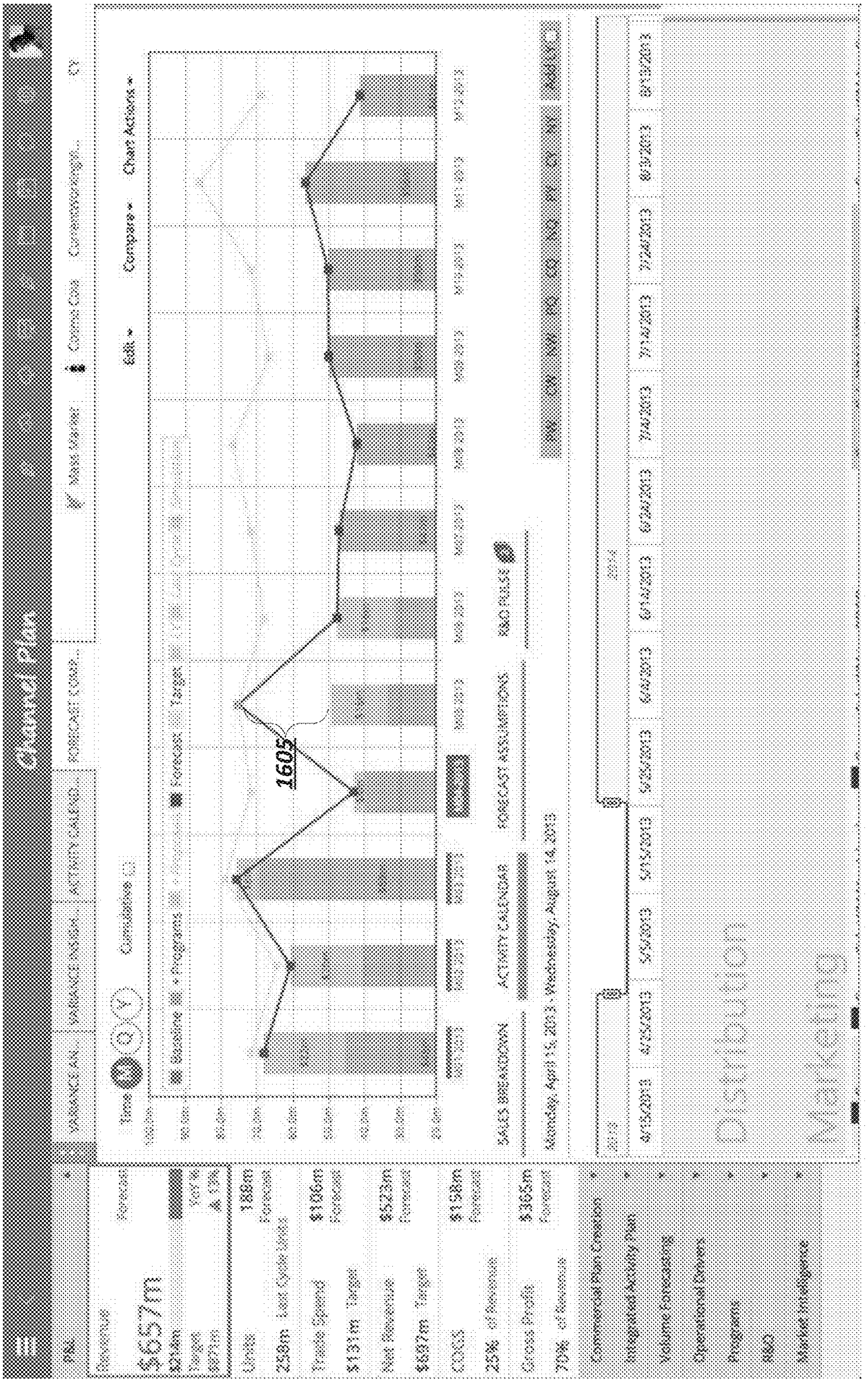
FIGS. 16A-16F are screenshots of example user interfaces for use in connection with one or more example plan models.

FIGS. 16A-16F show screenshots of additional example user interfaces of an example plan model (or planning) system. User interfaces and GUI planning tools can be provided that can assist in a user in resolving gaps that emerge between goal measure values (or "goals") and actual measure values (for past periods) and forecasted measure values (or forecasts) for current or future periods. For instance, user interfaces of a planning system can help users identify gaps that are occurring within their domain or the plan in general. For instance, as shown in FIG. 16A, a relatively significant gap (e.g., 1605) can be identified by a user. The user may be responsible for meeting a goal associated with the measure experiencing this gap and may desire to explore options of correcting the gap. The gap can be closed by either (or both) adjusting the goal, or determining a way to legitimately move the forecast value toward the goal. User interfaces can be provided to perform techniques relating to a gap closure workflow. For instance, a user can attempt to change a forecast value, either by changing assumptions upon which the forecast value is based or proposing the change and offering evidence for which the forecast is incorrect. In some cases, a forecast can be a relatively objective value based on empirical data (e.g., from one or more sources) and numerical or modeled assumptions (if authorized) and provide rationale or evidence in support of the change (e.g., to justify the change as a more accurate forecast). The more desirable gap closure technique in some cases, however, may be determining how to adjust the underlying business (and assumptions) to make up the gap between the goal and forecast measure values. In some cases, the gap relative to the goal value may be too high (e.g., a spend-related measure), while in other cases the users may desire to push the measure's forecast value higher (e.g., revenue, market share, profit, market penetration measures, etc.).

Figure 16B:
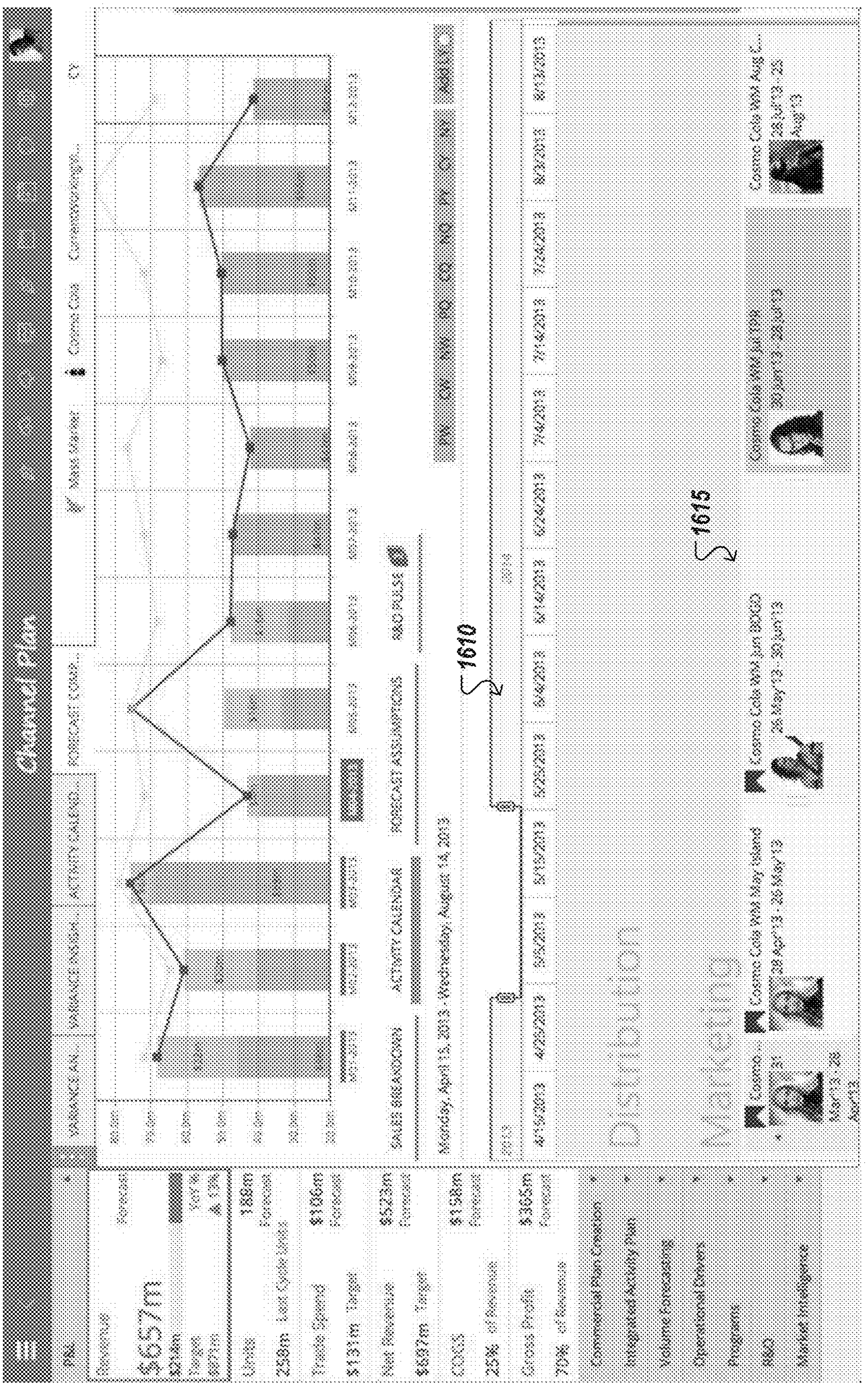

As shown in the example of FIG. 16B, planning system user interface tools can include tools for visualizing programs and initiatives that have been launched, proposed, or approved (and set for future launch) that relate to a particular portion of a plan model. For instance, a calendar view 1610 can be provided allowing various initiatives of various business units or categories (e.g., Distribution, Marketing, etc.) to be visualized along a time axis. Each program or initiative can be modeled, for instance, by a corresponding business model and can identify, or forecast, what measures of the plan the program or initiative is expected to affect (and to what magnitude). The calendar view can be overlaid with graphical representations of each program or initiative approved during the period represented in the current calendar view. For instance, a buy one get one free promotion (represented at 1615) can be proposed that pertains to the Mass Market distribution of the brand Cosmo Cola within a Channel Plan plan model. Similar graphical representations can be overlaid on the calendar view 1610 for other promotions, campaigns, reforms, and initiatives. A user, as with other graphical representations of business entities modeled in plan models and business models of the planning system, can select a representation of a program or initiative (e.g., 1615 and inspect, or even edit, the attributes of the program as modeled by corresponding business models. Indeed, a user can edit the projected effect of the program on one or more measures of one or more corresponding plans.

Figure 16C:
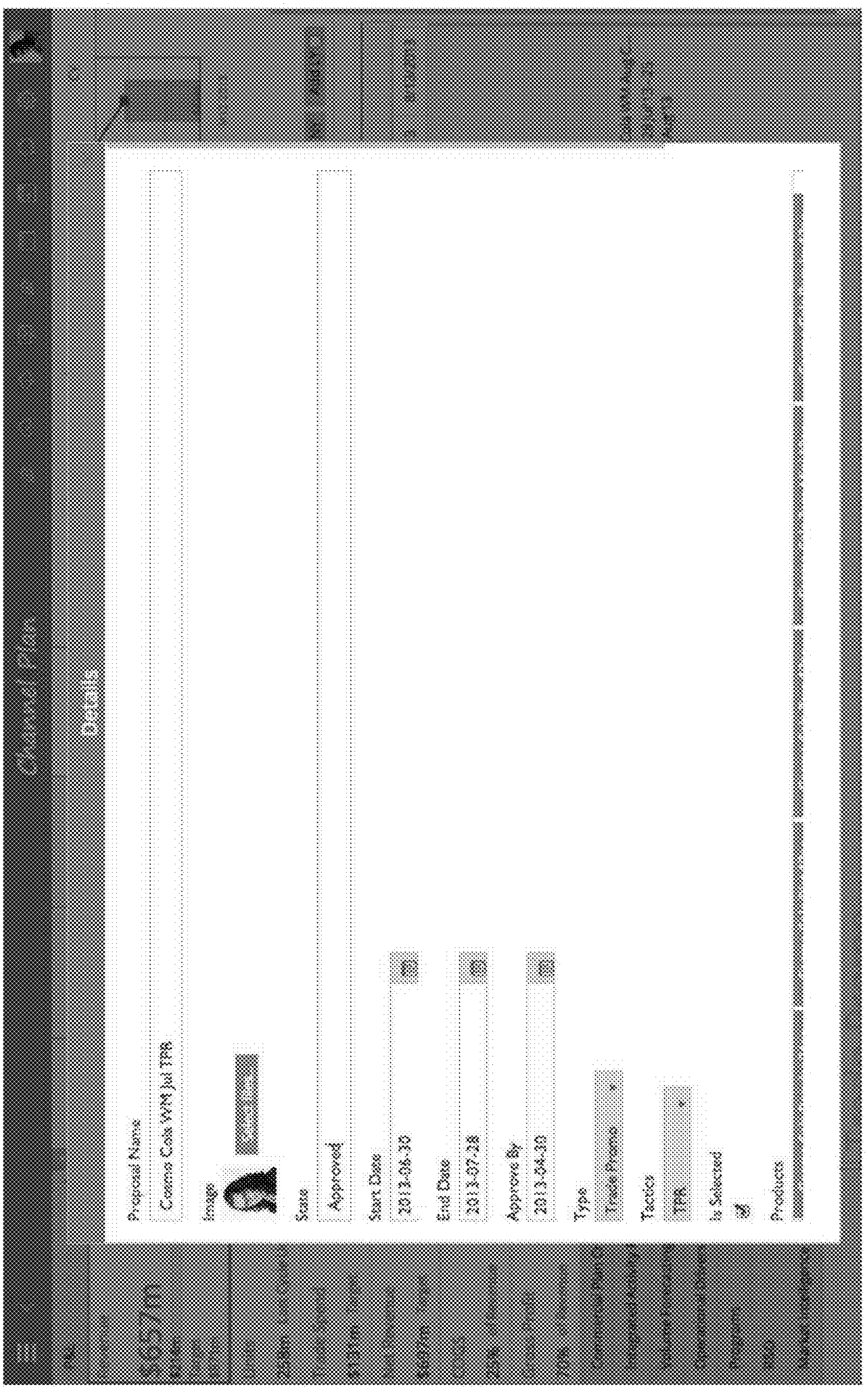

FIG. 16C shows a screenshot of an example user interface allowing a user to view and edit attributes of a program or initiative that can affect measures of one or more plans within an enterprise. Additional attributes can include, for example, the name, a person in the organization assigned to or managing the initiative, a start and/or end date of the initiative, the business entities related to (and potentially affected by) the initiative, the status of the initiatives (e.g., proposed, approved, completed, etc.), among other examples. A creator or owner of the initiative can define (e.g., in a corresponding business model of the planning system) that the initiative is likely to, for example, raise revenue within a particular segment or domain by a certain amount or percentage, cost a certain amount of money (laid out over a period), divert resources (e.g., reduce spend) from other initiatives, among other potential examples. Creating an initiative within a planning system user interface, such as shown in FIG. 16C, can cause the initiative to be proposed within the organization. In some instances, the forecasted impact of an initiative may only first be reflected when the proposal of the initiative is approved by the enterprise. Thus, even though the initiative may be in the future, it is part of the enterprise's plan following approval and can be considered in forecasts of the plan. Accordingly, a new initiative can be used to close the gap between a goal and forecast value for one or more measures of a plan model, based on its likely effect on the measure.

Accordingly, one mechanism for gap closure is to investigate potential new programs and initiatives and their potential effects on a forecast within a plan. New programs and initiatives can even be proposed hypothetically within a scenario planning session, allowing the user to identify and even compare the value of potential new initiatives or changes to already-approved initiatives (e.g., extending a promotion, etc.), to a current working view. This can allow a user to demonstrate (e.g., to other users involved in the approval of such initiatives) through the scenario, how one or more initiatives (or changes to initiatives) may assist in closing a gap, among other potential uses and advantages.

Figure 16D:
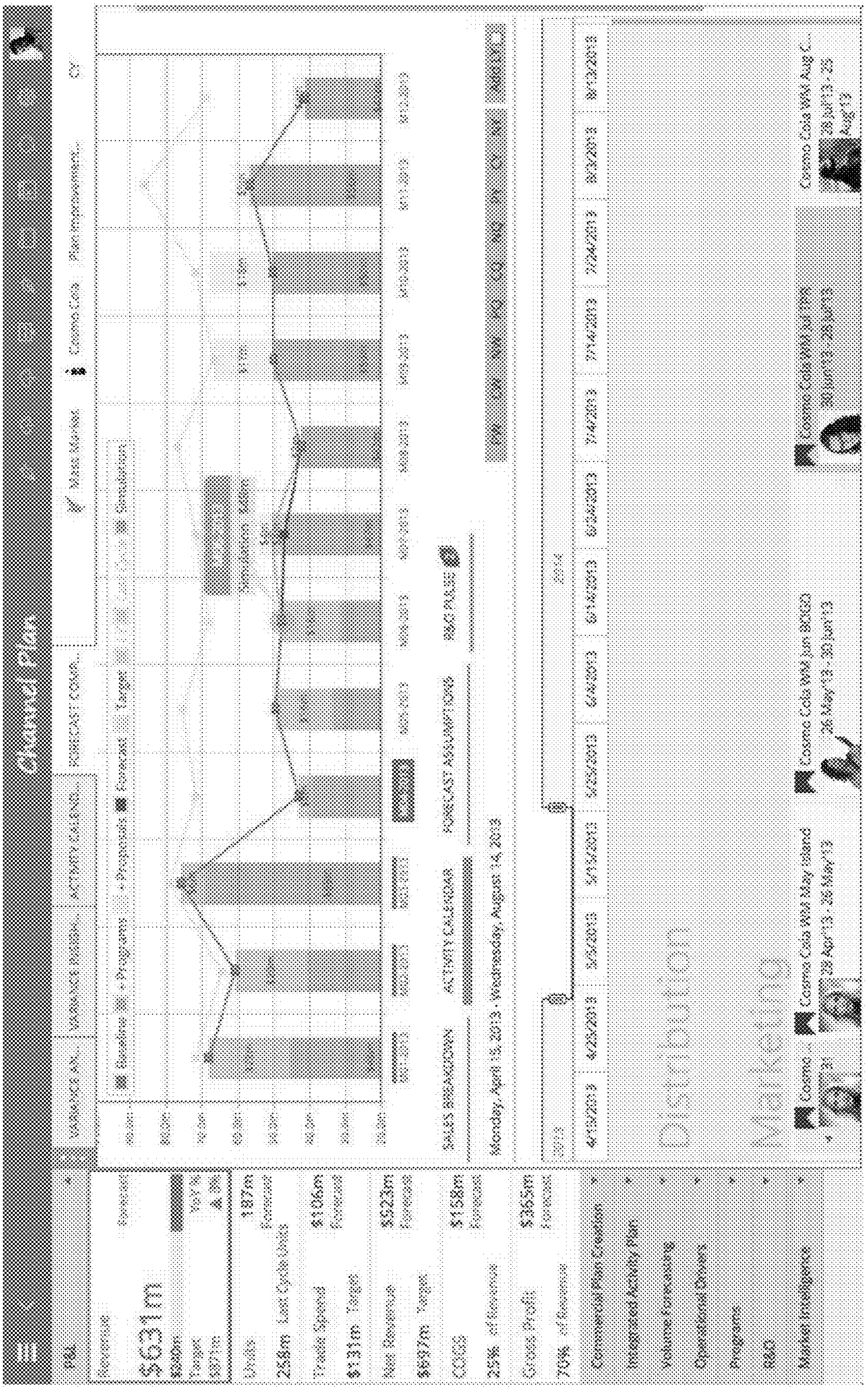
Figure 16E:
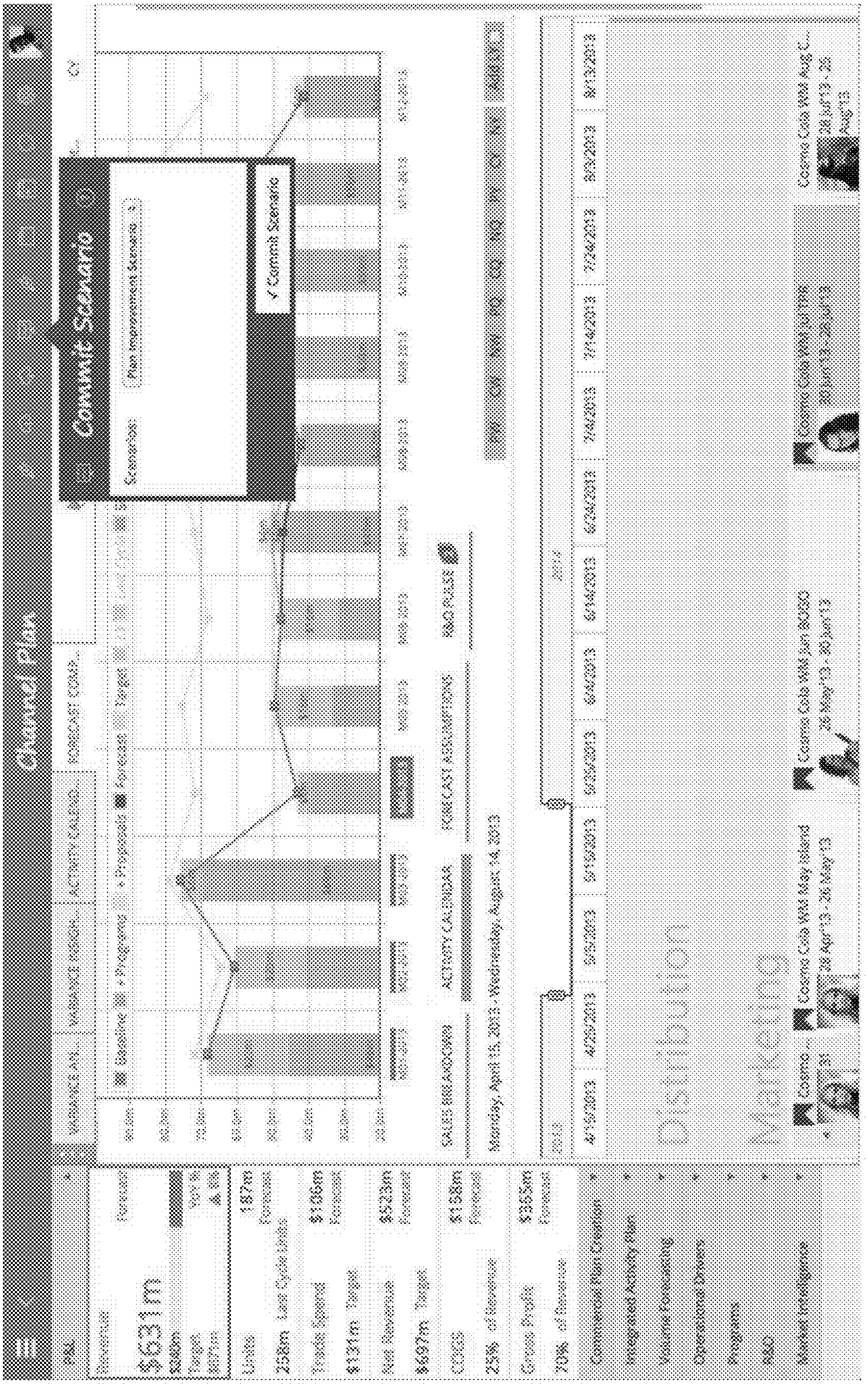

In the example of FIG. 16D, a new initiative can be introduced that affects the forecast value for revenue within mass market distribution of the Cosmo Cola brand, as modeled in an example Channel Plan plan model. Indeed, compared to FIG. 16A, the new initiative can affect revenue positively within this segment, as demonstrated by the graph in FIG. 16D, potentially erasing the gap (e.g., 1605). The screenshot of FIG. 16D may reflect a future view of the plan, after such an initiative has been added and approved, while in other cases, the screenshot can be generated in connection with a scenario planning session in which a user has hypothetically planned for the inclusion of the new initiative. For instance, as shown in the example of FIG. 16E, a scenario can be created and saved to document the modeled response to the inclusion of a potential new initiative.

Figure 16F:
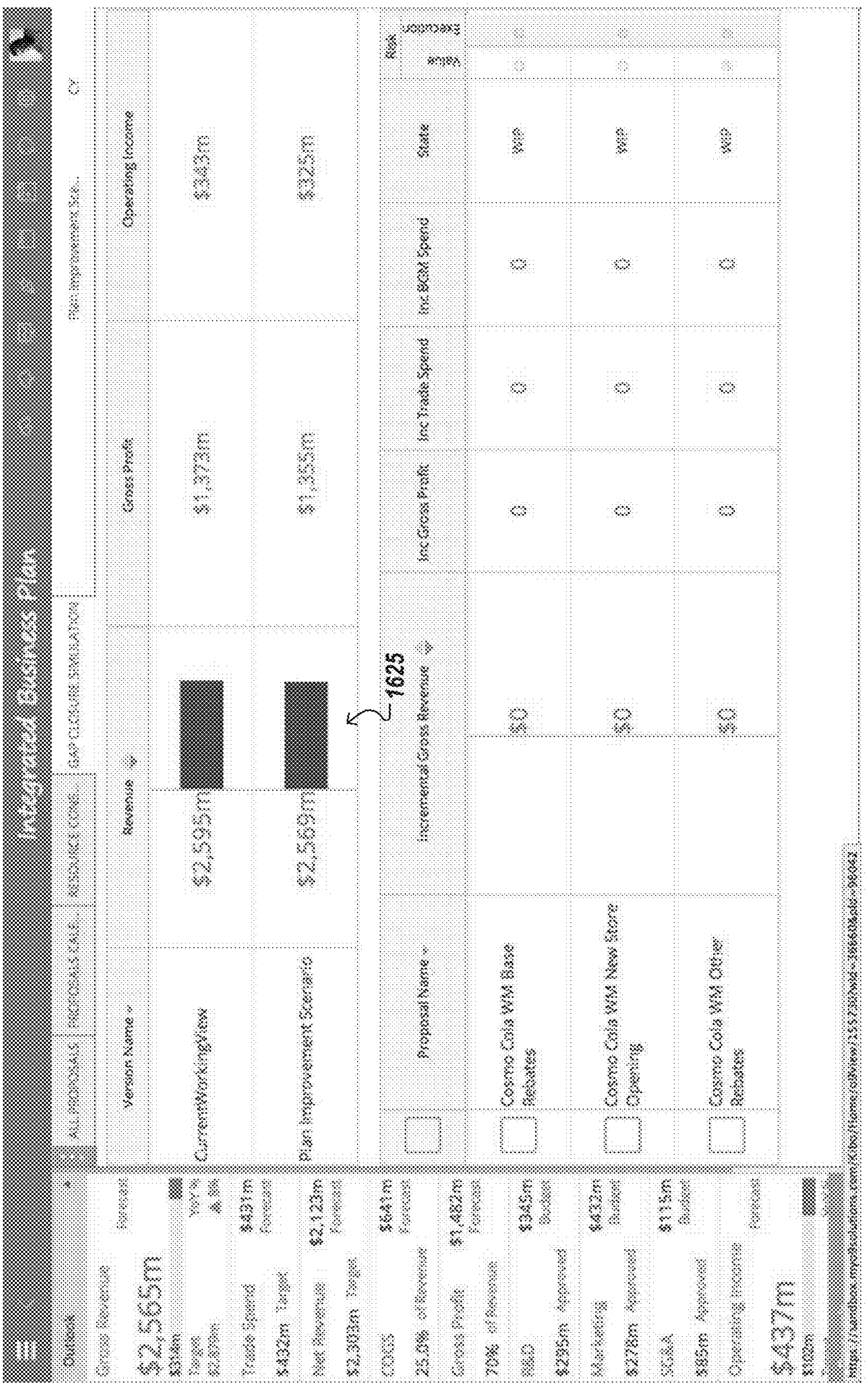

While approval of an initiative may be a prerequisite in some implementations for considering the effect of the initiative within a current working view of a plan, in other cases, such as during scenario planning activities, graphical representations may distinguish between (and present graphical representations related to) forecasts that do not consider any additional initiatives, forecasts that account for planned and approved initiatives, and forecasts that account for both approved and not-yet-approved initiatives, among other examples. The effect of various proposed initiatives can also be compared in accordance with user interfaces provided in connection with the approval of such proposed initiatives. For instance, as shown in FIG. 16F, a listing of proposed initiatives for approval can be provided. Each can be modeled in one or more business models to reflect what plan measures they might affect. A user assessing the proposals can select one of a variety of different key performance indicator measures for a plan (e.g., as defined by an underlying plan model) and compare values for the selected key performance indicator in a current working view and a plan improvement scenario that were to include various combinations of the proposals. In effect, the user interface illustrated in the example of FIG. 16F can be an alternate user interface for conducting a scenario planning session, this time within the context of assessing and approving proposed programs and initiatives identified as related to one or more plan models (and their corresponding plans). For instance, as a user selects one of the proposals (e.g., using the associated check box control) the scenario (and representation 1625) can be updated to reflect how the proposal affects the measure, and if the affect is an improvement upon the current working view. Additionally, combinations of the proposals can be selected to see the net effect of multiple proposals on a measure. This can assist a user in determining whether, and what combinations, of proposals to approve in order to improve upon a current working plan. Similar user interfaces can also be provided and utilized in connection with gap closure efforts, among other example uses. Indeed, the plan model system can provide a variety of graphical user interfaces in connection with other functionality provided by the plan model system, such as those illustrated and shown in U.S. patent application Ser. No. 14/751,526, filed on Jun. 26, 2015 and entitled "PLAN MODELING AND USER FEEDBACK" and U.S. patent application Ser. No. 14/752,774, filed on Jun. 26, 2015 and entitled "PLAN MODELING AND TASK MANAGEMENT", which are both incorporated by reference herein in their entirety.

Figure 17A:
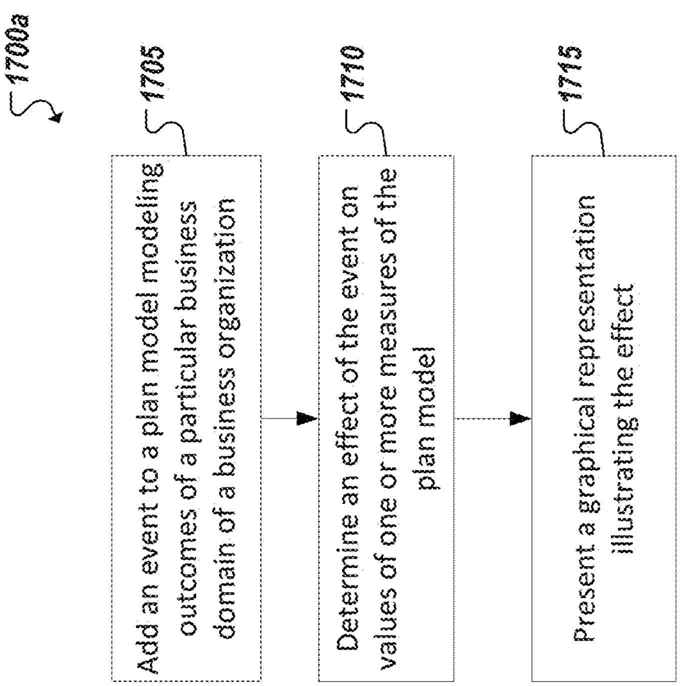
FIGS. 17A-17C are flowcharts of example techniques for using an example plan model in accordance with at least some embodiments.
Figure 17B:
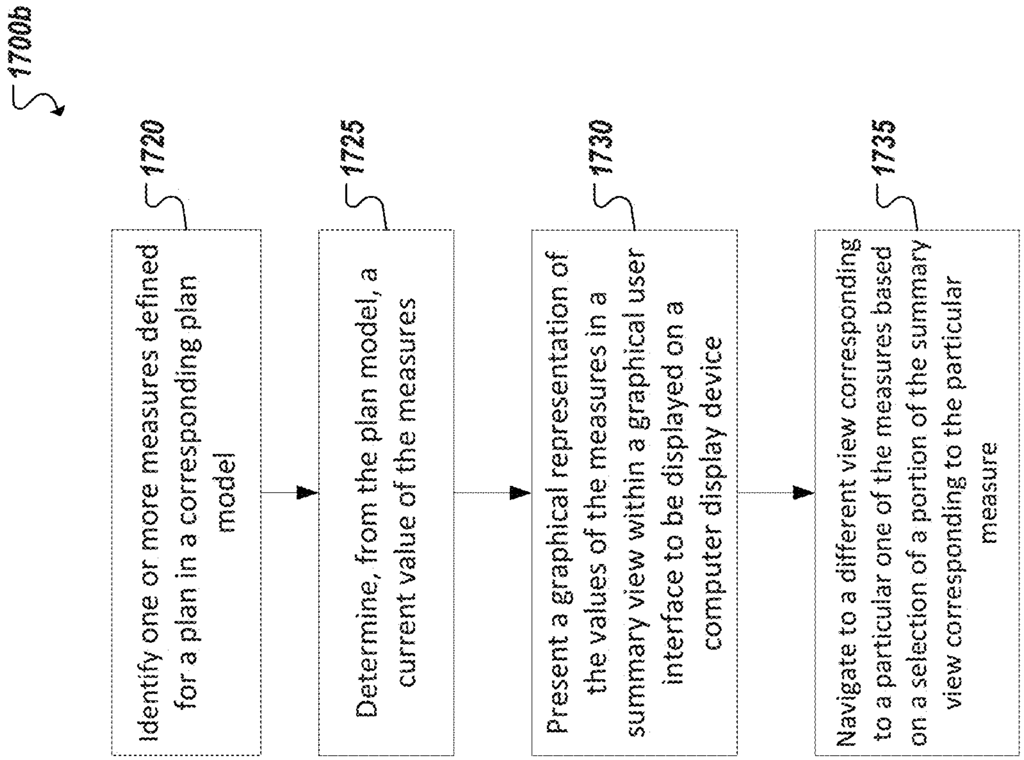
Figure 17C:
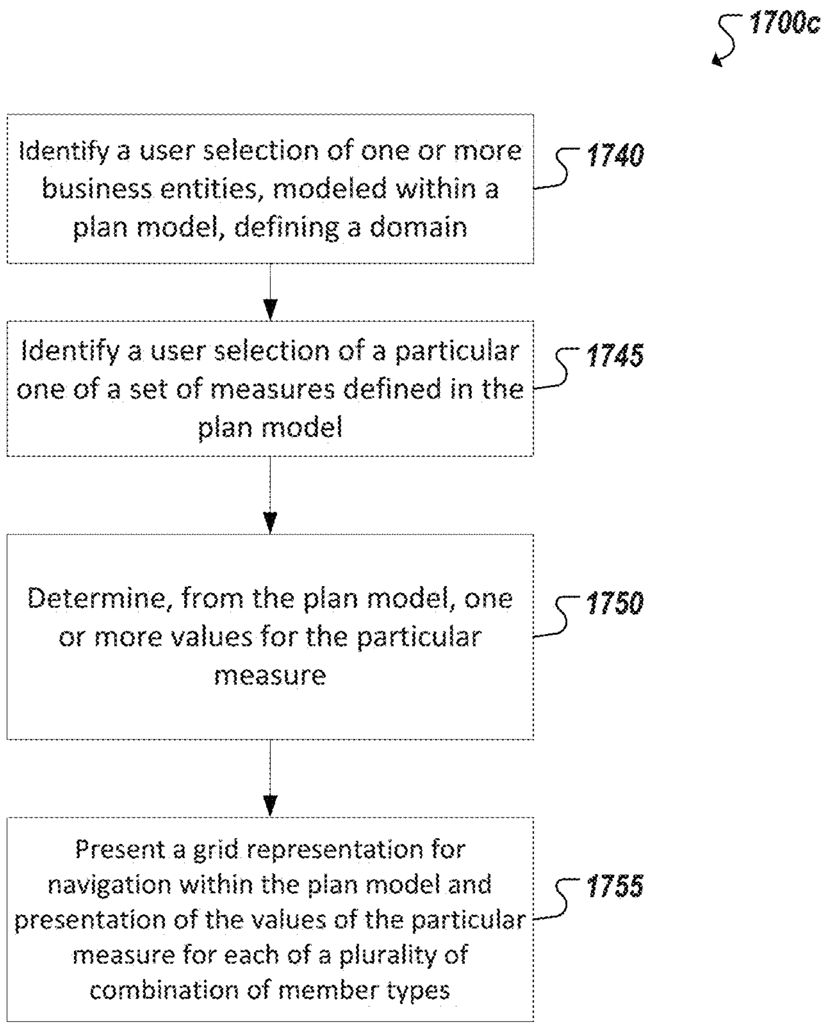

FIGS. 17A-C include simplified flowcharts 1700*a-c* illustrating example techniques for using plan models and networks of plan models, such as those shown and described in the examples herein. For instance, in the example of FIG. 17A, a user input is provided through a graphical user interface presenting a view of aspects of the plan model(s) (e.g., utilizing the defined structure discussed above) to change or add one or more metric values modeled by the plan models to model a real or hypothetical "event" applicable to the a business domain. Adding the event 1705 to a plan model can cause values of other metrics in the plan model to change. Indeed, an effect of the event on values of one or more measures (or metrics) can be determined 1710, and graphical representations of these measures can be updated to show these changes and these changes can be presented 1715 on the graphical user interface through which the user input(s) was provided.

Turning to FIG. 17B, a user can select a particular business domain and one or more corresponding plan models (e.g., utilizing the defined structure discussed above) related to the domain. One or more measures can be identified 1720 that are defined within the plan. The plan model can be used to determine 1725 (e.g., through a query and/or calculation) current values of the identified measures. Some of the measures can be identified as goals or key performance indicators. These measures can be presented 1730 in a summary window (e.g., a tower of cells, each cell corresponding to one of the goal measures) within a graphical user interface. The cells can additionally be used to navigate 1735 to various working views (e.g., displayed in another window within the graphical user interface), allowing a user to inspect various views of data underlying any one of the goal measures.

In the example of FIG. 17C, a user selection of one or more business entities can be identified 1740 that correspond to a definition of a business method. A user selection can be identified 1745 of a particular one of a set of measures defined in a plan model corresponding to the business domain (e.g., a selection of a cell in a tower of cells corresponding to goal or key performance measures). One or more values for each of the measures in the set can be determined 1750. A grid representation can be presented 1755 to represent values of the particular measure for each of a plurality of combinations of member types. The grid cells can be used to navigate to various working views (presented within the same user interface) relating to one of the measures, as filtered by the combination selected in the grid, among other examples and uses.

Although this disclosure has been described in terms of certain implementations and generally associated methods, alterations and permutations of these implementations and methods will be apparent to those skilled in the art. For example, the actions described herein can be performed in a different order than as described and still achieve the desirable results. As one example, the processes depicted in the accompanying figures do not necessarily require the particular order shown, or sequential order, to achieve the desired results. Systems and tools illustrated can similarly adopt alternate architectures, components, and modules to achieve similar results and functionality. For instance, in certain implementations, multitasking, parallel processing, and cloud-based solutions may be advantageous. Additionally, diverse user interface layouts, structures, architectures, and functionality can be supported. Other variations are within the scope of the following claims.

Embodiments of the subject matter and the operations described in this specification can be implemented in digital electronic circuitry, or in computer software, firmware, or hardware, including the structures disclosed in this specification and their structural equivalents, or in combinations of one or more of them. Embodiments of the subject matter described in this specification can be implemented as one or more computer programs, i.e., one or more modules of computer program instructions, encoded on computer storage medium for execution by, or to control the operation of, data processing apparatus. Alternatively or in addition, the program instructions can be encoded on an artificially generated propagated signal, e.g., a machine-generated electrical, optical, or electromagnetic signal that is generated to encode information for transmission to suitable receiver apparatus for execution by a data processing apparatus. A computer storage medium can be, or be included in, a computer-readable storage device, a computer-readable storage substrate, a random or serial access memory array or device, or a combination of one or more of them. A computer storage medium can be a non-transitory medium. Moreover, while a computer storage medium is not a propagated signal per se, a computer storage medium can be a source or destination of computer program instructions encoded in an artificially generated propagated signal. The computer storage medium can also be, or be included in, one or more separate physical components or media (e.g., multiple CDs, disks, or other storage devices), including a distributed software environment or cloud computing environment.

Networks, including core and access networks, including wireless access networks, can include one or more network elements. Network elements can encompass various types of routers, switches, gateways, bridges, load balancers, firewalls, servers, inline service nodes, proxies, processors, modules, or any other suitable device, component, element, or object operable to exchange information in a network environment. A network element may include appropriate processors, memory elements, hardware and/or software to support (or otherwise execute) the activities associated with using a processor for screen management functionalities, as outlined herein. Moreover, the network element may include any suitable components, modules, interfaces, or objects that facilitate the operations thereof. This may be inclusive of appropriate algorithms and communication protocols that allow for the effective exchange of data or information.

The operations described in this specification can be implemented as operations performed by a data processing apparatus on data stored on one or more computer-readable storage devices or received from other sources. The terms "data processing apparatus," "processor," "processing device," and "computing device" can encompass all kinds of apparatus, devices, and machines for processing data, including by way of example a programmable processor, a computer, a system on a chip, or multiple ones, or combinations, of the foregoing. The apparatus can include general or special purpose logic circuitry, e.g., a central processing unit (CPU), a blade, an application specific integrated circuit (ASIC), or a field-programmable gate array (FPGA), among other suitable options. While some processors and computing devices have been described and/or illustrated as a single processor, multiple processors may be used according to the particular needs of the associated server. References to a single processor are meant to include multiple processors where applicable. Generally, the processor executes instructions and manipulates data to perform certain operations. An apparatus can also include, in addition to hardware, code that creates an execution environment for the computer program in question, e.g., code that constitutes processor firmware, a protocol stack, a database management system, an operating system, a cross-platform runtime environment, a virtual machine, or a combination of one or more of them. The apparatus and execution environment can realize various different computing model infrastructures, such as web services, distributed computing and grid computing infrastructures.

A computer program (also known as a program, software, software application, script, module, (software) tools, (software) engines, or code) can be written in any form of programming language, including compiled or interpreted languages, declarative or procedural languages, and it can be deployed in any form, including as a standalone program or as a module, component, subroutine, object, or other unit suitable for use in a computing environment. For instance, a computer program may include computer-readable instructions, firmware, wired or programmed hardware, or any combination thereof on a tangible medium operable when executed to perform at least the processes and operations described herein. A computer program may, but need not, correspond to a file in a file system. A program can be stored in a portion of a file that holds other programs or data (e.g., one or more scripts stored in a markup language document), in a single file dedicated to the program in question, or in multiple coordinated files (e.g., files that store one or more modules, sub programs, or portions of code). A computer program can be deployed to be executed on one computer or on multiple computers that are located at one site or distributed across multiple sites and interconnected by a communication network.

Programs can be implemented as individual modules that implement the various features and functionality through various objects, methods, or other processes, or may instead include a number of sub-modules, third party services, components, libraries, and such, as appropriate. Conversely, the features and functionality of various components can be combined into single components as appropriate. In certain cases, programs and software systems may be implemented as a composite hosted application. For example, portions of the composite application may be implemented as Enterprise Java Beans (EJBs) or design-time components may have the ability to generate run-time implementations into different platforms, such as J2EE (Java 2 Platform, Enterprise Edition), ABAP (Advanced Business Application Programming) objects, or Microsoft's .NET, among others. Additionally, applications may represent web-based applications accessed and executed via a network (e.g., through the Internet). Further, one or more processes associated with a particular hosted application or service may be stored, referenced, or executed remotely. For example, a portion of a particular hosted application or service may be a web service associated with the application that is remotely called, while another portion of the hosted application may be an interface object or agent bundled for processing at a remote client. Moreover, any or all of the hosted applications and software service may be a child or sub-module of another software module or enterprise application (not illustrated) without departing from the scope of this disclosure. Still further, portions of a hosted application can be executed by a user working directly at a server hosting the application, as well as remotely at a client.

The processes and logic flows described in this specification can be performed by one or more programmable processors executing one or more computer programs to perform actions by operating on input data and generating output. The processes and logic flows can also be performed by, and apparatus can also be implemented as, special purpose logic circuitry, e.g., an FPGA (field programmable gate array) or an ASIC (application specific integrated circuit).

Processors suitable for the execution of a computer program include, by way of example, both general and special purpose microprocessors, and any one or more processors of any kind of digital computer. Generally, a processor will receive instructions and data from a read only memory or a random access memory or both. The essential elements of a computer are a processor for performing actions in accordance with instructions and one or more memory devices for storing instructions and data. Generally, a computer will also include, or be operatively coupled to receive data from or transfer data to, or both, one or more mass storage devices for storing data, e.g., magnetic, magneto optical disks, or optical disks. However, a computer need not have such devices. Moreover, a computer can be embedded in another device, e.g., a mobile telephone, a personal digital assistant (PDA), tablet computer, a mobile audio or video player, a game console, a Global Positioning System (GPS) receiver, or a portable storage device (e.g., a universal serial bus (USB) flash drive), to name just a few. Devices suitable for storing computer program instructions and data include all forms of non-volatile memory, media and memory devices, including by way of example semiconductor memory devices, e.g., EPROM, EEPROM, and flash memory devices; magnetic disks, e.g., internal hard disks or removable disks; magneto optical disks; and CD ROM and DVD-ROM disks. The processor and the memory can be supplemented by, or incorporated in, special purpose logic circuitry.

To provide for interaction with a user, embodiments of the subject matter described in this specification can be implemented on a computer having a display device, e.g., a CRT (cathode ray tube) or LCD (liquid crystal display) monitor, for displaying information to the user and a keyboard and a pointing device, e.g., a mouse or a trackball, by which the user can provide input to the computer. Other kinds of devices can be used to provide for interaction with a user as well; for example, feedback provided to the user can be any form of sensory feedback, e.g., visual feedback, auditory feedback, or tactile feedback; and input from the user can be received in any form, including acoustic, speech, or tactile input. In addition, a computer can interact with a user by sending documents to and receiving documents from a device, including remote devices, which are used by the user.

Embodiments of the subject matter described in this specification can be implemented in a computing system that includes a back end component, e.g., as a data server, or that includes a middleware component, e.g., an application server, or that includes a front end component, e.g., a client computer having a graphical user interface or a Web browser through which a user can interact with an implementation of the subject matter described in this specification, or any combination of one or more such back end, middleware, or front end components. The components of the system can be interconnected by any form or medium of digital data communication, e.g., a communication network. Examples of communication networks include any internal or external network, networks, sub-network, or combination thereof operable to facilitate communications between various computing components in a system. A network may communicate, for example, Internet Protocol (IP) packets, Frame Relay frames, Asynchronous Transfer Mode (ATM) cells, voice, video, data, and other suitable information between network addresses. The network may also include one or more local area networks (LANs), radio access networks (RANs), metropolitan area networks (MANs), wide area networks (WANs), all or a portion of the Internet, peer-to-peer networks (e.g., ad hoc peer-to-peer networks), and/or any other communication system or systems at one or more locations.

The computing system can include clients and servers. A client and server are generally remote from each other and typically interact through a communication network. The relationship of client and server arises by virtue of computer programs running on the respective computers and having a client-server relationship to each other. In some embodiments, a server transmits data (e.g., an HTML page) to a client device (e.g., for purposes of displaying data to and receiving user input from a user interacting with the client device). Data generated at the client device (e.g., a result of the user interaction) can be received from the client device at the server.

The following examples pertain to embodiments in accordance with this Specification. One or more embodiments may provide an apparatus, a system, a machine readable storage, a machine readable medium, a method, and hardware- and/or software-based logic (e.g., implemented in connection with a shared memory controller) to add an event to a plan model modeling outcomes of a particular business domain of a business organization, determine an effect of the event on values of one or more measures of the plan model, and present a graphical representation illustrating the effect.

In some examples, the addition of the event can be saved as a scenario. The event can include an initiative or program to be performed by at least a portion of the business entity. A definition of the initiative or program can be received identifying that the initiative or program affects the one or more measures. A graphical representation of the initiative or program can be rendered on a calendar user interface to be displayed on a computer display device.

One or more embodiments may provide an apparatus, a system, a machine readable storage, a machine readable medium, a method, and hardware- and/or software-based logic (e.g., implemented in connection with a shared memory controller) to identify one or more measures defined for a plan in a corresponding plan model, determine, from the plan model, a current value of the measures, and present a graphical representation of the values of the measures in a summary view within a graphical user interface to be displayed on a computer display device. The representation of each value can be selectable to navigate the graphical user interface to a different view highlighting the selected measure.

In some examples, a change to another measure received through the user interface can be identified, the value of a particular one of the one or more measures can be updated, and the update can be reflected in the summary view. The summary view can include a column persistently occupying a portion of the user interface while information of the corresponding plan model is to be rendered in at least another portion of the user interface. One or more measures can be determined to be key performance indicators for the plan. Different plan models can be selected to be presented in a graphical user interface and a similar summary view can be determined and presented for each of the different plan models.

One or more embodiments may provide an apparatus, a system, a machine readable storage, a machine readable medium, a method, and hardware- and/or software-based logic (e.g., implemented in connection with a shared memory controller) to identify a user selection of one or more business entities, modeled within a plan model, can be identified defining a domain. A user selection of a particular one of a set of measures defined in the plan model can be identified. One or more values for the particular measure can be determined from the plan model and a grid user interface can be rendered in a computing display device, the grid identifying one or more members of member types corresponding the business entities and measure values corresponding to a combination of the member types.

In some examples, the grid can be sorted based on the respective measure values of each combination. The grid can be expandable to present sub-combinations under each combination, together with corresponding measure values for each sub-combination. Subcombinations can be based on relationships between each subcombination and the combination defined within the plan model. Each grid cell can be selectable to enable both navigation to another user interface view of details of the respective combination's measure value and editing of the respective combination's measure value.

While this specification contains many specific implementation details, these should not be construed as limitations on the scope of any inventions or of what may be claimed, but rather as descriptions of features specific to particular embodiments of particular inventions. Certain features that are described in this specification in the context of separate embodiments can also be implemented in combination in a single embodiment. Conversely, various features that are described in the context of a single embodiment can also be implemented in multiple embodiments separately or in any suitable subcombination. Moreover, although features may be described above as acting in certain combinations and even initially claimed as such, one or more features from a claimed combination can in some cases be excised from the combination, and the claimed combination may be directed to a subcombination or variation of a subcombination.

Similarly, while operations are depicted in the drawings in a particular order, this should not be understood as requiring that such operations be performed in the particular order shown or in sequential order, or that all illustrated operations be performed, to achieve desirable results. In certain circumstances, multitasking and parallel processing may be advantageous. Moreover, the separation of various system components in the embodiments described above should not be understood as requiring such separation in all embodiments, and it should be understood that the described program components and systems can generally be integrated together in a single software product or packaged into multiple software products.

Thus, particular embodiments of the subject matter have been described. Other embodiments are within the scope of the following claims. In some cases, the actions recited in the claims can be performed in a different order and still achieve desirable results. In addition, the processes depicted in the accompanying figures do not necessarily require the particular order shown, or sequential order, to achieve desirable results.

What is claimed is:

1. A method comprising:

identifying a user selection of one or more business entities, modeled within a plan model, the plan model being domain-specific to a domain defined based on variables relating to the one or more business entities including at least one of a product category variable, a geographic variable, or a temporal variable, the plan model configured to output a particular business outcome corresponding to the domain for the one or more business entities;

identifying a user selection of a particular one of a set of measures defined in the plan model;

determining a set of input drivers related to the particular measure based on the domain;

identifying a set of domain-specific dependencies identified from a sensitivity model, wherein the sensitivity model includes multi-dimensional dependencies between the particular measure and the set of input drivers;

identifying a correlation model for the set of domain specific dependencies based on influence of the set of input drivers on the set of domain specific dependencies, the correlation model defining how to calculate one or more values for the particular measure using the set of input drivers and the set of domain specific dependencies using an aggregate formula included in the correlation model;

determining, from the plan model using the aggregate formula, one or more values for the particular measure, wherein the one or more values are calculated by applying the one or more input drivers using the set of domain-specific dependencies;

causing a grid view to be rendered in a user interface of a computing display device, the grid view identifying one or more members of member types corresponding to the one or more business entities and measure values corresponding to a combination of the member types, wherein the grid view includes one or more cells corresponding to the one or more members, and wherein the one or more cells include a graphical representation of measure values corresponding to the one or more members, the measure values representing an entry within one or more respective variables of the variables used to define the domain;

displaying a sort control display element in conjunction with the grid view, the sort control display element including a domain-member sort control that, upon selection, organizes the grid view by domain-member pairs, wherein each domain-member pair is determined by a similarity of the particular measure between each member of the domain-member pair;

displaying a second view in the user interface concurrently with the grid view based on the grid view;

activating, upon selection of a cell of the one or more cells, a text input mechanism of the cell, wherein activation of the text input mechanism ceases display of the graphical representation of the measure values, and wherein a text input graphical user interface element is displayed in the cell;

receiving input via the text input mechanism, the input altering a value of the cell;

identifying a propagation model for the value of the cell, wherein the propagation model defines paths and sequences for calculating values within the plan model;

propagating the input through the measure values based on the propagation model using aggregate formulas from the correlation model; and re-rendering the grid view and the second view based on the altered value of the cell.

2. The method of claim 1, sorting the grid view based on the respective measure values of each combination.

3. The method of claim 1, wherein the grid view is expandable to present sub-combinations under each combination, together with corresponding measure values for each sub-combination.

4. The method of claim 3, wherein the sub-combinations are based on relationships between each sub-combination and the combination defined within the plan model.

5. The method of claim 1, wherein each cell of the one or more cells is selectable to enable both navigation to another user interface view of details of the respective combination's measure value and editing of the respective combination's measure value, wherein the other user interface view replaces the second view.

6. A system comprising:

at least one processor; and memory including instructions that, when executed by the at least one processor, cause the at least one processor to perform operations to:

identify a user selection of one or more business entities, modeled within a plan model, the plan model being domain-specific to a domain defined based on variables relating to the one or more business entities including at least one of a product category variable, a geographic variable, or a temporal variable, the plan model configured to output a particular business outcome corresponding to the domain for the one or more business entities;

identify a user selection of a particular one of a set of measures defined in the plan model;

determine a set of input drivers related to the particular measure based on the domain;

identify a set of domain-specific dependencies identified from a sensitivity model, wherein the sensitivity model includes multi-dimensional dependencies between the particular measure and the set of input drivers;

identify a correlation model for the set of domain specific dependencies based on influence of the set of input drivers on the set of domain specific dependencies, the correlation model defining how to calculate one or more values for the particular measure using the set of input drivers and the set of domain specific dependencies using an aggregate formula included in the correlation model;

determine, from the plan model using the aggregate formula, one or more values for the particular measure, wherein the one or more values are calculated by applying the one or more input drivers using the set of domain-specific dependencies;

cause a grid view to be rendered in a user interface of a computing display device, wherein the grid view identifies one or more members of member types that correspond to the business entities and measure values that correspond to a combination of the member types, wherein the grid view includes one or more cells corresponding to the one or more members, and wherein the one or more cells include a graphical representation of measure values corresponding to the one or more members, the measure values representing an entry within one or more respective variables of the variables used to define the domain;

display a sort control display element in conjunction with the grid view, wherein the sort control display element includes a domain-member sort control that, upon selection, organizes the grid view by domain-member pairs, wherein each domain-member pair is determined by a similarity of the particular measure between each member of the domain-member pair;

display a second view in the user interface concurrently with the grid view based on the grid view;

activate, upon selection of a cell of the one or more cells, a text input mechanism of the cell, wherein activation of the text input mechanism ceases display of the graphical representation of the measure values, and wherein a text input graphical user interface element is displayed in the cell;

receive input via the text input mechanism, wherein the input alters a value of the cell;

identify a propagation model for the value of the cell, wherein the propagation model defines paths and sequences for calculating values within the plan model;

propagate the input through the measure values based on the propagation model using aggregate formulas from the correlation model; and re-render the grid view and the second view based on the altered value of the cell.

7. The system of claim 6, further comprising instructions to sort the grid view based on the respective measure values of each combination.

8. The system of claim 6, wherein the grid view is expandable to present sub-combinations under each combination, together with corresponding measure values for each sub-combination.

9. The system of claim 8, wherein the sub-combinations are based on relationships between each sub-combination and the combination defined within the plan model.

10. The system of claim 6, wherein each cell of the one or more cells is selectable to enable both navigation to another user interface view of details of the respective combination's measure value and editing of the respective combination's measure value, wherein the other user interface view replaces the second view.

11. At least one non-transitory machine readable medium comprising instructions that, when executed by at least one processor, cause the at least one processor to perform operations to:

identify a user selection of one or more business entities, modeled within a plan model, the plan model being domain-specific to a domain defined based on variables relating to the one or more business entities including at least one of a product category variable, a geographic variable, or a temporal variable, the plan model configured to output a particular business outcome corresponding to the domain for the one or more business entities;

identify a user selection of a particular one of a set of measures defined in the plan model;

determine a set of input drivers related to the particular measure based on the domain;

identify a set of domain-specific dependencies identified from a sensitivity model, wherein the sensitivity model includes multi-dimensional dependencies between the particular measure and the set of input drivers;

identify a correlation model for the set of domain specific dependencies based on influence of the set of input drivers on the set of domain specific dependencies, the correlation model defining how to calculate one or more values for the particular measure using the set of input drivers and the set of domain specific dependencies using an aggregate formula included in the correlation model;

determine, from the plan model using the aggregate formula, the one or more values for the particular measure, wherein the one or more values are calculated by applying the one or more input drivers using the set of domain-specific dependencies;

cause a grid view to be rendered in a user interface of a computing display device, wherein the grid view identifies one or more members of member types that correspond to the business entities and measure values that correspond to a combination of the member types, wherein the grid view includes one or more cells corresponding to the one or more members, and wherein the one or more cells include a graphical representation of measure values corresponding to the one or more members, the measure values representing an entry within one or more respective variables of the variables used to define the domain;

display a sort control display element in conjunction with the grid view, wherein the sort control display element includes a domain-member sort control that, upon selection, organizes the grid view by domain-member pairs, wherein each domain-member pair is determined by a similarity of the particular measure between each member of the domain-member pair;

display a second view in the user interface concurrently with the grid view based on the grid view;

activate, upon selection of a cell of the one or more cells, a text input mechanism of the cell, wherein activation of the text input mechanism ceases display of the graphical representation of the measure values, and wherein a text input graphical user interface element is displayed in the cell;

receive input via the text input mechanism, wherein the input alters a value of the cell;

identify a propagation model for the value of the cell, wherein the propagation model defines paths and sequences for calculating values within the plan model;

propagate the input through the measure values based on the propagation model using aggregate formulas from the correlation model; and re-render the grid view and the second view based on the altered value of the cell.

12. The at least one machine readable medium of claim 11, further comprising instructions to sort the grid view based on the respective measure values of each combination.

13. The at least one machine readable medium of claim 11, wherein the grid view is expandable to present sub-combinations under each combination, together with corresponding measure values for each sub-combination.

14. The at least one machine readable medium of claim 13, wherein the sub-combinations are based on relationships between each sub-combination and the combination defined within the plan model.

15. The at least one machine readable medium of claim 11, wherein each cell of the one or more cells is selectable to enable both navigation to another user interface view of details of the respective combination's measure value and editing of the respective combination's measure value, wherein the other user interface view replaces the second view.

* * * * *